United States Patent [19]

Jauch

[11] Patent Number: 4,779,218

[45] Date of Patent: Oct. 18, 1988

[54] COMPLEX ARITHMETIC UNIT

[76] Inventor: Jeremy P. Jauch, 610 S. 9th St., Columbus, Ohio 43206

[21] Appl. No.: 772,962

[22] Filed: Sep. 4, 1985

[51] Int. Cl.$^4$ .......................... G06F 7/38; G06F 7/52; G06F 7/544

[52] U.S. Cl. .................................... 364/736; 364/754; 364/765

[58] Field of Search ............... 364/736, 754, 761, 768, 364/765

[56] References Cited

U.S. PATENT DOCUMENTS

| | | | |
|---|---|---|---|
| 3,557,355 | 1/1971 | Porter | 235/164 |
| 3,591,787 | 7/1971 | Freiman et al. | 235/164 |
| 3,684,879 | 8/1972 | Koehler | 235/156 |
| 3,733,477 | 5/1973 | Tate et al. | 235/164 |
| 4,148,047 | 4/1979 | Phadke | 361/80 |
| 4,190,894 | 2/1980 | Mudge | 364/758 |
| 4,202,039 | 5/1980 | Epenoy et al. | 364/757 |
| 4,293,922 | 10/1981 | Davio et al. | 364/757 |
| 4,337,519 | 6/1982 | Nishimoto | 364/736 |
| 4,344,151 | 8/1982 | White | 364/754 |
| 4,354,249 | 10/1982 | King et al. | 364/754 |
| 4,467,444 | 8/1984 | Harmon, Jr. et al. | 364/736 |
| 4,589,067 | 5/1986 | Porter et al. | 364/736 |
| 4,658,355 | 4/1987 | Hatakeyama et al. | 364/736 |

FOREIGN PATENT DOCUMENTS 8203481 10/1982 PCT Int'l Appl. ................. 364/736

Primary Examiner—Gary V. Harkcom
Assistant Examiner—Dale M. Shaw
Attorney, Agent, or Firm—Pennie & Edmonds

[57] ABSTRACT

A complex arithmetic unit (CAU) for manipulating digital data representative of complex numbers. The CAU receives control signals and digital data representative of the real and imaginary parts of the complex operands from a host computer, and performs division, magnitude, and multiplication operations. The CAU has an input port for receiving input data and control signals; an output port for transferring output data and control signals; a RAM for storing input data, output data, and the results of intermediate calculations, the RAM having an input bus connected to the input port and an output bus connected to the output port; a data buffer for transferring digital data from the output bus; a controllable multiplier which also performs addition and subtraction of products, with an input connected to the input bus and the buffer, and an output for transferring digital output data; a parallel scaling multiplexer which receives the multiplier output data and extracts a selected contiguous subset of digital bits to scale the multiplier output data according to a predetermined scaling factor; an address multiplexer for extracting predetermined aspects of the multiplier output data; a lookup PROM addressable in response to the address multiplexer for storing approximate results of mathematical operations and transferring the results to the data buffer means and the multiplier input; a control device responsive to predetermined aspects of the multiplier output data extracted by the data scaling multiplexer control device and the address multiplexer, for controlling the other components.

19 Claims, 35 Drawing Sheets

MULTIPLIER

MULTIPLIER

SYSTEM CONTROLLER

MICROCODE PROMS & LATCHES

MICROCODE CONTROL LOGIC

INPUT PORT

RIB/ROB BUFFER

Y-INPUT BUFFER

OUTPUT PORT

ZERO DETECT LOGIC

ZERO LATCH

LOOKUP ADDRESS LOGIC

LOOKUP ADDRESS MPX

LOOKUP PROMS

MULTIPLIER OUTPUT WORD

DATA SCALING REGISTER

NUMERATOR LATCH - SIGN LATCH LOGIC

DMPX SELECT LOGIC

DMPX CONTROL

STATUS LATCHES

STATUS MPX

NUMERATOR LATCHES

NUMERATOR LATCHES

SIGN AND OVERFLOW LATCHES

OUTPUT OVERFLOW LATCHES

FIG. 36
INTERNAL OVERFLOW LATCHES
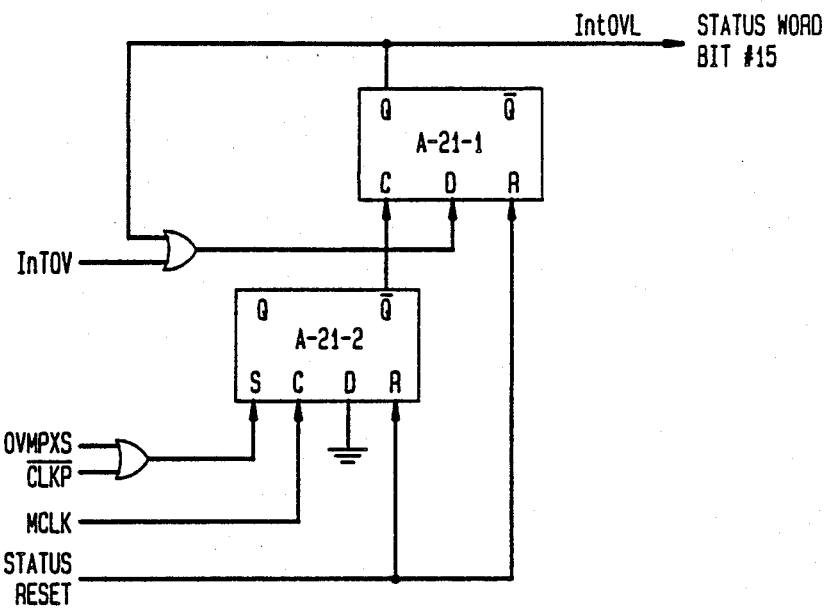
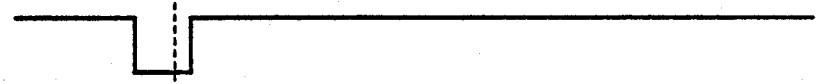
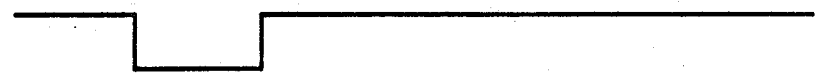
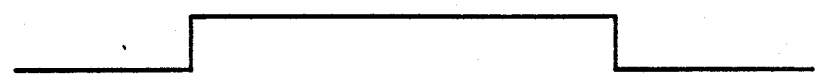
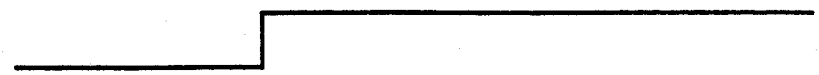

SIGN STATUS LATCHES

0 = LOW
1 = HIGH
X = DON'T CARE

STATUS AND CONSTANTS REGISTER

COMPLEX ARITHMETIC UNIT

FIELD OF THE INVENTION

The invention relates to electronic data processing apparatus, and more particularly to apparatus for performing high-speed division, multiplication, and magnitude operations on complex numbers.

SUMMARY OF THE INVENTION

The invention is intended for use in the protection of electric power system transmission facilities from disturbances caused by transient phenomena, such as lightning. A lightning strike close to a transmission line can ionize the air, creating an electrical path between the conductors or the conductors and the ground. This is commonly called a fault. If a fault occurs, the very large currents that result must be interrupted quickly to prevent damage to the transmission system components. To do this it is necessary to constantly monitor the voltages and currents flowing in the system to determine the occurrence and nature of any disturbances. If a severe fault condition is detected, corrective action must be initiated within a half cycle of the power system frequency or less. The sooner a fault can be cleared, the less likely the possibility that power system stability and reliability will be affected or that damage or deterioration will occur to the power system components.

U.S. Pat. No. 4,148,047, issued to Arun G. Phadke on Apr. 3, 1979, for "DISTANCE RELAY FOR ELECTRIC POWER TRANSMISSION LINES," discloses an analysis algorithm that may be employed to do the monitoring, employing a combination of discrete Fourier transforms and symmetrical components to determine the type, severity, and location of all disturbances. These mathematical techniques use complex numbers to describe the properties of the electrical quantities involved. When mathematical operations such as division, multiplication, and magnitude are performed with complex numbers, they typically require many steps of software code to complete in a microprocessor. This is especially true if the microprocessor uses software division and multiplication routines. Even if the computer has hardware multiplication and division capability, in microprocessors these are often only firmware implementations of the software routines. Simpler programs result, but the operations still require the same number of clock cycles to complete. In real-time applications the calculations must be completed quickly enough to control or respond to dynamic events. In cases such as power system protection, where very fast response time and extensive calculations are required, even very high speed processors have trouble completing the calculations fast enough to react in the required time. For example, one typical minicomputer has a 250-nanosecond instruction time. Yet even with this processor, some line protection calculations would push the unit to the limits of its capacity.

Cost analysis of the digital computer, as the heart of a power system protection device, has shown that to be cost-effective, multiple protection and supervisory functions must be implemented in the same processor. Clearly, a way is needed to reduce the computation time of the necessary algorithms. The solution is to provide a dedicated auxiliary processor to handle the time-consuming complex number calculations in a more efficient manner. This is a central object of the complex arithmetic unit (CAU) of the present invention.

A further object is to provide a computational architecture that can be applied to one-chip LSI microprocessor systems to replace a minicomputer. Available microprocessors are generally too slow for these applications. It is an object of the invention to provide additional computing power so as to make them usable in power system applications.

As described, the invention has, among others, the following significant features:

1. The architecture of the device as a microprogrammable arithmetic processor.

2. The use of a parallel scaling register whose input is directly controlled by the magnitude of its input quantities to achieve a good compromise between speed and accuracy, which provides internal scaling to prevent excessive loss of accuracy from truncation errors, but which avoids time-consuming serial shift registers.

3. The concept of a microprogrammed peripheral device that can be tailored to perform specialized calculations for a microprocessor at very high speed.

4. The capability of beginning calculations with some of the input data while more data are being acquired.

5. The use by the internal clocking system of external data strobing pulses to generate a clock signal in synchronism with the data transfers to and from the host computer. In particular, the system creates two internal system cycles for each cycle of the external strobe by using the rising and falling edges of the strobe to initiate clock cycles.

The disclosed embodiment of the CAU includes a commercially available, very high speed multiplier, for example the TRW Model TDC 1010J, which can multiply two 16-bit words and produce a 32-bit result in less than 155 nsec. This multiplier (hereinafter the "TRW") also includes product accumulation; that is, succeeding products can be added to or subtracted from the contents of the output register. In the alternative, the accumulation function can be disabled. Initial output data can be preloaded directly into the output registers.

The system architecture of the CAU further includes two parallel I/O ports to transfer the data to and from the host processor, for example the Plessey MIPROC 16 (hereinafter the "MIPROC"), read-write (RAM) memory to store intermediate calculations, automatic data scaling registers, error sensing, and read-only memory (ROM) which stores the microprogramming of the system.

The MIPROC has two parallel I/O ports adapted to carry 16-bit data signals, DATA STROBE OUT A and B control signals, and a number of other operation-selecting and handshaking signals. One port carries output to the CAU, and the other accepts input from the CAU.

The outputs of the CAU also include, in addition to the results of computations, error flags and the states of some internal scaling factors. Error flags may indicate, for example, that an incorrect output has been computed; this would occur if an input or intermediate calculation was smaller than the system's algorithms permit, if an unprovided-for overflow occurred, or if a division by zero took place. The state outputs are for diagnostic purposes, permitting the programmer to monitor the operation of the algorithms for debugging and program modification.

The system has three calculations in its microcode, and others could be added. The functions implemented in the disclosed embodiment are as follows.

(1) Complex Division—The host sends the CAU the real and imaginary components of the numerator and the denominator. The CAU then calculates:

$$Qr+jQi=[(Nr+jNi)/(Dr+jDi)]*[(Dr-jDi)/(Dr-jDi)]=[1/(Dr^2+Di^2)]*[(NrDr+NiDi)+j(NiDr-NrDi)].$$

The CAU does not include a hardware division capability, so the reciprocal of $Dr^2+Di^2$ is calculated by two iterations of the Newton-Raphson algorithm, using only the multiplying and accumulation feature of the multiplier. The system does not allow for a full floating-point calculation because of the time and hardware complexity required, so to gain acceptable accuracy, a combination of fixed and data-dependent scaling factors is included in the hardware to adapt the data to the algorithm. The scaling is done by sensing the bits of a data word in parallel, to avoid the delays associated with serial shift registers. When the calculations are complete the status of the calculations (which includes error flags and the states of some internal scaling factors) and the real and imaginary quotients are made available to the host via a parallel port.

(a) CAU Division Algorithm

The only mathematical operations available in the commercial multiplier are multiplication, and addition and subtraction of products. To perform division the CAU employs the Newton-Raphson algorithm, an iterative technique for division that converges very quickly and only requires the available mathematical operators. Properly applied it doubles the number of significant digits each time it is applied.

Multiplying the numerator and the denominator of a complex division by the complex conjugate of the denominator gives the following solution:

$$Qr+jQi = \frac{Nr+jNi}{Dr+jDi} * \frac{Dr-jDi}{Dr-jDi} =$$

$$\frac{1}{Dr^2+Di^2} * [(Nr*Dr+Ni*Di)+j(Ni*Dr-Nr*Di)].$$

The result has now been reduced to a series of multiplications and additions with only one division, namely to evaluate the reciprocal of the denominator $(Dr^2+Di^2)$, which is also referred to herein as D.

The basic formula of the algorithm for calculating this denominator is as follows:

$$1/D_2 = 2*LU - D*LU^2$$

In this formula, D is the denominator $(Dr^2+Di^2)$ of which the reciprocal is to be calculated, LU is the starting value of the reciprocal from a PROM lookup table, and $1/D_2$ or $1/D_3$, etc., is a new approximation after an iteration. The steps are:

(1) Obtain an initial estimate of 1/D from the lookup table:

$$1/D_1 = LU$$

(2) Form a second estimate of 1/D:

$$1/D_2 = 2*LU - D*LU^2.$$

(3) The algorithm is then iterated one more time to calculate a value $1/D_3$, for greater accuracy, with $1/D_2$ being substituted for LU, i.e.:

$$1/D_3 = 2*1/D_2 - D*(1/D^2)$$

A final result with approximately 16-bit accuracy could be obtained with one iteration and an initial lookup value having 8 bits, if full floating-point calculation were provided, and if the input quantity $(Dr^2+Di^2)$ were between $\frac{1}{2}$ and 1, for fastest convergence. However, this input range does not necessarily hold true in all applications, and hardware complexity and time constraints make the use of full floating-point calculations impracticable, so the following modifications to the basic algorithm are employed:

(1) Two lookup tables containing initial values for the reciprocal that use the upper byte of the denominator if the upper byte is not zero, or the lower byte if the upper byte is zero, as addresses to the lookup table.

(2) Two ranges of denominator scaling, determined by whether the upper byte is zero, to reduce the truncation errors that occur with small denominators.

(3) Two ranges of numerator scaling to improve the final quotient by reducing the truncation errors that occur with small numerators.

(4) Twelve-bit lookup entries instead of the 8-bit entries that would be satisfactory otherwise.

(5) Two iterations of the algorithm.

(b) CAU Complex Division Cycle (1)

The CAU division mode is chosen by the state of control lines from the MIPROC parallel output port. The MIPROC sends the Numerator Real, the Numerator Imaginary, the Denominator Real, and the Denominator Imaginary to the CAU. As the CAU receives the data it stores the values in the RAM and starts to calculate the Numerator Real of the Quotient (NrQ):

$$NrQ = Nr*Dr + Ni*Di$$

After this value is clocked into the 32-bit TRW P output, the value is provided to the DMPX, and the overflow sensor is tested for overflow according to case F of the DMPX.

Case F is equivalent to multiplying the full 32-bit TRW P output by 0.002H, that is, shifting 11 bits right and then treating the most significant 16 bits of the result as the numerator; in effect, disregarding the 5 most significant bits. Testing for overflow in this situation means testing to see whether any significant data bits (i.e., leading bits not equal in value to the sign bit; zero if positive, 1 if negative) would be lost if the first 5 bits were disregarded. The CAU also tests the extended output bits 32-34 of the TRW; however, since these bits should never contain significant data, they will be disregarded in the following discussion.

If there is no overflow, the NrL latch is set and the DMPX remains in case F. If there is overflow, the NrL latch is cleared and the DMPX changes to case E, which treats the most significant 16 bits of the TRW P output as the numerator.

The calculated and scaled Numerator Real is then stored in the RAM at address 6. When the datum is written into the RAM, the sign of the value is stored in the Re sign latch associated with RAM address 6, and the actual setting or clearing of the NrL latch referred to above takes place. The Re sign latch further controls a polarity bit in the output status word.

(2)

The CAU next calculates the Denominator D:

$$Den = Dr*Dr + Di*Di.$$

In the first iteration of the algorithm, after the Denominator is calculated, if the upper 8-bit byte of the most significant product (MSP) portion of the TRW P output is not zero, the ZLATCH is cleared and the DMPX is set to case E. The address for the Lookup PROM is then bits P30–P23, i.e., the highest 8 bits of the most significant product excluding the sign bit (bit 31).

If the upper byte of the most significant product of the TRW P output is zero, the ZLATCH is set and the DMPX is changed to case A. Case A is equivalent to multiplying the full 32-bit TRW P output by 0.004H, i.e., shifting 10 bits right and then treating the most significant 16 bits of the result as the denominator in the succeeding calculations. The address of the Lookup PROM is then bits P23–P16, i.e., the lower byte of the most significant product.

Continuing the first iteration of the algorithm, the Denominator is written to RAM and clocked into the TRW X input, and the Lookup output value from the Lookup PROM is clocked into the TRW Y input. The Lookup output value from the look PROM represents the starting approximation of the reciprocal of the denominator D. The product of the Lookup and the scaled denominator (Case E or Case A, according to the ZLATCH setting) is scaled by the DMPX in case A and again multiplied by the Lookup. The result is stored in the TRW P output. The numerical Division constant (here 1000H) is multiplied by the Lookup and the result is sent to the TRW P output where the previous calculation is subtracted from it. The result is scaled by the DMPX in case F. This is the end of the first iteration of the divide algorithm:

$$1/D_2 = (LU * 1000H - LU^2 * (D * Scale) * 0.004H) * 0.002H.$$

In the second iteration, this value $1/D_2$ is substituted for the Lookup value LU in the above formula and the cycle is repeated. The result of the second iteration is the final calculated reciprocal of the Denominator, which is stored in the RAM.

(3)

The calculated Numerator Real and the reciprocal are now read from the RAM and multiplied. Depending on the states of the NrL and the ZLATCH the DMPX scales the Quotient Real as follows:

| NrL | ZLATCH | DMPX CASE | SCALE |
|---|---|---|---|
| 1 | 1 | A | TRW P output * .004H |
| 1 | 0 | E | TRW P output * .0001H |
| 0 | 1 | C | TRW P output * .08H |
| 0 | 0 | F | TRW P output * .002H |

The Quotient Real is stored in the RAM at address 4, which clears the Re Ov flag if no overflow occurred and sets it if overflow did occur.

(4)

Using the original input data stored in the RAM, the CAU calculates the Numerator Imaginary of the Quotient (NiQ):

$$NiQ = Ni*Dr - Nr*Di.$$

After this value is clocked into the TRW P output, the overflow sensor is tested for overflow according to case F of the DMPX. If the result does not overflow, the NiL latch is set and the DMPX remains in case F. If there is overflow, the NiL latch is cleared and the DMPX changes to case E. The calculated Numerator Imaginary is then stored in the RAM at address 7. When the datum is written into the RAM, the sign of the value is stored in the Im sign latch and the actual setting or clearing of the NiL latch referred to above takes place. The Im sign latch further controls a polarity bit in the output status word.

(5)

The calculated Numerator Imaginary and the reciprocal are read from the RAM and multiplied. Depending on the states of the NiL and the ZLATCH the DMPX scales the Quotient Imaginary according to the same scale factors used in calculating the Quotient Real. The Quotient Imaginary is stored in the RAM at address 5, which clears the Im Ov flag if no overflow occurred and sets it if overflow did occur.

The CAU Status Word then is written into the RAM. The Status Word, the Quotient Real, and the Quotient Imaginary are sent to the MIPROC.

(2) Complex Multiplication—The host sends the CAU the real and imaginary components of the numbers to be multiplied. The CAU then calculates:

$$Pr + jPi = (Ar + jAi)*(Br + jBi) = (ArBr - AiBi) + j(AiBr + ArBi).$$

When the calculations are complete the status of the calculations (which includes error flags and the states of some internal scaling factors) and the real and imaginary products are made available to the host via a parallel port.

(3) Magnitude—The host sends the real and imaginary parts of the quantity for which the magnitude is required, sending the larger of the two first. The CAU then calculates the ratio of the smaller to the larger by means of the division algorithm and uses it as a factor to determine the address in a lookup table that contains approximations of the magnitude divided by the larger input quantity. The lookup value is then multiplied by the larger of the inputs to restore the scale. When the calculations are complete the status of the calculations (which includes error flags and the states of some internal scaling operations) and the magnitude are made available to the host via a parallel port.

(a) CAU Magnitude Algorithm

The magnitude of a complex quantity is normally expressed and calculated as follows:

$$M = (L^2 + S^2)^{\frac{1}{2}} \tag{1}$$

where L and S are defined respectively as the larger and smaller of the real and imaginary parts of the complex number; that is, the form of the complex number is either $L+jS$ or $S+jL$. Since the square root function is not available in the CAU, it is replaced by available functions, as follows:

$$M/L=(L^2+S^2)^{\frac{1}{2}}/L \quad (2)$$

$$M/L=(L^2/L^2+S^2/L^2)^{\frac{1}{2}} \quad (3)$$

$$M/L=(1+S^2/L^2)^{\frac{1}{2}} \quad (4)$$

Now let $M/L=E$. Then equation (4) becomes $$E=(1+S^2/L^2)^{\frac{1}{2}} \quad (5)$$

The system provides a PROM lookup table containing k entries, which is an array of estimates of the quantity $E=M/L$. The addresses of the entries in the table are given by $$A=\text{INT}(k*S/L) \quad (6)$$

Since $0 \leq S/L \leq 1$, each value of $S/L$ in the table results in a distinct address value $0 \leq A \leq k$. Thus, for a given value of $S/L$, a corresponding value of $E=M/L$ is found in the table.

The entries in the table are calculated according to the formula $$E(A)=(1+[R(A)]^2)^{\frac{1}{2}}, \quad (7)$$

where $$R(A)=[A/2+(A+1)/2]/k, \quad (8)$$

the latter formula being used to reduce the truncation errors that are caused by the discrete nature of the lookup table. Thus, the only division required is to calculate the address A from the input data S and L. Square root calculations are required only when the table is generated.

Once the address A is used to obtain a value of E from the table, the table entry is multiplied by the original L and scaled to yield the magnitude:

$$M=E*L \quad (9)$$

$$M=[(L^2+S^2)^{\frac{1}{2}}/L]*L \quad (10)$$

$$M=(L^2+S^2)^{\frac{1}{2}} \quad (11)$$

The present invention, as well as further objects, features, and advantages thereof, will be understood more fully from the following description of an illustrative embodiment, when read with reference to the accompanying drawings.

BRIEF DESCRIPTION OF THE DRAWINGS

FIG. 36 is a schematic diagram internal overflow latch 332 of FIG. 28;

DETAILED DESCRIPTION

In the present specification, underlining or italics will be used to indicate signals that follow the negative logic or "active low" convention. In the Figures, overscoring will be employed as is conventional.

The Figures and Tables herein also employ conventions to indicate terminals and connection points. A terminal designation in one drawing such as "C25-3" indicates that the given line is connected to pin 3 of chip C25, which may be found in another drawing. Each chip in the schematic diagrams has such a designation. On the other hand, a connection designation such as "2A4" in a rectangle indicates that the given line is connected to terminal 4 of row A of an edge connector designated "A" that was used in the assembly of the laboratory version of the invention. Although the actual physical structure of the laboratory CAU is not shown, a full understanding of all the electrical connections in the CAU can nevertheless be obtained by tracing the signals through the designated terminals and connection points. A listing of each of the terminals in the two edge connectors A and B and the signals carried thereon is presented in Table 6. Table 7 is a partial listing of terminals elsewhere in the CAU to which the pins of the TRW multiplier 160 are connected. The rest of the relevant connections appear in the schematics.

Figure 1:
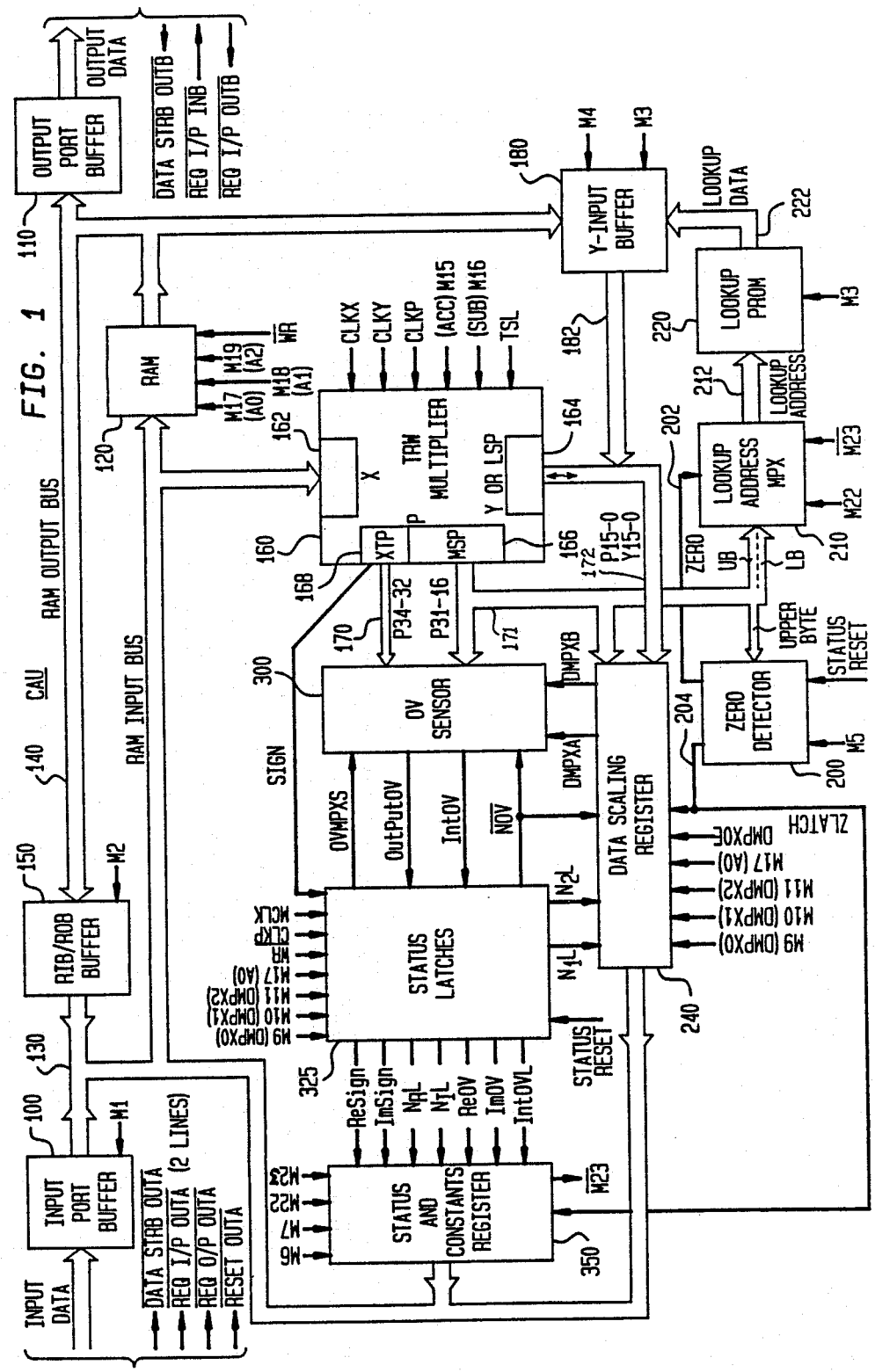
FIG. 1 is a block diagram of the CAU.
Figure 4:
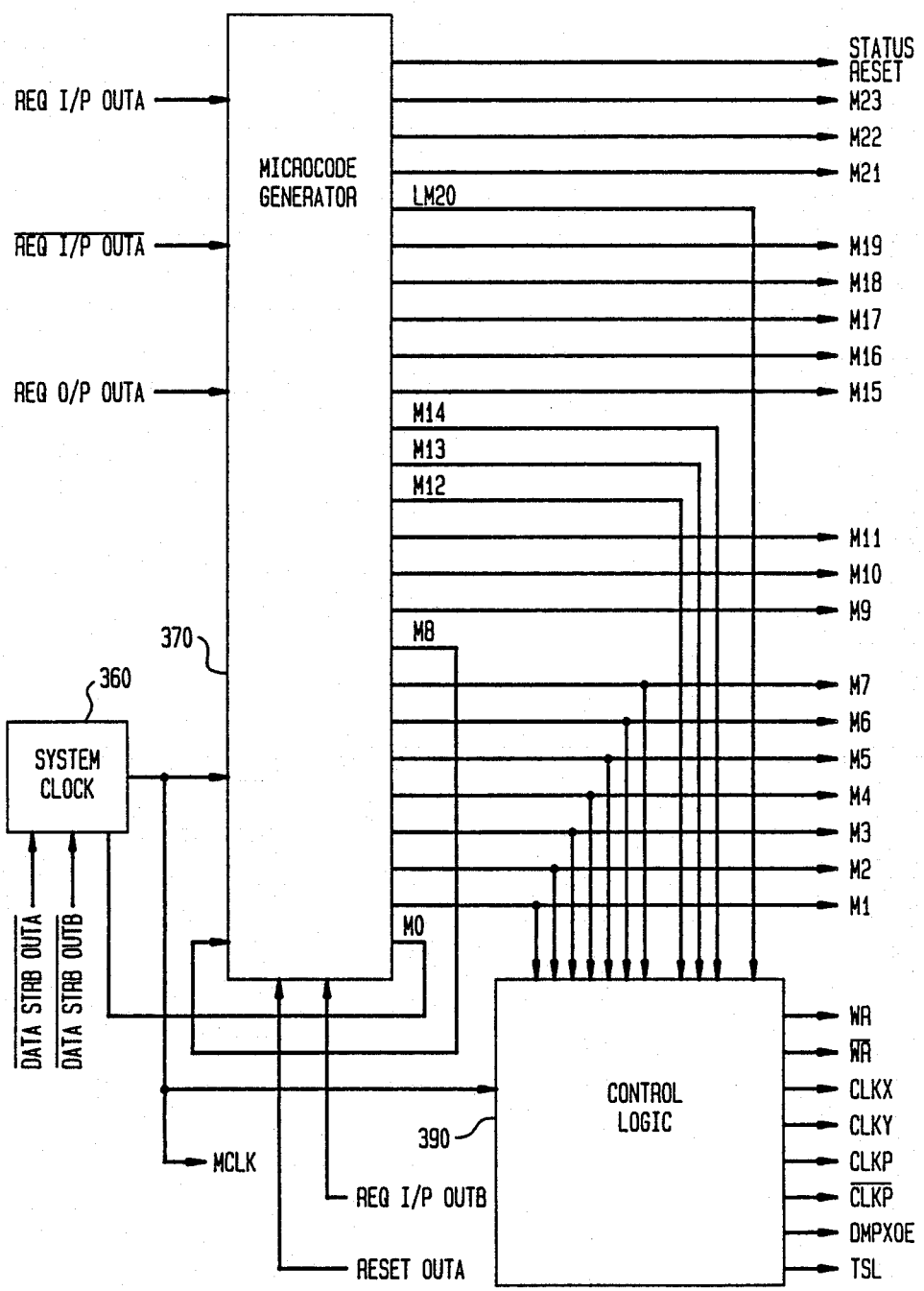
FIG. 4 is a block diagram of the microprogrammed system controller of the CAU.

FIG. 1 is a block diagram of the data-handling components of the CAU, and FIG. 4 is a block diagram of the microprogrammable system controller of the CAU.

As seen in FIG. 4, the microprogrammed system controller of the CAU comprises a system clock 360, a microcode generator 370, and control logic 390.

Figure 5:
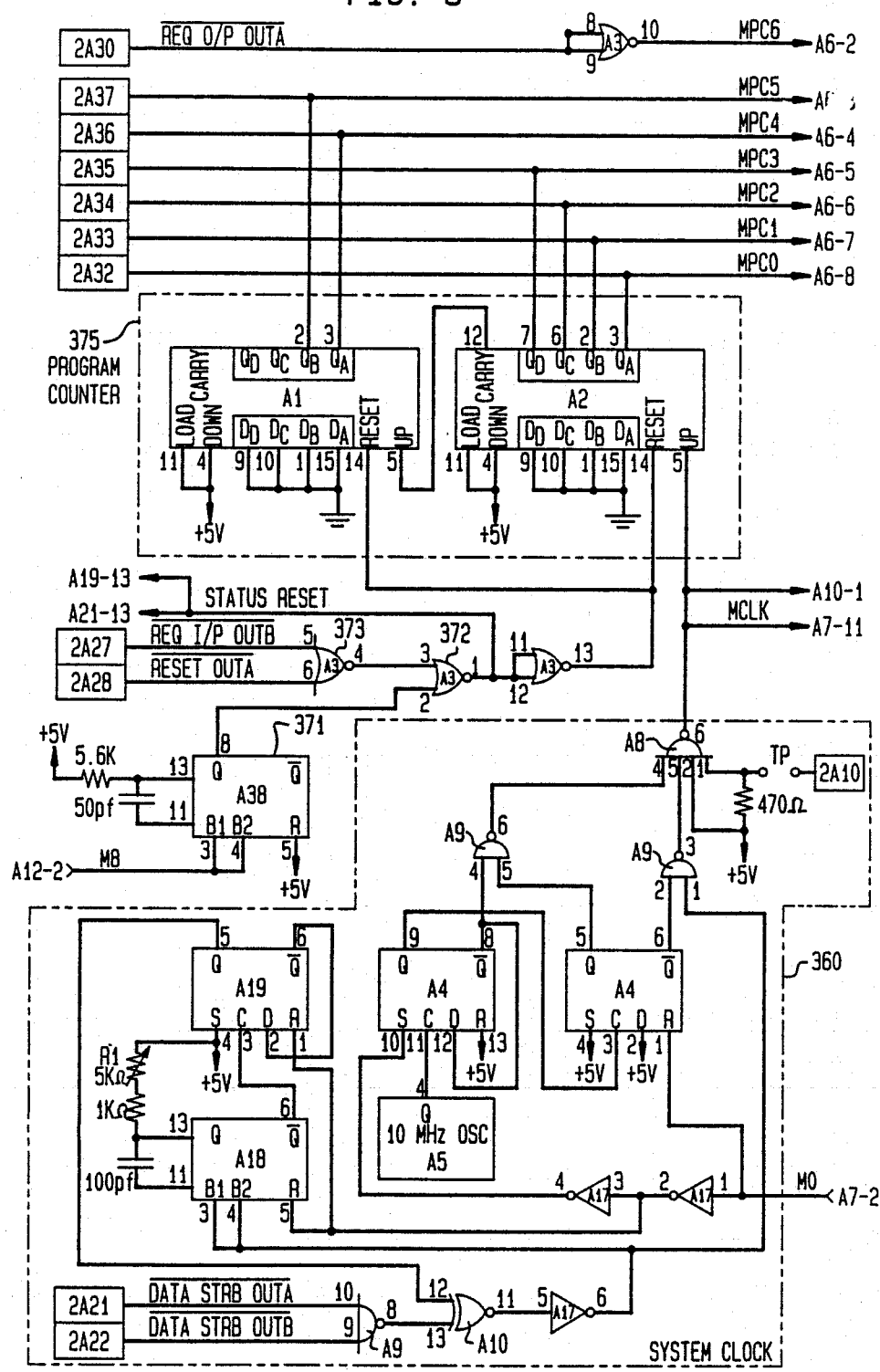
FIG. 5 is a schematic diagram of the system clock of FIG. 4 and the program counter 375 of FIG. 6.

In FIG. 5, the system clock 360 is seen to comprise three 74S74 D-type flip-flops (A4 and A19); a CO238A 10 MHz crystal oscillator A5 (available from Vectron); a 74S20 4-input NAND gate A8; three 74S00 2-input NAND gates A9; a 74122 retriggerable monostable multivibrator A18; a 74S86 2-input EOR gate A10; and three 74S04 inverters A17. The system clock receives the DATA STROBE OUT A and DATA STROBE OUT B control signals from the MIPROC and in response thereto produces the master clock signal MCLK, which is used by the system to advance the current microcode instruction on each positive-going transiton. The source of the MCLK signal is controlled by microcode bit M0. When M0 is 1, the internal 5 MHz clock controls the CAU. When M0 is 0, the DATA STROBE OUT A and DATA STROBE OUT B signals are used, with a CAU cycle being generated for both the negative-going and positive-going edges of the DATA STROBE OUT signals.

Figure 6:
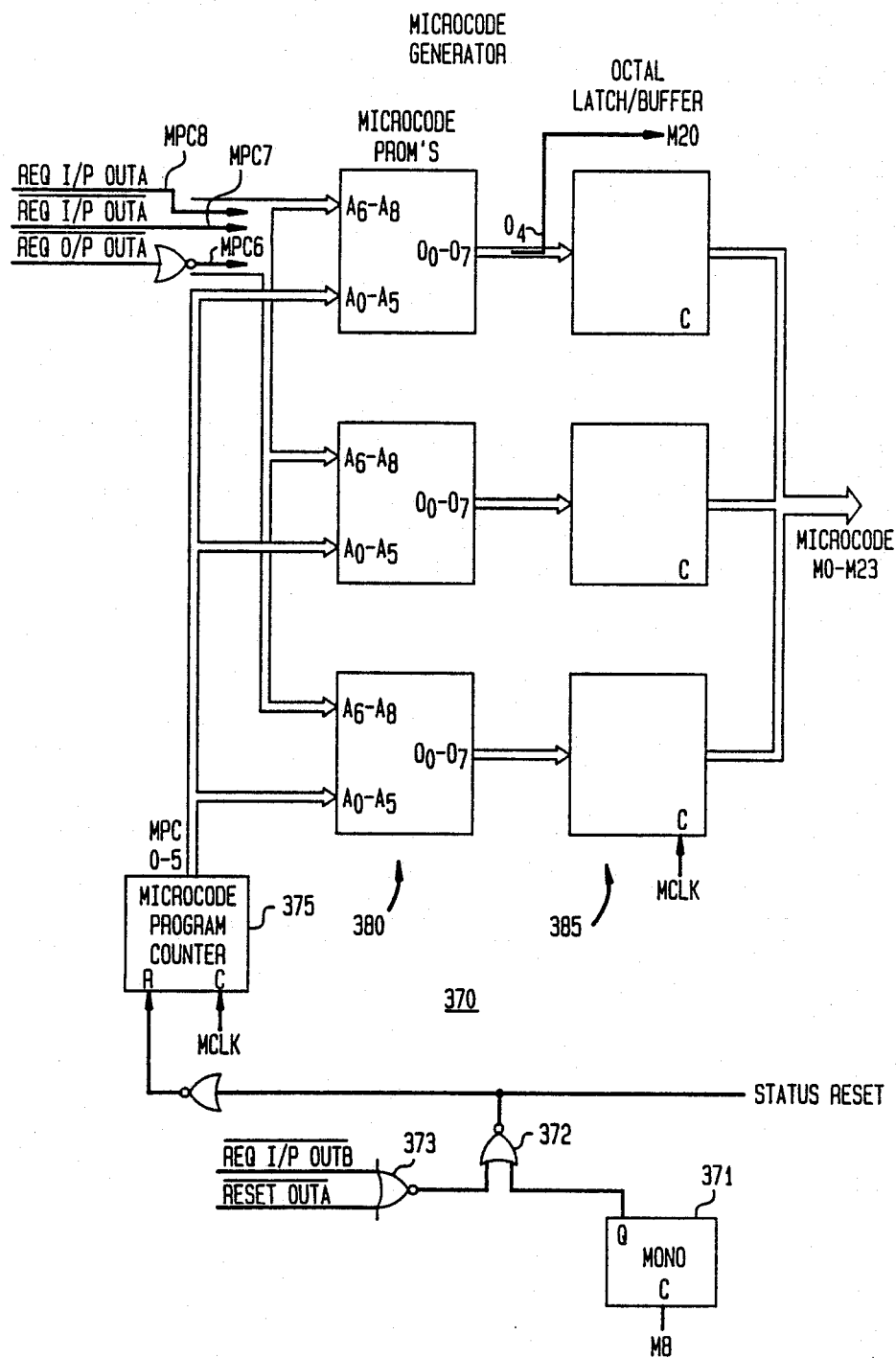
FIG. 6 is a block diagram of the microcode generator 370 of FIG. 4.
Figure 7:
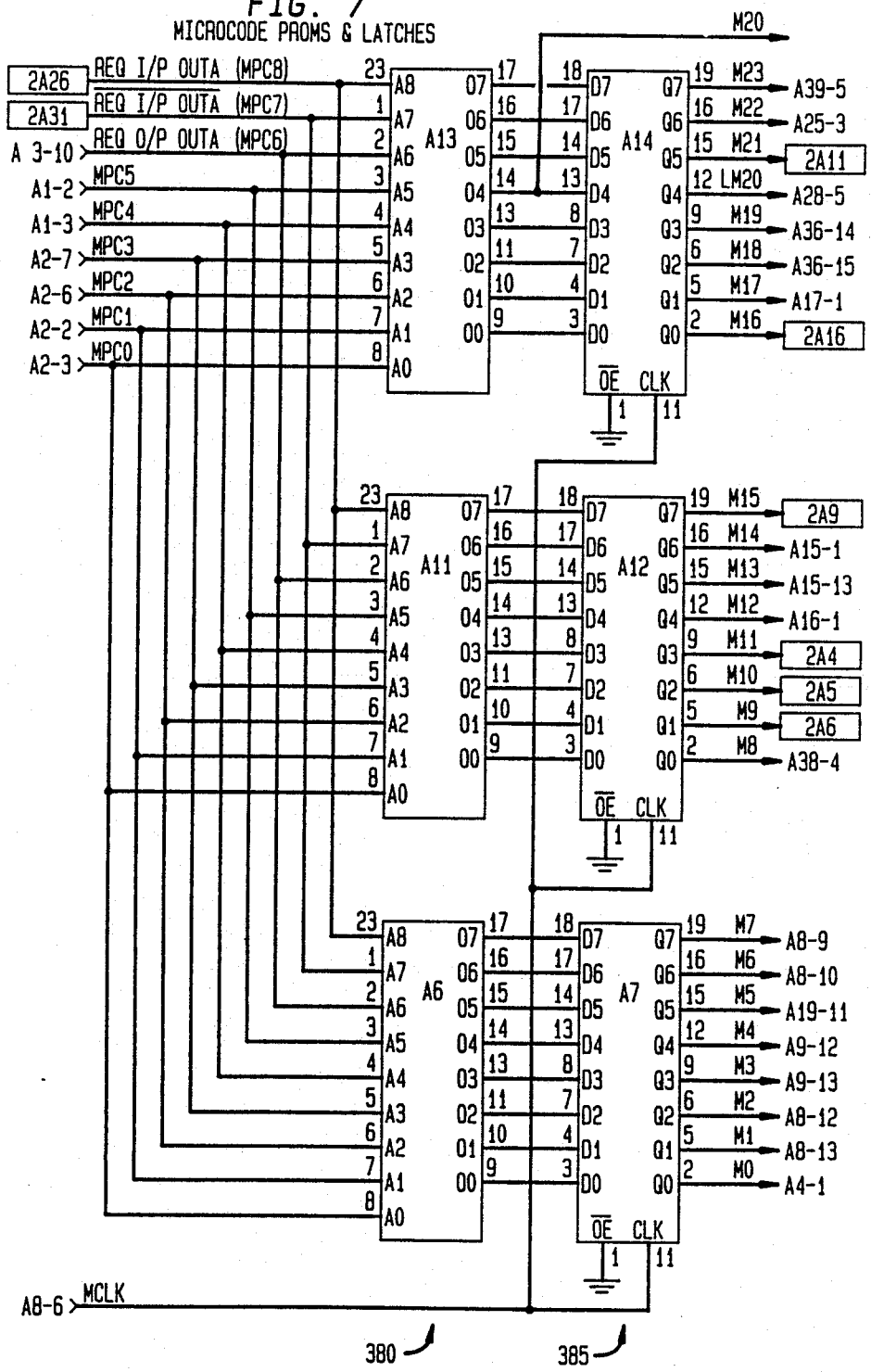
FIG. 7 is a schematic diagram of the microcode PROMs and associated latches of FIG. 6.

FIG. 6 is a block diagram of the microcode generator 370, which is also shown in schematic form in FIGS. 5 and 7. A monostable multivibrator 371 (A38 in FIG. 5) receives microcode bit M8, which resets the system when it goes high, this being the last step in a microcode routine. The output of the multivibrator 371 feeds a NOR gate 372 (A3 in FIG. 5), which also receives the REQ I/P OUT B and RESET OUT A signals from the MIPROC via a NOR gate 373 (also A3 in FIG. 5). The output of gate 372 is the STATUS RESET signal, which resets and re-initializes status and scaling flags when it goes low. The inverted output of the gate 372 is input to the microcode program counter 375, causing it to count up.

In FIG. 5, the gates labelled A3 are 74S02 2-input NOR gates; A38 is a 74122 monostable multivibrator; and A1 and A2 are synchronous binary clock counters.

The binary output of the counter 375 is on lines MPC0–MPC5, which are the lower 5 address bits for the microcode PROMs 380. Additional address bits MPC6–MPC8 are provided respectively by the inverse of the REQ O/P OUT A signal, the REQ I/P OUT A signal, and the REQ I/P OUT A signal. These signals allow selection of the various functions to be performed by the CAU by changing the microcode PROM base address.

The outputs of the microcode PROMs 380 are latched by the microcode latches 385, the latter being clocked by the MCLK signal.

FIG. 7 is a schematic diagram of the microcode PROMs 380 and latches 385, in which A6, A11, and A13 are 3624 PROMs and A7, A12, and A14 are 74LS374 octal D-type flip-flops. As seen therein, the outputs of the latches are microcode bits M0–M19, LM20, and M21–M23. LM20 is microcode bit M20 after latching. An additional output of microcode generator 370 is bit M20 prior to latching. In the disclosed embodiment, signal M20 is not used.

The microprogramming stored in PROMs 380 is seen in Tables 1–3. Table 1 is the microcode for division, which is stored beginning at offset 0080H. Under control of signals MPC0–MPC8 (see FIGS. 5–7) the address signals provided to the microcode PROMs are incremented from the offset 0080H to the offset plus 0037H, thus providing for 56 stored procedural steps. Each step includes a distinct combination of the 24 output signals M0–M23. Signals M0–M11 are shown in Part I of Table 1 and signals M12–M23 are shown in Part II, along with an abbreviated indication of the function of each signal. Similarly, the multiplication microcode is shown in Table 2, consisting of 28 steps beginning at offset 00C0H. Table 3 shows the magnitude microcode, consisting of 43 steps beginning at offset 0100H.

The function of each microcode bit is explained in more detail in Appendix A ("CAU Microcode Description"), which is an integral part of this patent specification.

Figure 8:
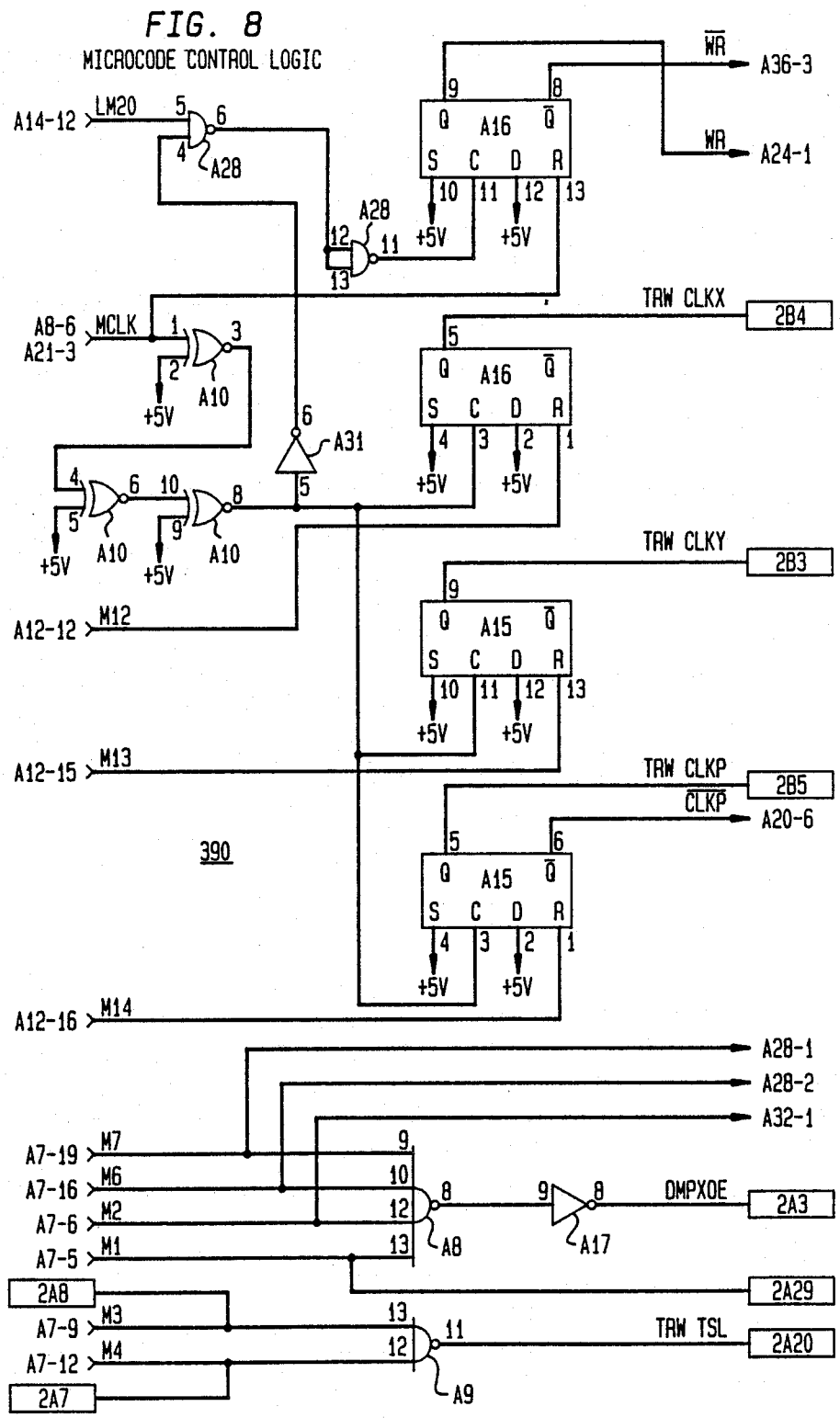
FIG. 8 is a schematic diagram of the control logic of FIG. 4.

Microcode signals M1–M4, M6–M7, M12–M14, and LM20, as well as MCLK, are received by the control logic 390, which is seen in FIG. 8. In FIG. 8, A15 and A16 are 74S74 D-type positive-edge-triggered flip-flops, A8 is a 74S20 4-input NAND gate, A9 and A28 are 74S00 2-input NAND gates, and A17 and A31 are 74S04 inverters, and A10 is a 74S86 2-input EOR gate. The outputs of the control logic 390 are the WR, $\overline{\text{WR}}$, CLKX, CLKY, CLKP, $\overline{\text{CLKP}}$, DMPXOE and $\overline{\text{TSL}}$ signals.

All of the above control signals will be discussed further below.

Figure 9:
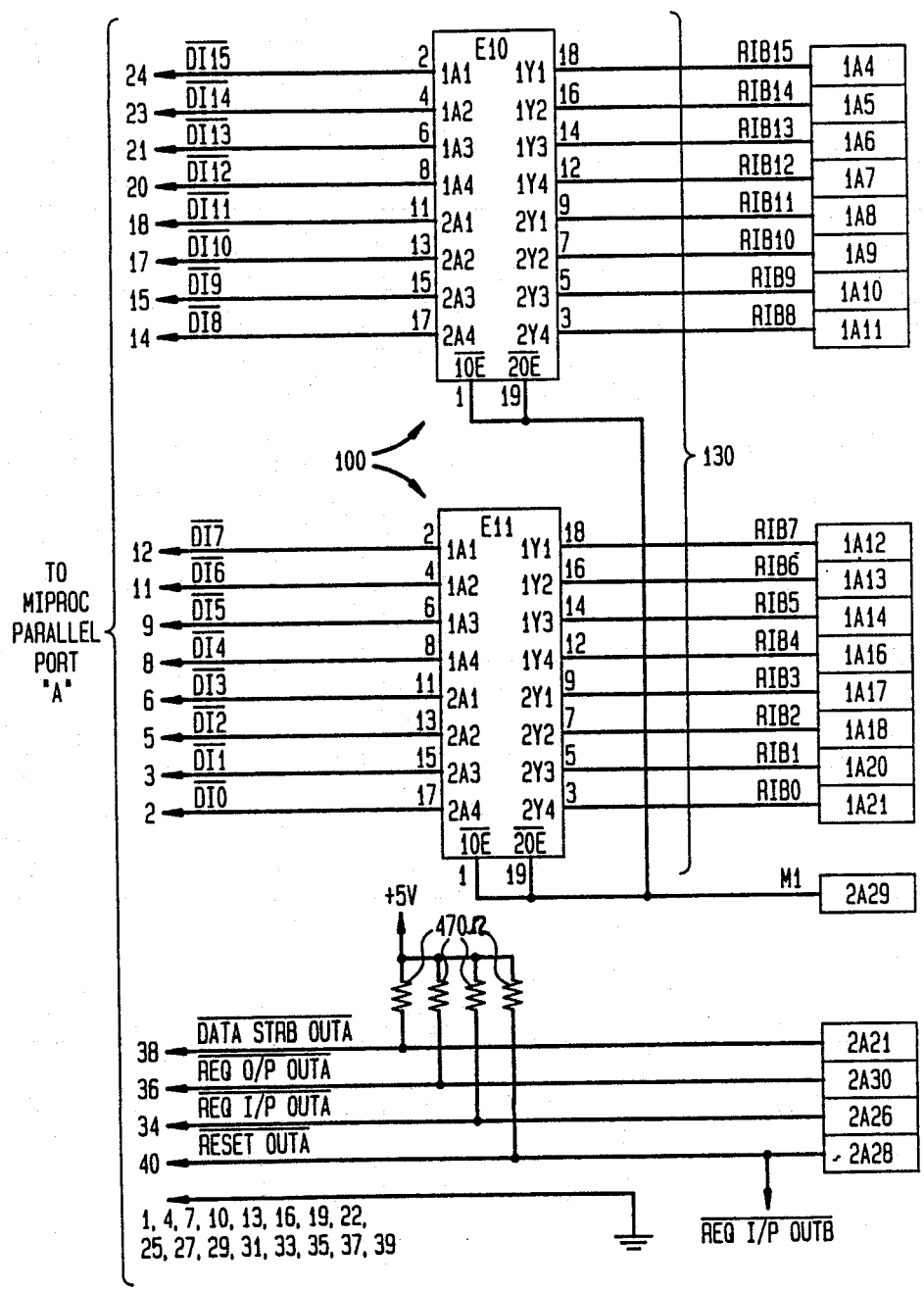
FIG. 9 is a schematic diagram of the parallel input port buffer 100.

Referring to FIG. 1, there is seen an input port buffer 100 (FIG. 9) for receiving data signals, strobe signals, and other handshaking and control signals from the host computer, which in this embodiment is the Plessey MIPROC 16, available from Plessey Microsystems Inc., Gaithersburg, Md. As seen in FIG. 9, the input port buffer 100 includes two 74LS240 octal tristate buffers E10 and E11. The buffers interconnect 16 data input lines DI0–DI15 from the MIPROC and lines RIB0–RIB15 in the RAM input bus 130. The input port 100 receives the following additional signals from the MIPROC: DATA STROBE OUT A, from the MIPROC parallel port A, goes low when the MIPROC writes a datum to the port 100 or reads a datum from it. REQUEST OUTPUT OUT A and REQUEST INPUT OUT A are controlled by software in the MIPROC. In the CAU these are used to control which function the CAU executes by altering the base address in the microcode PROM. RESET OUT A goes low when the MIPROC is reset. In the CAU this signal resets the microcode program counter 375. REQUEST INPUT OUT B is controlled by software in the M1PROC. In the CAU this signal provides a software reset of the microcode program counter 375 when it goes low. The gating of the buffer 100 is controlled by microcode signal Ml, which transfers the state of the data lines to the RAM input bus when it is 0.

Figure 13:
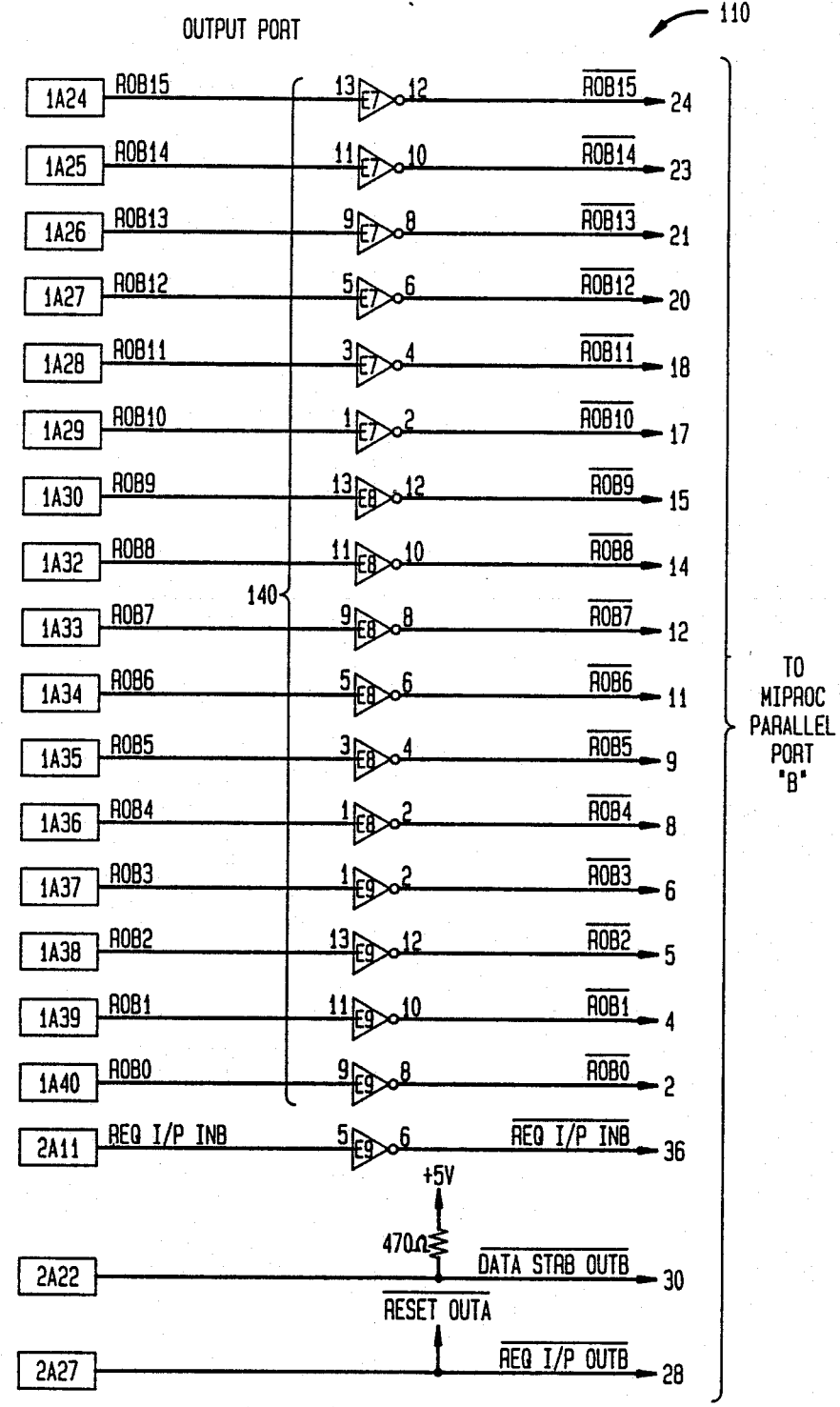
FIG. 13 is a schematic diagram of the parallel output buffer 110.

An output port buffer 110 (FIG. 13) transfers data, strobe, handshaking and control signals to the MIPROC. The buffer 110 includes 16 open-collector inverters on three 74S05 inverter units E7–E9. The buffer 110 transfers 16 data signals ROB0–ROB15 to the parallel port B of the MIPROC. It also delivers the following signals: REQUEST INPUT IN B is sent to the MIPROC parallel port B to signal that the CAU has the results of the most recent calculation. DATA STROBE OUT B is generated by the MIPROC and goes low when the MIPROC writes a datum to the port or reads a datum from it. The buffer 110 also receives the REQUEST INPUT OUT B and RESET OUT A signals described above.

Figure 10:
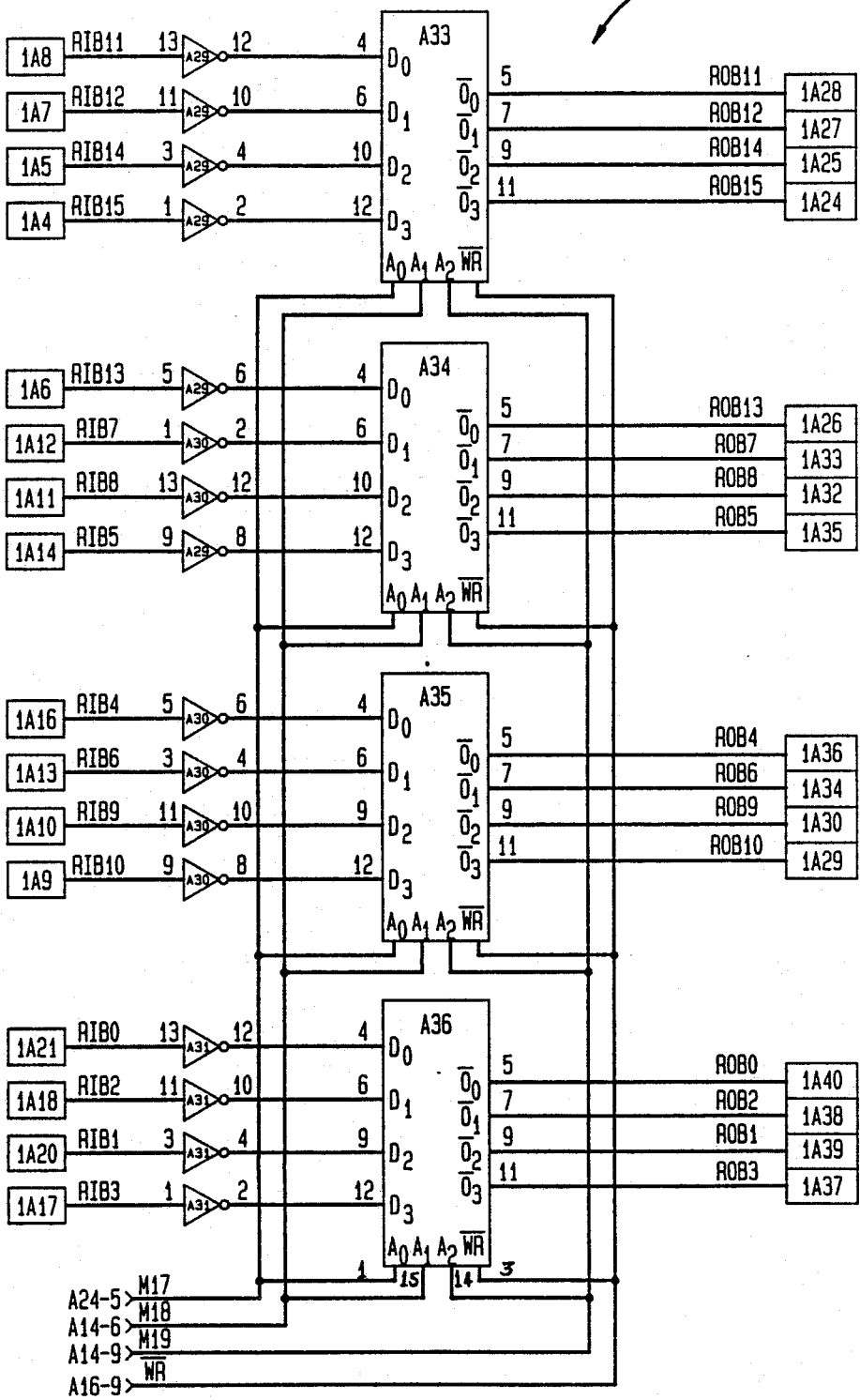
FIG. 10 is a schematic diagram of the RAM 120.

A RAM memory 120 (FIG. 10) stores intermediate input data, intermediate calculations, and output data. The RAM 120 includes four AM27S03/74S189 64-bit RAM memories numbered A33–36. The memories each have 16 4-bit words and have tristate outputs. The outputs are connected to lines ROB0–ROB15 of the RAM output bus 140. The inputs are connected to lines RIB-0–RIB15 of the RAM input bus 130 through 16 74S04 inverters designated A29–31. Addressing is determined by bits M17–M19 from microcode PROM 380. The addresses assigned in RAM for various types of data are set out in Appendix A. A signal WR causes data to be written to RAM when it goes low.

Figure 11:
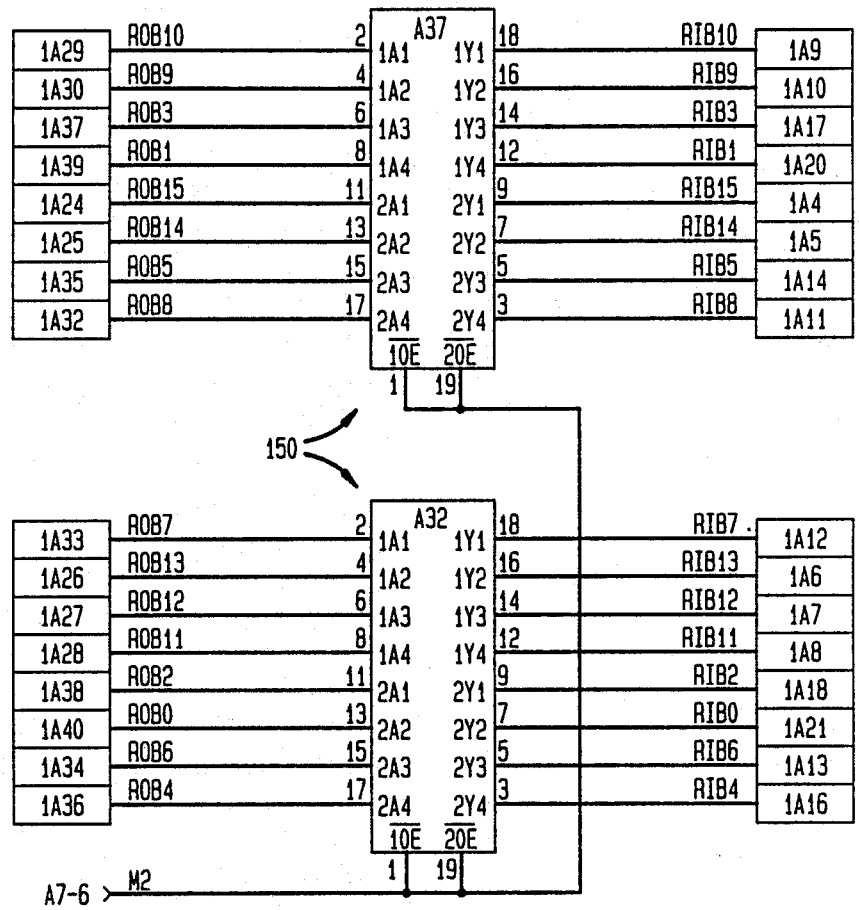
FIG. 11 is a schematic diagram of the data buffer which interconnects the RAM input bus 130 and the RAM output bus 140.

A RAM input bus (RIB) 130 interconnects the input buffer 100, the input to the RAM 120, and other components. A RAM output bus (ROB) 140 interconnects the output port buffer 110, the output from the RAM 120, and other components. A tristate RIB/ROB buffer 150 (FIG. 11) buffers data between the RAM input bus 130 and the RAM output bus 140, and also thereby allows data stored in RAM 120 to be clocked into the TRW X input 162. It includes two 74LS244 octal tristate buffers A32 and A37, which are gated by microcode bit M2 when it goes low.

Figure 2:
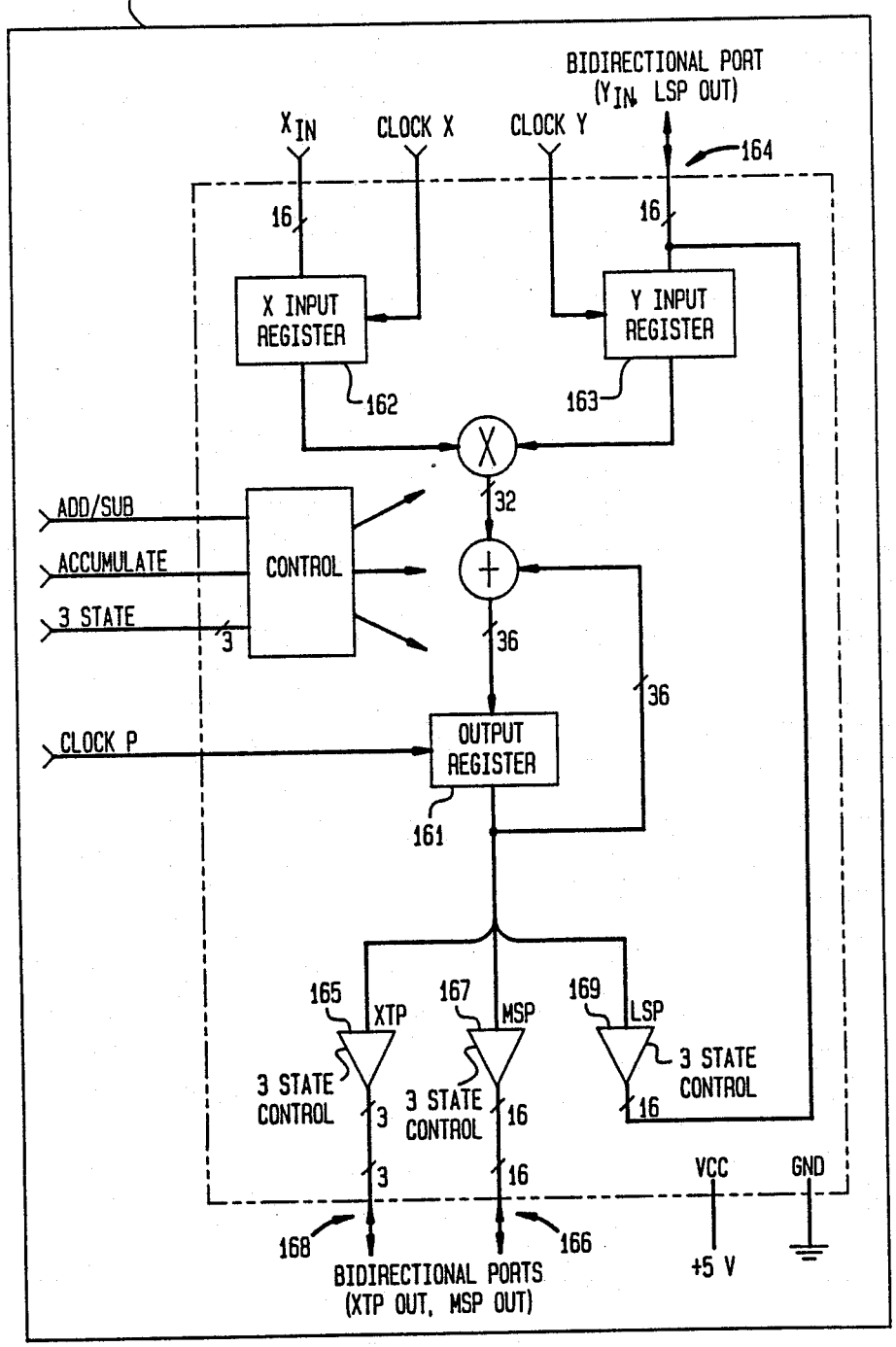
FIG. 2 is a block diagram of the TRW Model TDC 1010J, which is the multiplier 160 in the embodiment of FIG. 1.
Figure 3:
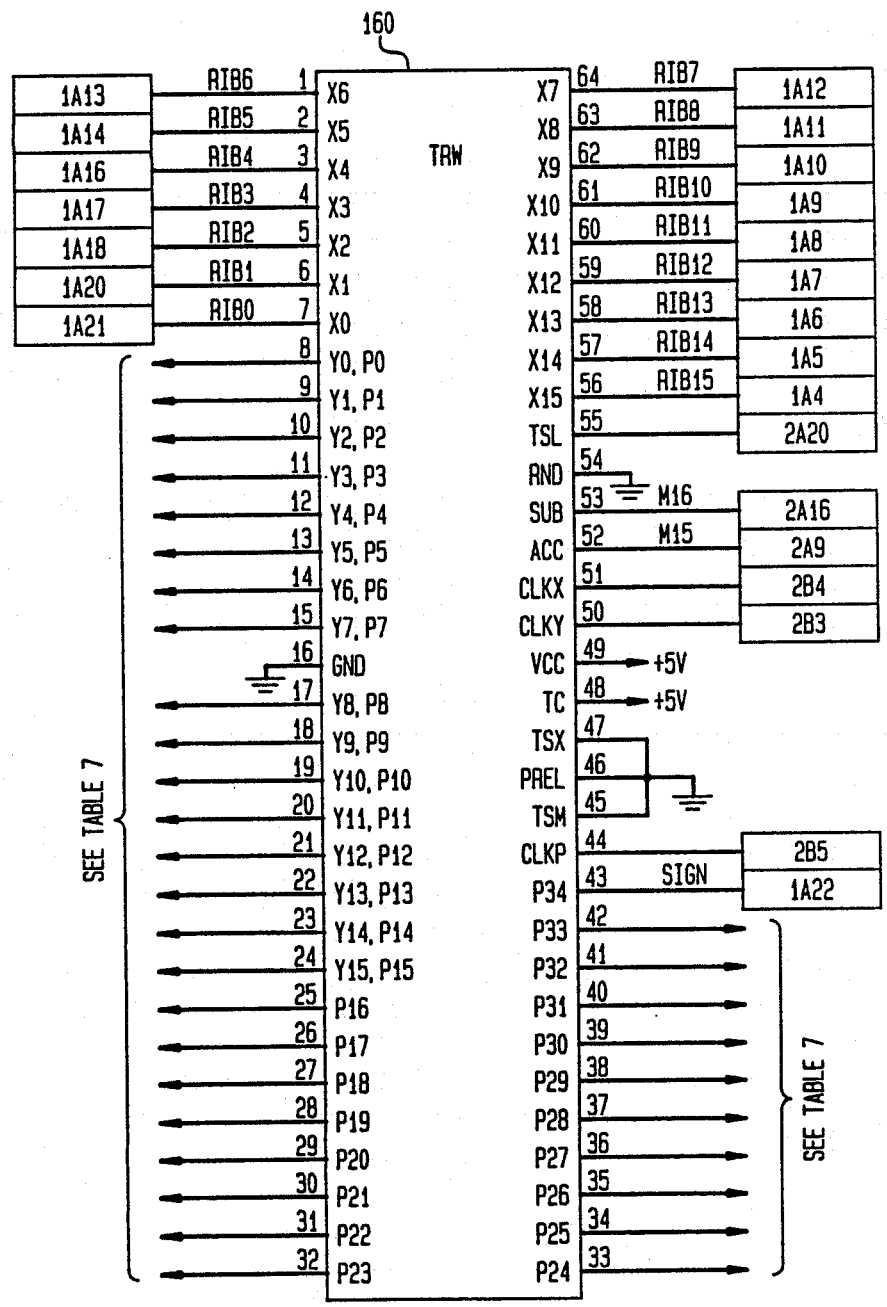
FIG. 3 is a diagram showing connections to the TRW multiplier 160 of FIG. 1.

The computation function is provided by a high-speed multiplier 160, which in this embodiment is the TRW Model TDC 1010J (hereinafter the "TRW"). FIGS. 2 and 3 are, respectively, block and connection diagrams of the TRW 160. Table 7 shows additional connections to the TRW. The TRW 160 has a 16-bit X-input register 162. A CLOCK X signal clocks a data word into the register 162 when it goes high. A bidirectional port 164 serves as both a 16-bit Y-input port for a Y-input register 163 and a Least Significant Product (LSP) output port for the least significant 16 bits (P15-0) of a computed product. A CLOCK Y signal clocks a data word into the register 163 when it goes high. There are two additional output ports: a Most Significant Product (MSP) port 166 for bits P31-16 of a product, and an Extended Product (XTP) port 168 for bits P34-32 of the product. Computed products are stored in an output register 161. A CLOCK P signal clocks a product from the register 161 into an XTP output register 165, an MSP output register 167, and an LSP output register 169. An accumulation control (ACC), when it is high, causes the contents of the output registers to be added to the next product generated, and their sum is then stored back into the output registers at the rising edge of the next CLK P. The ACC signal is loaded into an ACC register at the rising edge of either CLK X or CLK Y.

A subtraction control (SUB), when ACC and SUB are both high, causes the contents of the output registers to be subtracted from the next product generated, and the difference is then stored back into the output registers at the rising edge of the next CLK P. The SUB signal is loaded into a SUB register at the rising edge of either CLK X or CLK Y.

A tristate LSP control (TSL), when high, causes the LSP output register 169 to be at high impedance (output disabled). When TSL is low, the LSP output 169 can be clocked into the output port 164.

Figure 12:
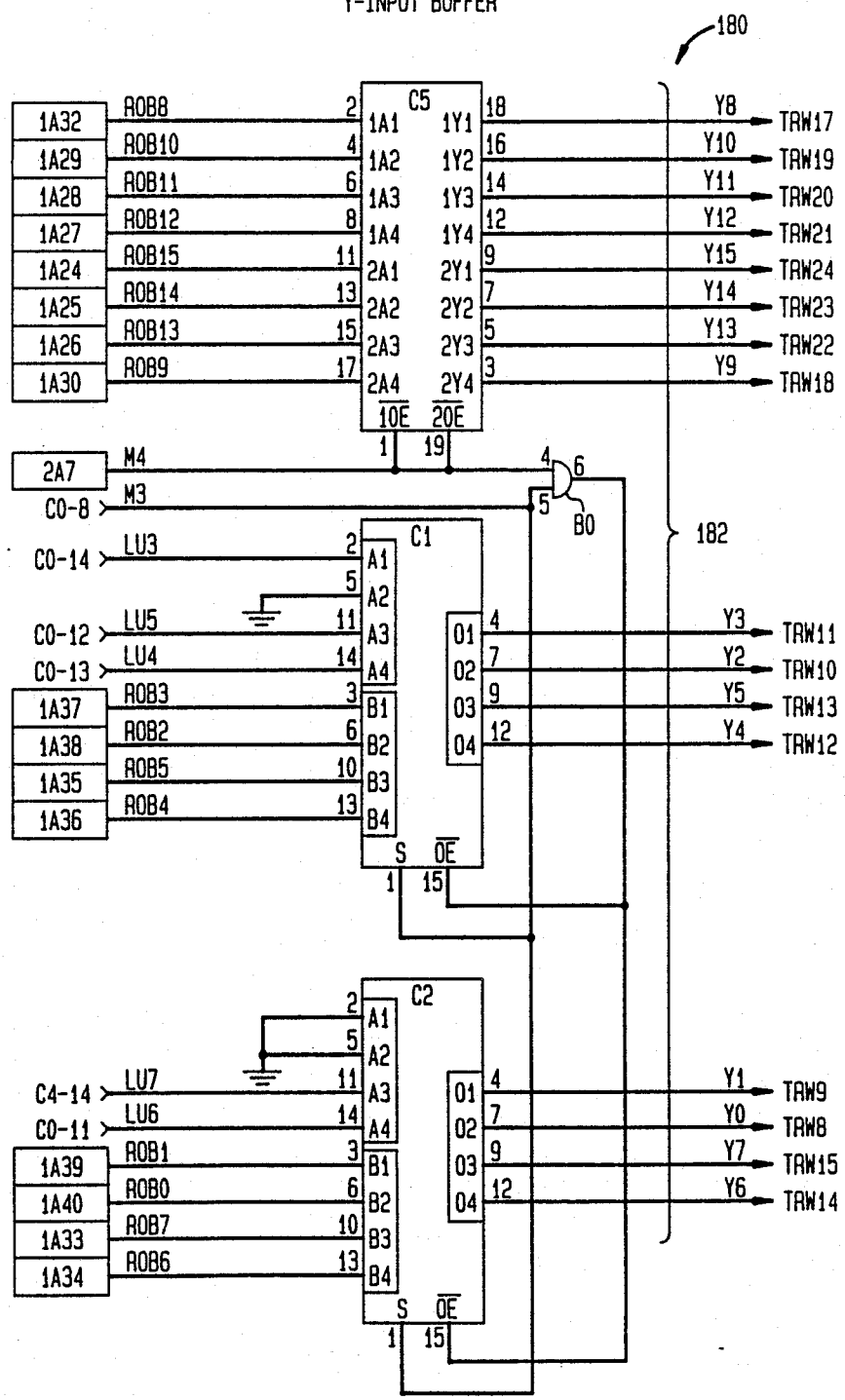
FIG. 12 is a schematic diagram of the Y-input buffer 180 for transferring data to the LSP output 164 of the TRW 160 from the RAM output bus 140 and for transferring lookup data from the lookup PROM 220 to the Y input of the TRW.

A tristate Y-input buffer 180 (FIG. 12) interconnects the Y-input port 164, the ROB 140, and additional sources of input data for the TRW 160. The Y-input buffer includes a 74LS244 octal tristate buffer designated C5, and two 74LS257 2-1 data multiplexers designated C1 and C2. The input to buffer C5 is the upper byte ROB8–ROB15 of the lines in the RAM output bus 140, and its output is the upper byte Y8–Y15 of the input lines to the Y-input port 164. C1 and C2 each have two 4-bit input channels A and B. Channel A of C1 receives bits LU3–LU5 from the output lines 222 of the lookup PROM 220 (see FIG. 18). Channel A of C2 receives bits LU6 and LU7. The remaining three inputs to channel A are grounded. The inputs to the channel B inputs of C1 and C2 are the lower byte ROB0–ROB7 of the RAM output bus 140. The two 4-bit outputs of C1 and C2 together are the lower byte Y0–Y7 of the input lines to the Y-input port 164 of the TRW. The outputs of C1, C2, and C5 together make up bits Y0–Y15 of a Y-input bus 182, which runs to the port 164.

Figure 18:
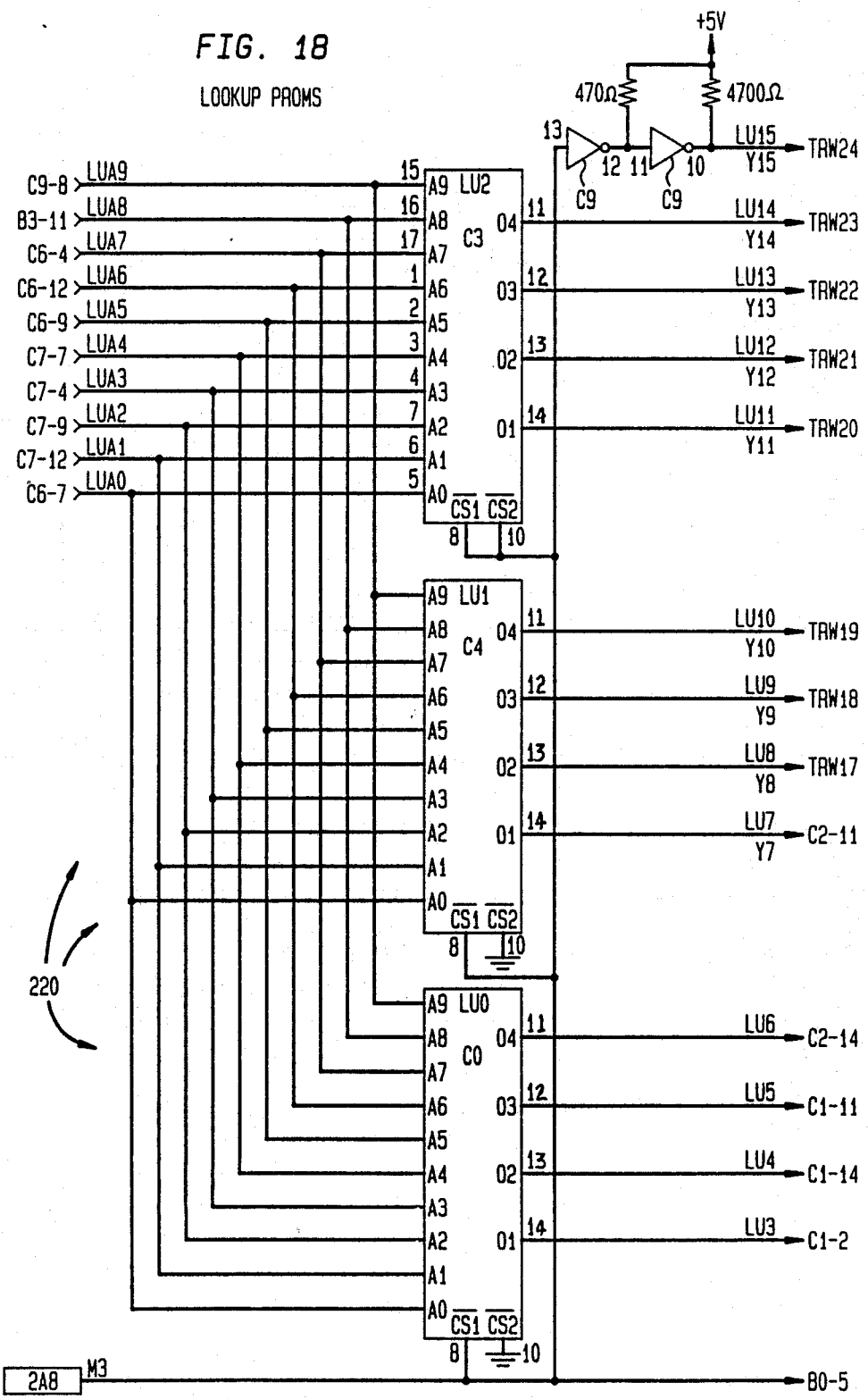
FIG. 18 is a schematic diagram of the lookup PROM 220.

Gating of the Y-input buffer 180 is provided by microcode bits M3 and M4. When both M3 and M4 are high, then the TSL input to the TRW is low (see FIG. 8), which permits the contents of the LSP register 169 to be clocked into the port 164. When M3 is low, channel A of C1 and C2 (i.e. the lower byte of the lookup PROM output), as well as lookup PROM output bits 15–8, are selected to be clocked into the lower byte of the Y input. As will be explained further below in the discussion of the lookup PROM 220, and as seen in FIG. 18, lookup PROM output bits 15–8 are wired directly to the Y-input port 164, the transfer of data taking place when M3 is low. When M3 is high, then Channel B of C1 and C2 is selected. When M4 is low, the ROB 140, which is made up of the inputs to C5 and of the Channel B inputs to C1 and C2, is provided to the TRW Y-input.

Figure 14:
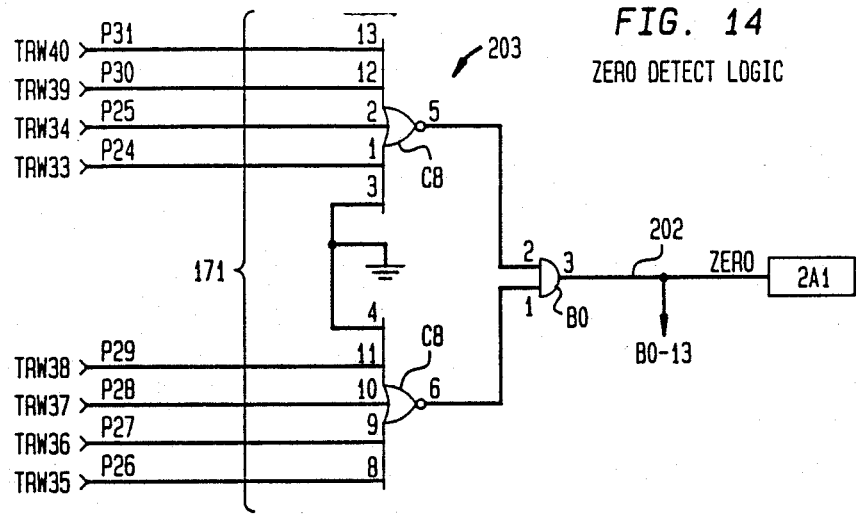
FIG. 14 is a schematic diagram of the zero detect 200 logic 203.
Figure 15:
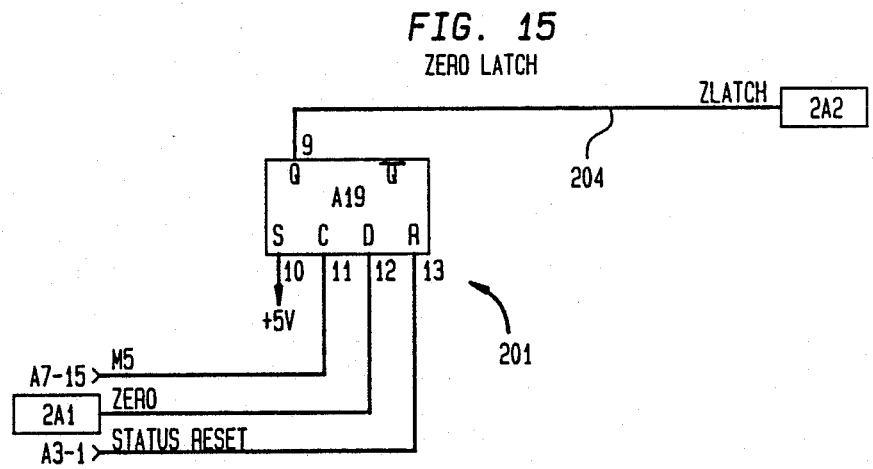
FIG. 15 is a schematic diagram of the zero detector of FIG. 1.

Referring again to FIG. 1, the zero detector 200 includes zero detect logic 203 (FIG. 14), which receives the upper byte (bits P31-24) of the MSP output 166 on an MSP output bus 171 and produces a logical high "zero" signal on a line 202 whenever all of the bits are zero. In FIG. 14, C8 is a 74S260 5-input NOR gate and B0 is a 74S08 2-input positive AND gate. As seen in FIG. 15, a zero latch circuit 201 is provided to output a latched zero signal ZLATCH on a line 204 when microcode signal M5 goes high. The latch circuit 201 includes a latch A19 which is a 74S74 D-type positive-edge-triggered flip-flop.

Figure 16:
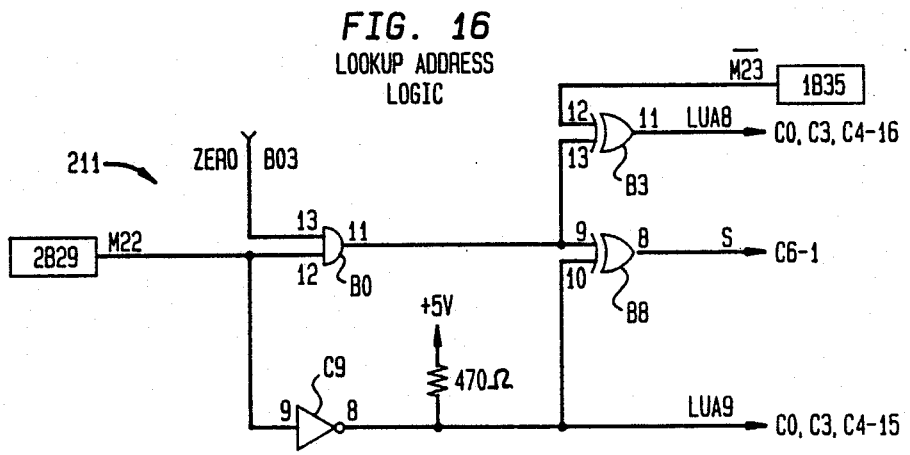
FIG. 16 is a schematic diagram of the lookup address logic 211.

An address multiplexer 210 receives bits P30-P16 of the MSP output 166 of the TRW on the MSP output bus 171. The MSP output is the source of the address 212 for the lookup of mathematical factors in PROM 220. Normally bits P30-P23 of the MSP output are used as the address of the portion of PROM 220 containing the first approximation of a reciprocal. However, if the 8 bits of the upper byte are all zero, then the zero signal causes the lower byte P23-P16 to be used. Lookup address logic 211 (FIG. 16) receives the zero signal, and in addition receives microcode signals M22 and M23. Bit M22 is 1 for division. It is set to zero during the portion of the magnitude calculation that requires the division constant to be changed from 1000 H to 2000 H and the lookup PROM address to be shifted to the block of PROM memory containing magnitude data. In FIG. 16, B0 is a 74S08 2-input positive-AND gate, B3 and B8 are 74LS86 2-input EOR gates, and C9 is a 74S05 inverter. Signal M23 is always zero in this embodiment (see Tables 1-3). It could be set to 1 to provide additional lookup addresses for additional types of calculation.

In response to these signals, the lookup address logic 211 (FIG. 16) generates a select signal (S), which determines whether the "upper" (S=0) byte or lower (S=1) byte of the MSP output will be used as the PROM address. In this context, the term "upper byte" refers to MSP output bits P30-P23, and thus includes the most significant bit P23 of the lower byte P23-P16. The sign bit P31 is not used. Since P31 always zero, using P31 would cut in half the number of available addresses in lookup PROM 220 that could be used.

Figure 17:
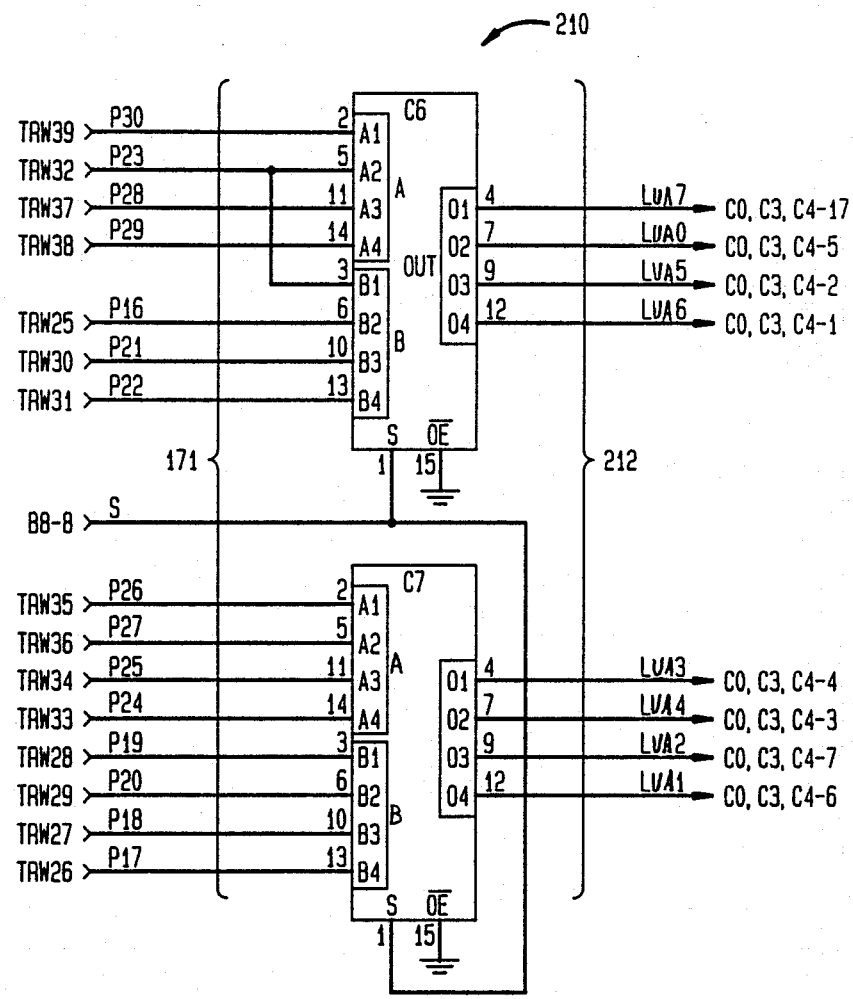
FIG. 17 is a schematic diagram of the lookup PROM address multiplexer 210.

The lookup address logic 211 also generates an LUA8 (lookup address) signal, which is zero if the lookup is for magnitude data or division data using the upper MSP output byte, and 1 otherwise; and an LUA9 signal which is 0 for division and 1 for magnitude. (See Table 8.) The S signal is provided to a lookup PROM address multiplexer 210 (FIG. 17), consisting of two 74LS257 multiplexers C6 and C7. The multiplexer 210 receives the upper MSP output byte P30-P23 on its input channel A and the lower byte P23-P16 on its input channel B. The S signal selects which of these inputs is used as lookup address signals LUA0-LUA7 on the address lines 212. These signals plus LUA8 and LUA9 are used to address the lookup PROM 220 (FIG. 18), which consists of three 3625 PROMs designated C0, C3, and C4. The inverters C9 in FIG. 18 are 74S05 inverters. The output 222 of the PROM 220 goes to both the TRW Y-input 164 (upper byte LU15-LU8) and the Y-input buffer 180 (lower byte LU7-LU3), for use in further calculations. Bits LU2-LU0 of the output 222 are always 0. Gating is by microcode bit M3, which simultaneously transfers lookup data out of PROM 220 and into the TRW Y-input 164.

The contents of the lookup PROMs for division and magnitude are seen in Tables 4 and 5, respectively.

Figure 19:
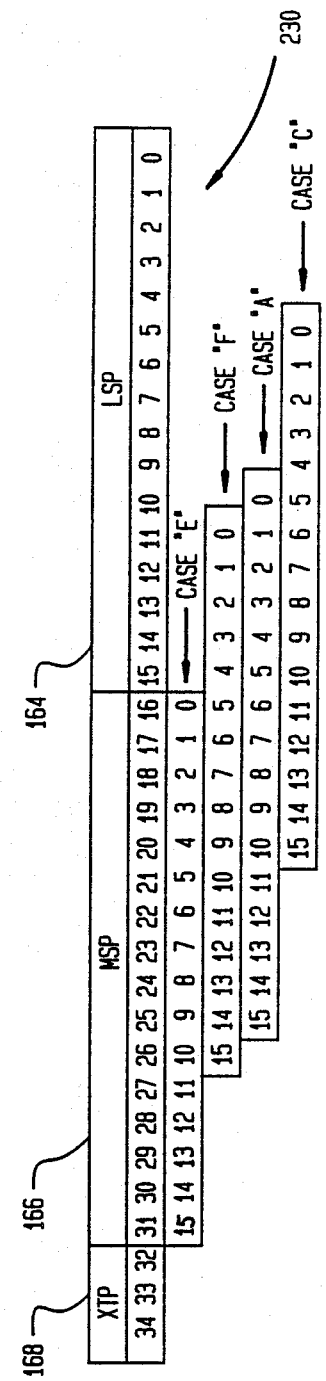
FIG. 19 is a diagram showing the LSP, MSP, and XTP outputs of the multiplier 160 and demonstrating how the outputs are scaled by various factors by the data scaling register 240.

FIG. 19 is a diagram showing the output word 230 of the TRW, which consists of the LSP 164, MSP 166, and XTP 168 outputs, and illustrates the rightward shifting of the TRW output word according to four predetermined scaling factors, referred to herein as cases C, A, F, and E. In case C the TRW output is multiplied by 0.08H (shifted 5 bits right). In Case A the multiplier is 0.004H (10 bits right shift). In Case F the multiplier is 0.002H (11 bits right shift). In Case E the multiplier is 0.0001H (16 bits right shift).

Figure 20:
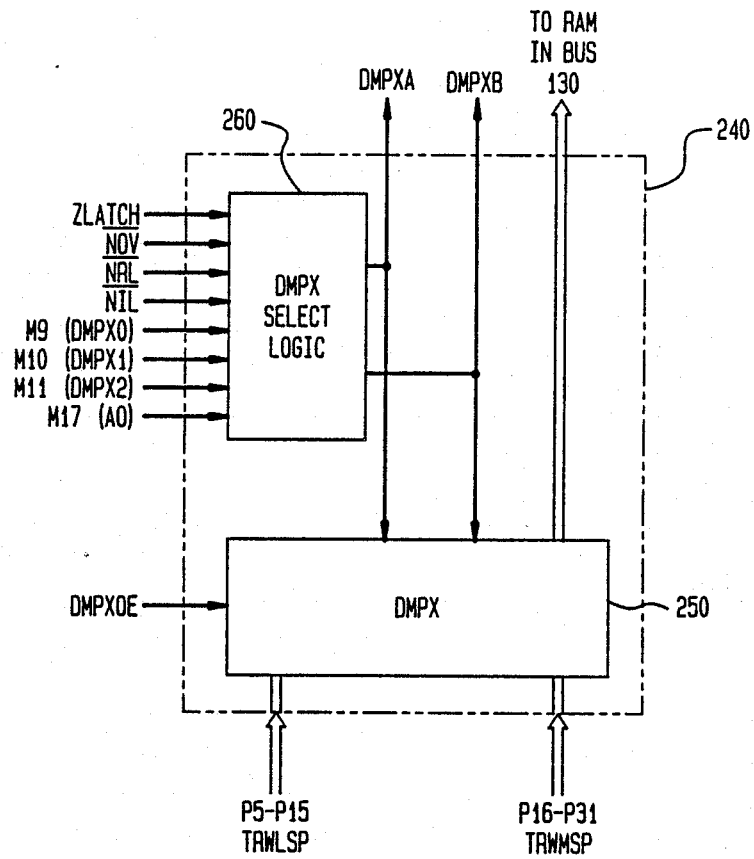
FIG. 20 is a block diagram of the data scaling register 240 of FIG. 1.

The above scaling of the TRW output is performed by a data scaling register 240 (FIG. 20). The data scaling register includes a data multiplexer (DMPX) 250 (FIGS. 23-27) for receiving the data, and DMPX select logic (FIG. 22) for producing control signals to selectively sense certain bits of the data in the DMPX, effectively producing an output shifted according to one of the cases of FIG. 19. The following signals are input to the DMPX select logic 260. The signals are discussed briefly here, and are further discussed below. The ZLATCH signal is 1 if the upper byte of a computed denominator in the TRW product output is zero. This signal is used by the DMPX to determine the scaling factor to be applied when the quotient is calculated. The NOV signal is a numerator overflow flag which is low whenever overflow occurs in case F scaling, regardless of DMPX state. The NRL signal is the inverse of the Numerator Real Latch, which is a flag bit indicating the scaling applied when the real numerator is calculated. The NIL signal is the inverse of the Numerator Imaginary Latch, which is a flag bit indicating the scaling applied when the imaginary numerator is calculated. M9 (DMPX0), M10 (DMPX1), and M11 (DMPX2) are microcode bits which determine the scaling factor to be applied by the DMPX, i.e., which section of the TRW output (which is input to the DMPX) is gated to the RAM Input Bus 130 for further processing.

Figure 22:
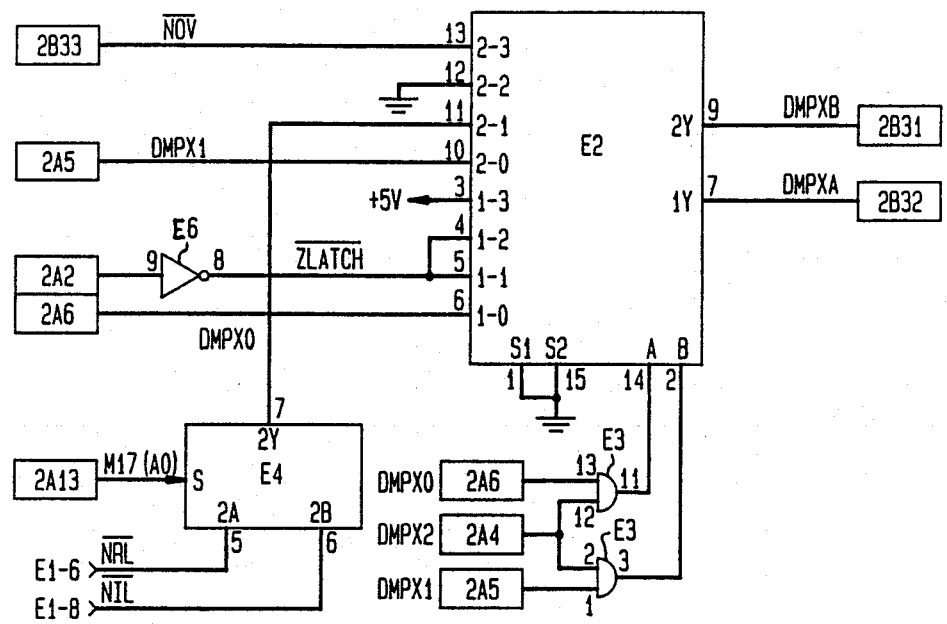
FIG. 22 is schematic diagram of the DMPX select logic 260 of FIG. 20.

The DMPX select logic 260 is seen in FIG. 22. In this Figure, E2 is a 74LS253 data multiplexer, E3 is a 74S08 2-input positive-AND gate, E4 is a 74LS257 data multiplexer, and E6 is a 74S04 inverter.

The DMPX select logic 260 outputs signals DMPXA and DMPXB for controlling the DMPX 250, as will be discussed further below. Table 9 shows the DMPXA and DMPXB values produced in response to the above input signals.

The DMPX select microcode bits DMPX0, DMPX1, and DMPX2, in conjunction with M17(A0) and WR, are also used to generate SRW, SIW, OVMPXS, OVMPXS, NRW, and NIW control signals, which will be discussed below in detail.

Figure 23:
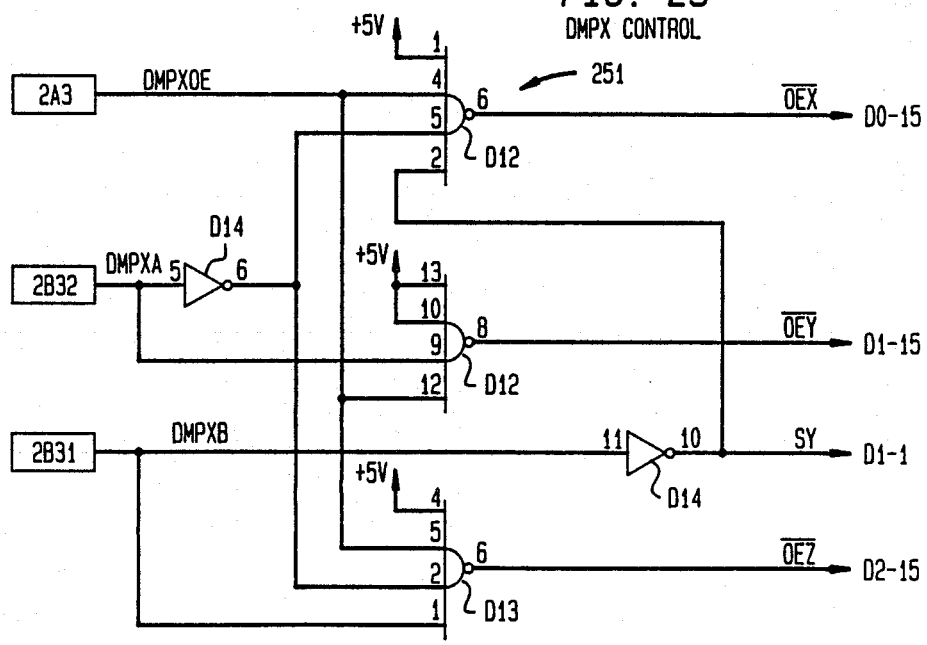
FIG. 23 is a schematic diagram showing control circuitry which is part of the DMPX 250.

The DMPX 250 is shown in FIGS. 23-27. Referring to FIG. 23, there is seen a DMPX control circuit 251, in which D12 and D13 are 74S20 4-input NAND gates and D14 is a 74S04 inverter. The circuit 251 receives the DMPXA and DMPXB control signals, and also a DMPXOE (data multiplexer output enable) signal (see FIG. 8), which gates the DMPX output onto the RAM Input Bus 130 when it is high. DMPXOE is high when M1, M2, M6, and M7 are all high. The output signals of the circuit 251 are OEX, OEY, OEZ, and SY. OEX (output enable X) gates data scaled by DMPX case A onto the RIB when it goes low. OEY (output enable Y) gates data scaled by DMPX case E or F onto the RIB when it goes low; case E when SY is low and case F when SY is high. OEZ (output enable Z) gates data scaled by DMPX case C onto the RIB when it goes low.

Figure 24:
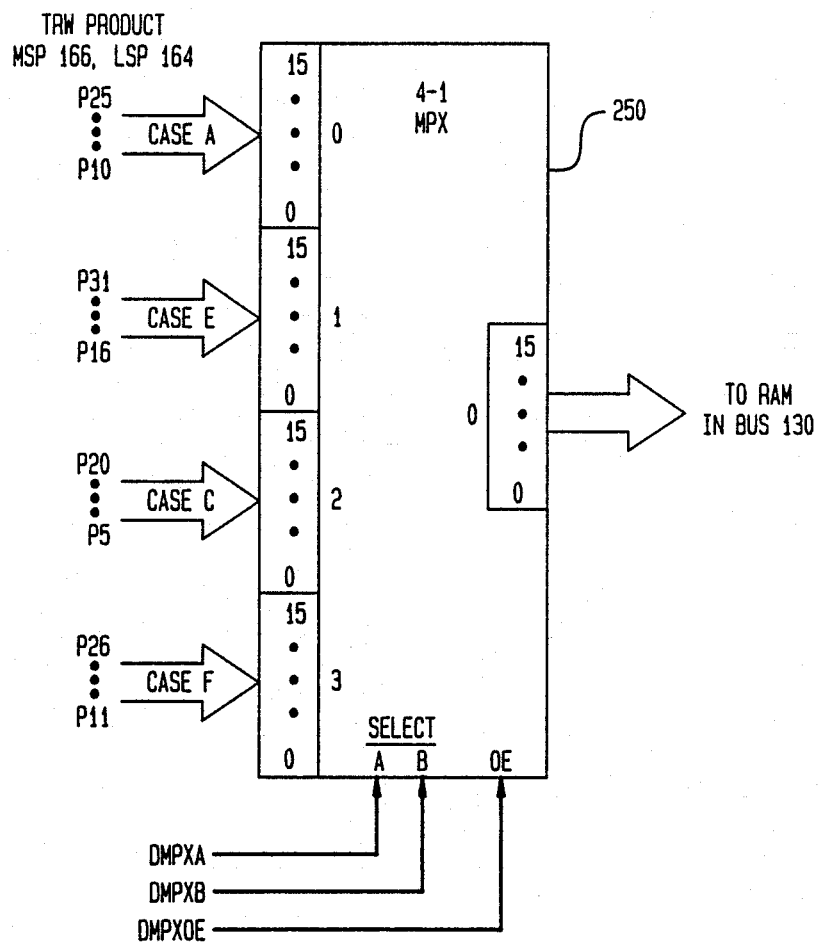
FIG. 24 is a block diagram of the DMPX 250 of FIG. 20.

FIG. 24 is a block diagram of the DMPX 250. As seen therein, the DMPX receives four distinct 16-bit subsets of the 32 bits that make up the data from the TRW MSP output 166, on MSP output bus 171, and the LSP output 164, on an LSP output bus 172. One such subset is selectively transferred onto the RAM Input Bus 130. For example, in case A bits P25-P10 of the TRW output are gated onto the RIB when case A is selected by the state of DMPXA and DMPXB. In effect, the full TRW output is multiplied by 0.004 H (shifted 10 bits right) and then the lower 16 bits of the result are selected.

Figure 25:
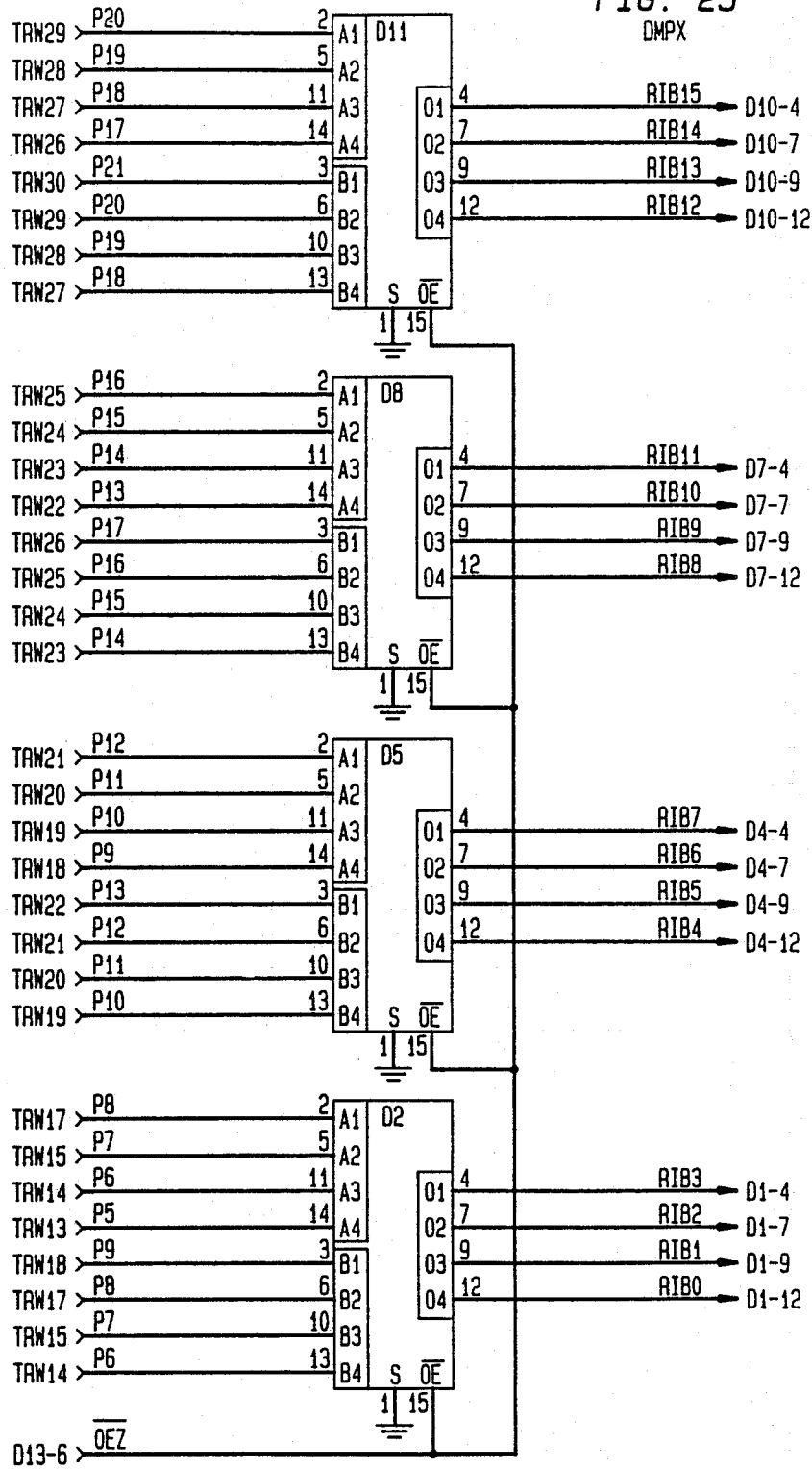
FIG. 25 is a schematic diagram of part of the DMPX for scaling according to case C.
Figure 26:
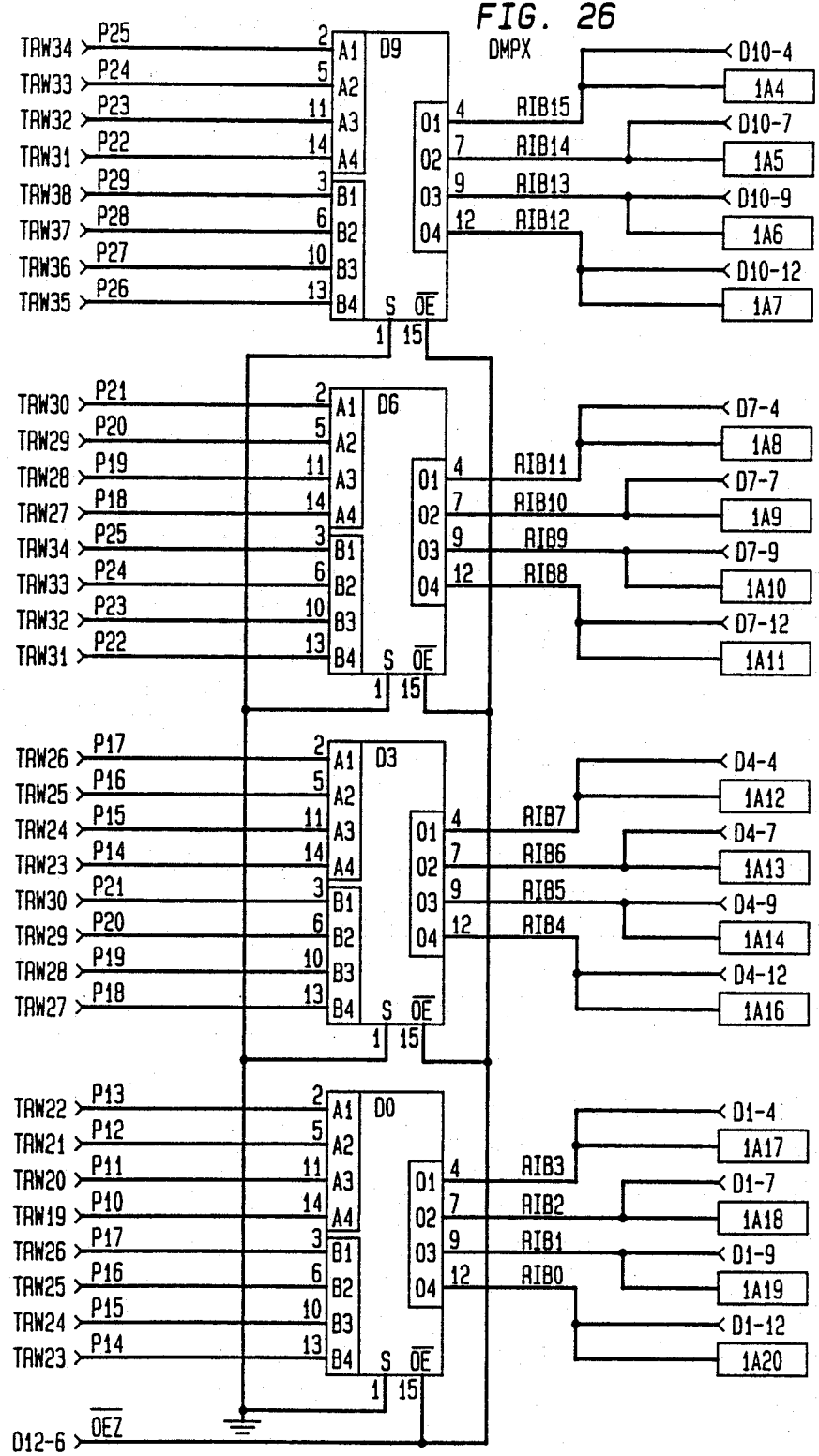
FIG. 26 is a schematic diagram of part of the DMPX for scaling according to case A.
Figure 27:
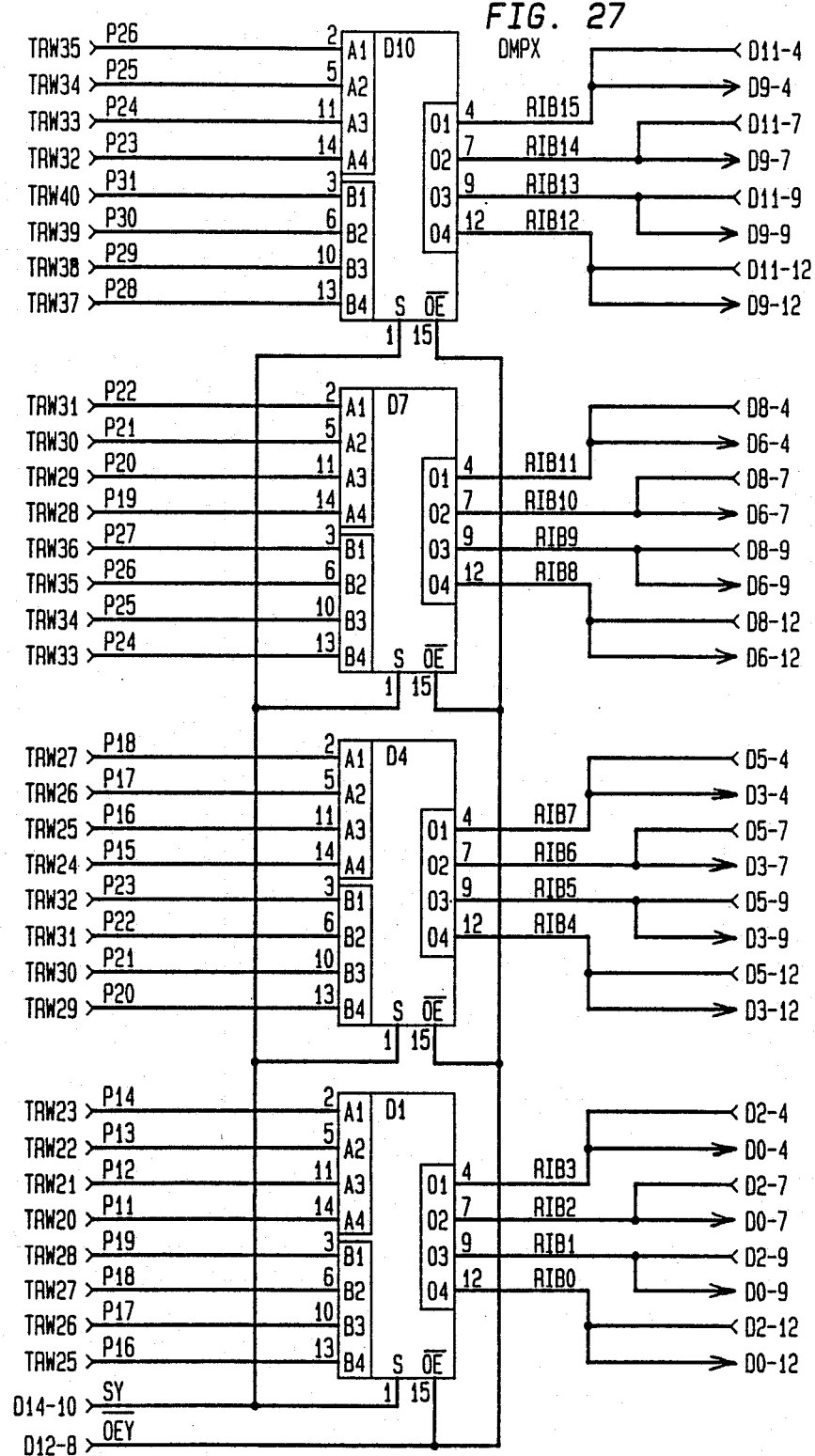
FIG. 27 is a schematic diagram of part of the DMPX for scaling according to cases E and F.

FIGS. 25-27 are schematic diagrams of the DMPX. In the figures, D0-D11 are 74LS257 2-1 data multiplexers. In FIG. 25, it is seen that bits P20-P5 of the TRW output are connected to the A inputs of D11, D8, D5, and D2. The A inputs are continuously selected by grounding the select control on pin 1. Thus, when the OEZ signal is low, bits P20-P5 appear on RIB15-RIB0, which is Case C scaling.

Similarly, the elements in FIG. 26 provide Case A scaling by receiving TRW output bits P25-P10 on the A inputs of D9, D6, D3, and D0 and gating these inputs onto the RIB when OEX goes low.

The multiplexers D10, D7, D4, and D1 shown in FIG. 27 provide both case E and Case F scaling. TRW output bits P26-P11 are connected to the A inputs (case F) and bits P31-P16 are connected to the B inputs (case E). Either Case E or Case F scaling is performed when OEY goes low, depending on whether SY is low (Case F) or high (Case E).

As seen in FIGS. 25 and 26, additional scaling factors may be provided by connecting different combinations of TRW output bits to the B inputs of the multiplexers and then setting the select controls on pin 1 of the multiplexers high to select the B inputs.

Figure 29:
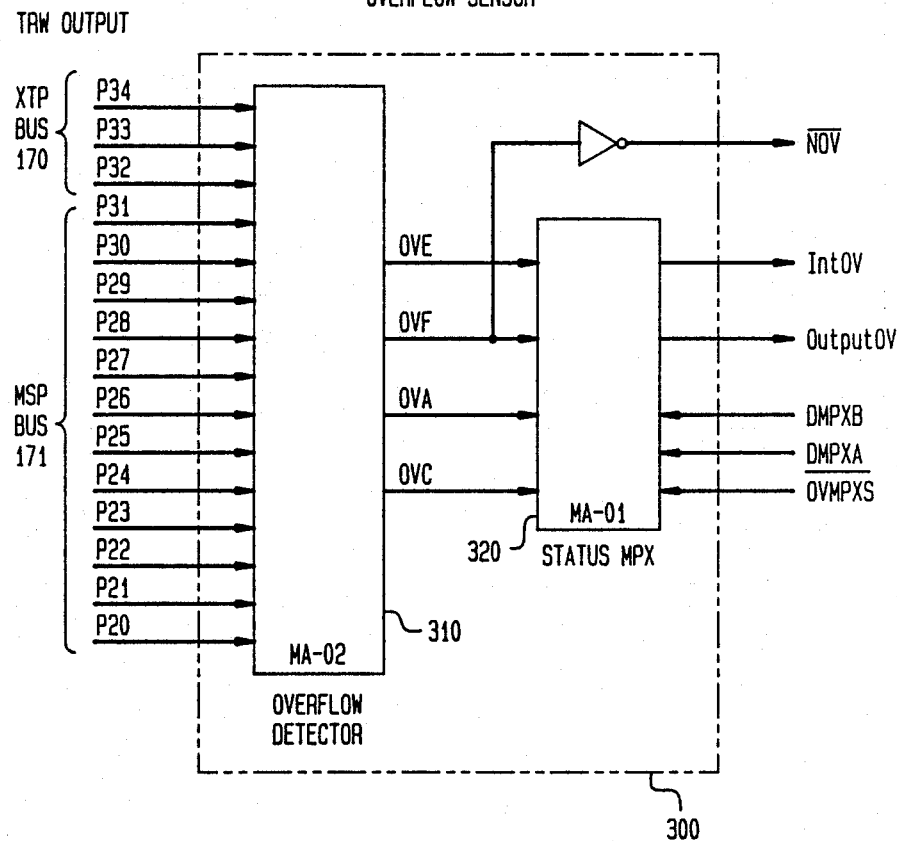
FIG. 29 is a block diagram of the overflow sensor of FIG. 1.
Figure 30:
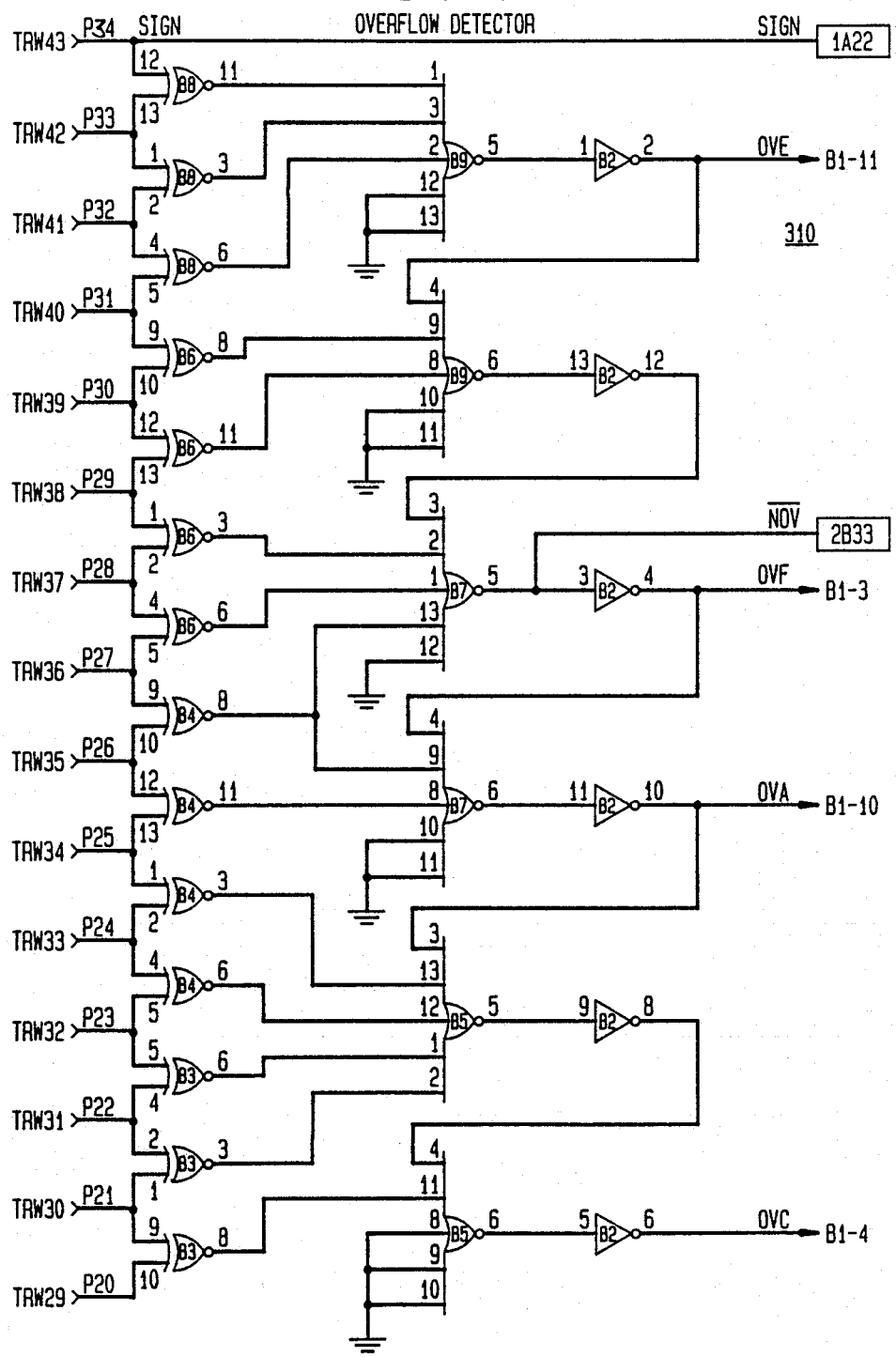
FIG. 30 is a schematic diagram of the overflow detector 310 of FIG. 29.
Figure 31:
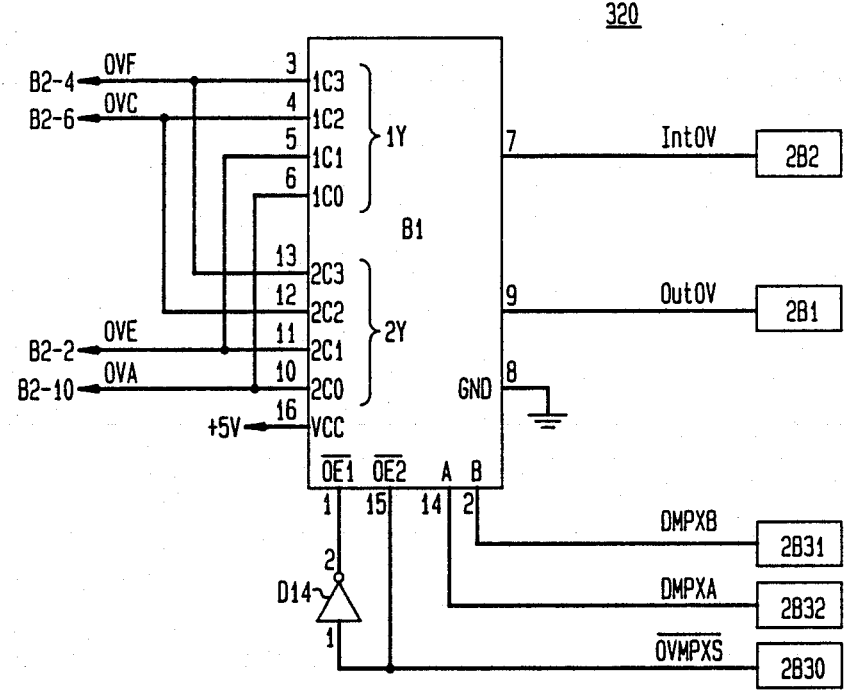
FIG. 31 is a schematic diagram of the status multiplexer 320 of FIG. 29.

Error sensing and further analysis of the TRW output are provided by an overflow sensor 300 (FIGS. 28 and 29), which includes an overflow detector 310 (FIG. 30) and a status multiplexer 320 (FIG. 31).

Referring to FIG. 30, the overflow (OV) detector 310 includes 74LS86 2-input EOR gates designated B3, B4, B6, and B8; 74S04 inverters designated B2; and 74LS260 5-input NOR gates designated B5, B7, and B9. The OV detector senses bits P34-P20 of the TRW XTP output, on an XTP output bus 170, and the MSP output, on the MSP output bus 171, and indicates whether these bits contain any overflow data, i.e., data that would be lost if scaling occurred according to cases C, A, F, and E. For example, if any of bits P34-P31 are different from one another, then OVE goes high to indicate that overflow occurred in case E scaling. The most significant bit P31 in Case E should be the same as the higher bits P34-P32 to preserve the sign and ensure that no overflow occurred. Similarly, OVF is high if any one of bits P34-P26 differs; OVA is high if any one of bits P34-P25 differs; and OVC is high if any one of bits P34-P20 differs. Signals OVE, OVF, OVA, and OVC are produced irrespective of the actual DMPX scaling Case in effect at the time.

The OV detector also produces an NOV (Numerator Overflow) Flag, which is low whenever Case F overflow occurs. Thus, NOV is the inverse of OVF.

The status multiplexer 320 (FIG. 31), which receives the OVE, OVF, OVA, and OVC signals, consists of a 74LS253 dual 4-1 multiplexer designated B1 and a 74S04 inverter designated D14. The multiplexer B1 has two 4-bit data inputs, designated 1C0-1C3 and 2C0-2C3, and corresponding 1-bit outputs 1Y and 2Y. The −C0, −C1, −C2, and −C3 inputs are respectively connected to signals OVA, OVE, OVC, and OVF. An OVMPXS (Overflow Multiplexer Select) flag from the DMPX select logic 260 (FIG. 21) is input to an OE2 output control and its inverse is input to an OE1 output control to select between the 1C- and 2C- inputs. When the OVMPXS is low the 1C- inputs are selected (for internal calculations), and when it is high the 2C- inputs (for numerator, denominator, and quotient results) are selected. There are also A and B address inputs which are common to both multiplexers and determine which input bit appears on the corresponding output when a given OE- output control is low. The A and B address inputs select which input bit is to appear on the corresponding output, according to Table 10.

TABLE 10

| A | B | Out |
|---|---|-----|
| 0 | 0 | 0 |
| 1 | 0 | 1 |
| 0 | 1 | 2 |
| 1 | 1 | 3 |

The inputs to the A and B address inputs are the DMPX A and DMPX B signals which, as discussed above, select the scaling case according to which the TRW output is scaled. The 1Y output is designated IntOV (Internal Overflow), and is high if the TRW product output overflows the current DMPX scaling case during any internal calculation. The 2Y output is designated OutOV (Output Overflow), and goes high when the TRW product output overflows the current DMPX scaling case during the DMPX modes used for the results of denominator, numerator, and quotient calculations.

Figure 32:
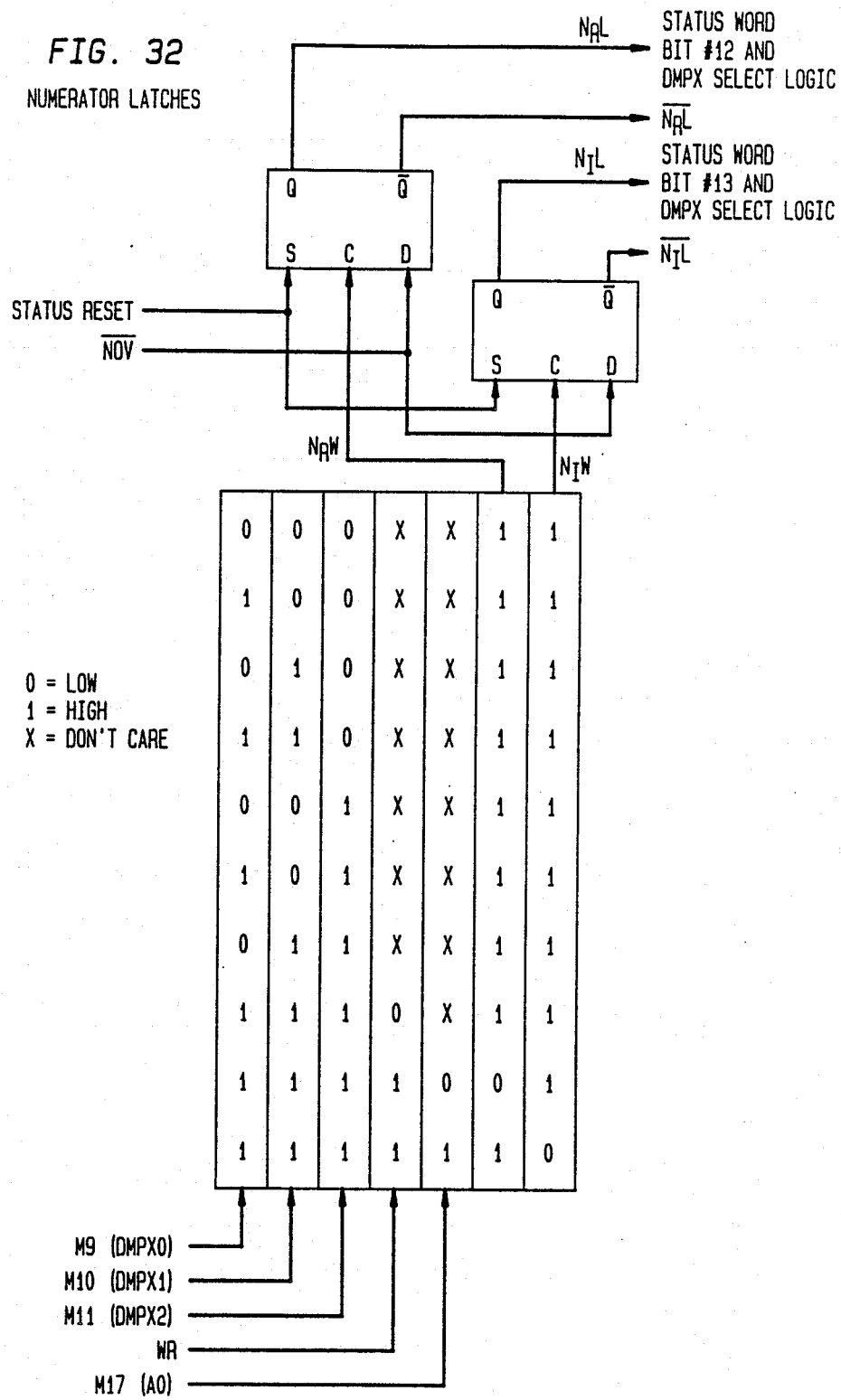
FIG. 32 is a block diagram of the numerator latches of FIG. 28.
Figure 33:
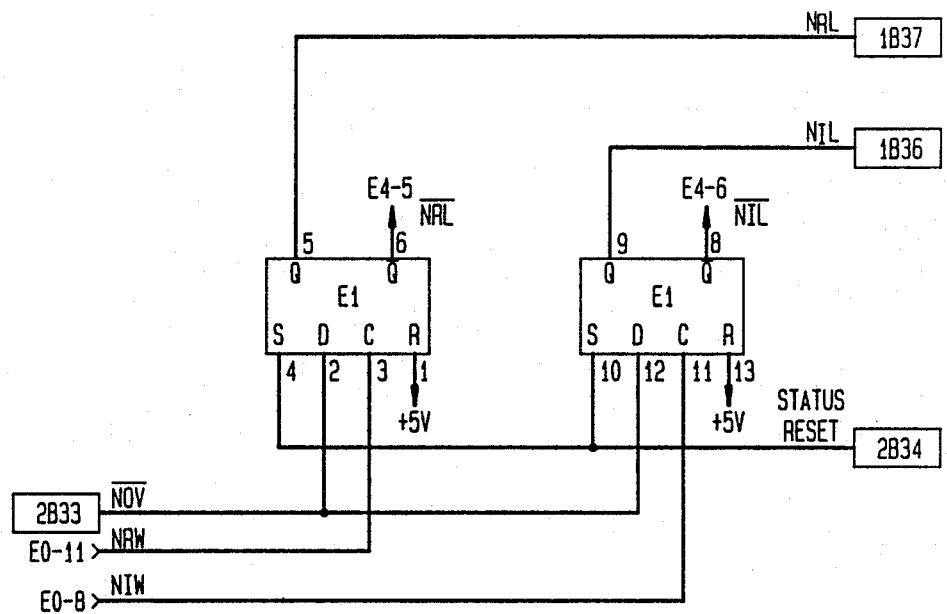
FIG. 33 is a schematic diagram of the numerator latches 335.

Referring again to FIG. 28, Numerator Latches 335 are provided to store flag bits NRL and NIL to indicate the scaling cases that were used when the Numerator Real and Numerator Imaginary were calculated. The NRW and NIW signals from the numerator latch logic (FIG. 21) are Numerator Real and Numerator Imaginary Write bits which respectively clock the real and imaginary numerator scaling flags into NRL and NIL when the numerator is written to RAM. FIG. 32 is a block diagram of the Numerator Latch circuitry corresponding to the schematic diagrams in FIG. 21 and FIG. 33. As mentioned above, the NOV flag is low whenever Case F scaling overflows, regardless of the actual DMPX state. Thus, the NrL (Numerator Real Latch) is a flag bit that indicates the scaling case used when the Numerator Real is calculated. It is clocked by NRW. Initially it is set high, but it is cleared if case F scaling overflows. NRL and ZLATCH determine the scaling to be used when the quotient is calculated, as seen in FIG. 22.

Similarly, the NiL (Numerator Imaginary Latch) is clocked by NIW and indicates the scaling Case used when the Numerator Imaginary is calculated. It is initially set high and is cleared if Case F oveflow occurs. The scaling to be used when the quotient is calculated is determined by NIL and ZLATCH (see FIG. 22).

Figure 28:
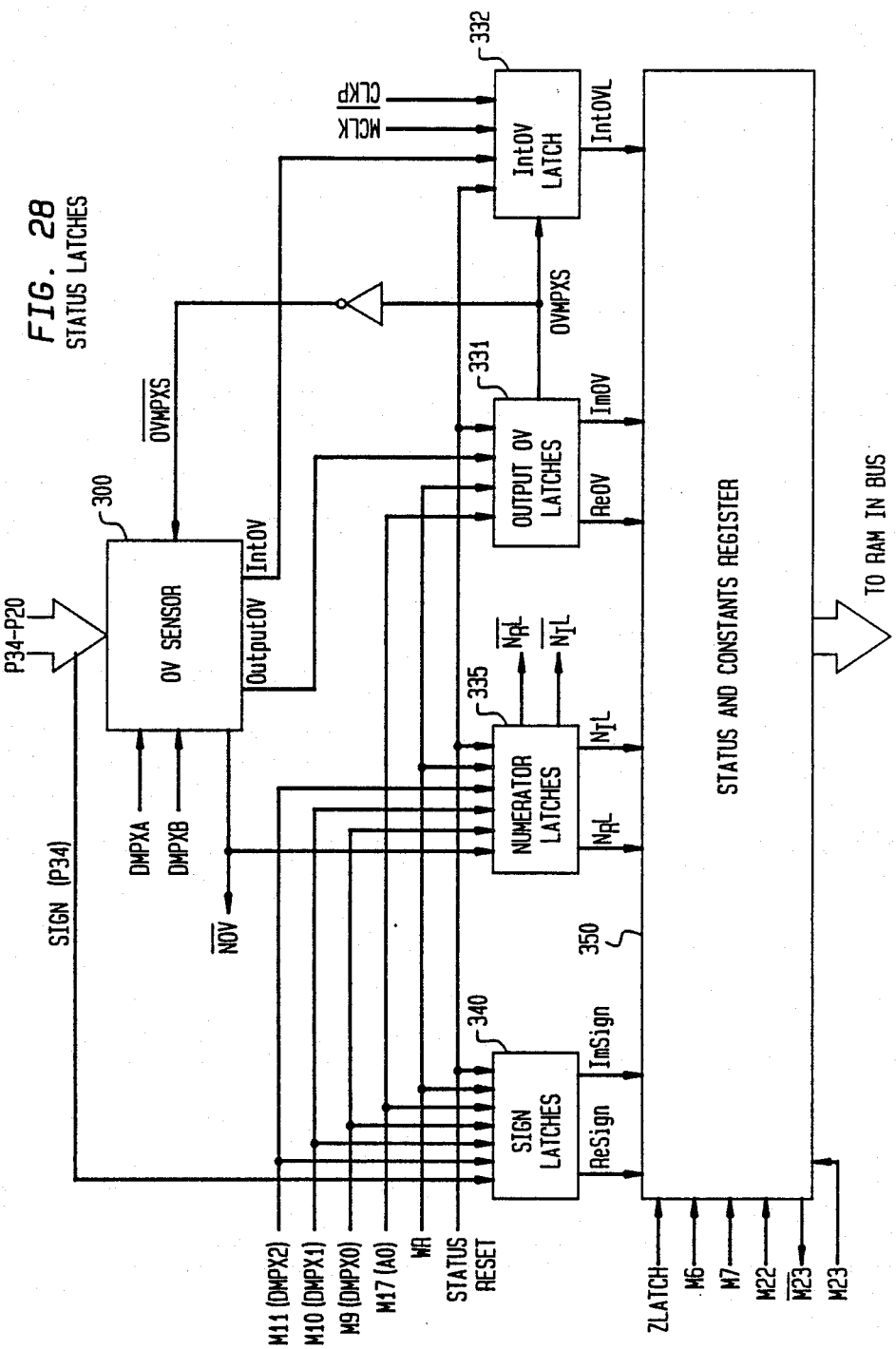
FIG. 28 is a block diagram showing the overflow sensor 300, the status latches 325, and the status and constants register 350 of FIG. 1.

Also seen in FIG. 28 are a pair of Imaginary and Real Output Overflow latches 331 (ImOv and ReOV), an Internal Overflow Latch circuit (IntOVL) 332, and a pair of Sign Latches (ReSign and ImSign) 340. Schematic diagrams of these three sets of latches are seen in FIG. 34, in which A21, A22 and A23 are 74S74 D-type flip-flops, A20 is a 74S32 2-input OR gate, and A24 is a 74S20 4-input NAND gate.

Figure 35:
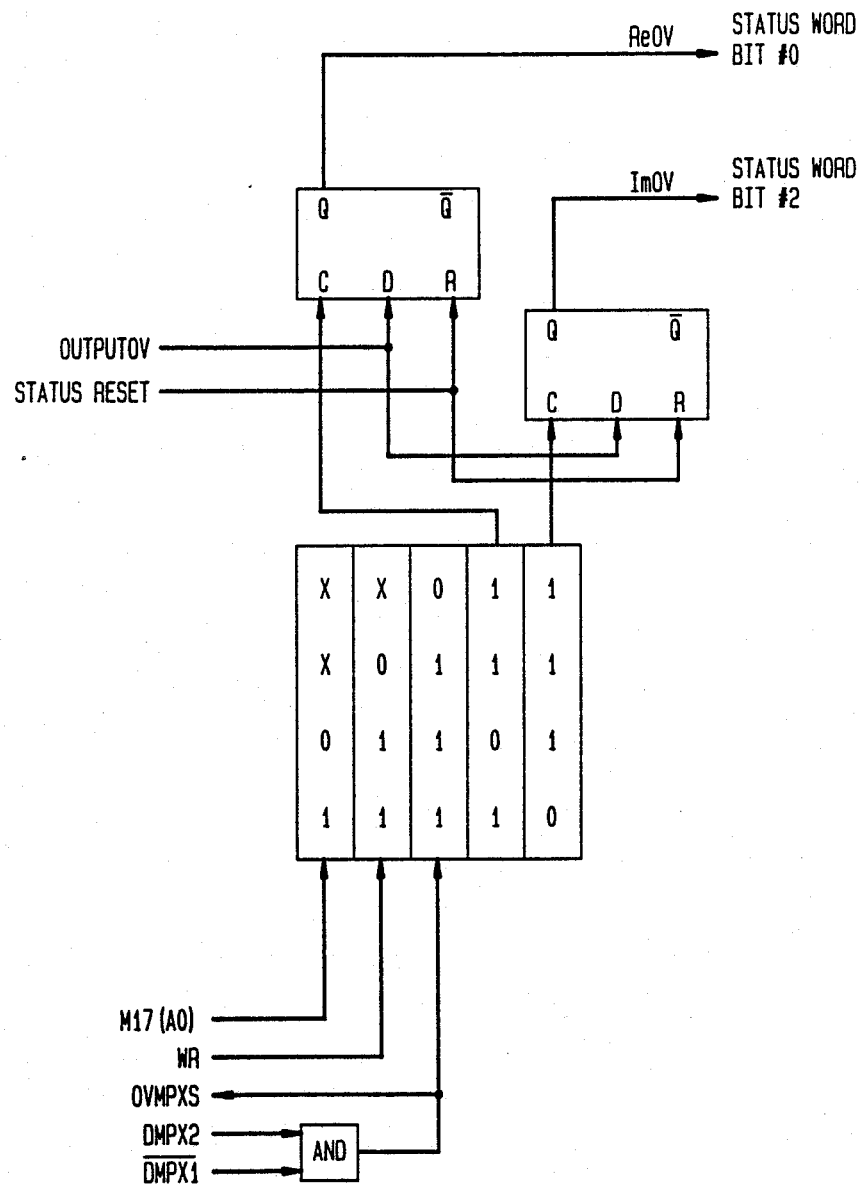
FIG. 35 is a block diagram of the output overflow latches 331 of FIG. 28.

The operation of the Output Overflow latches is shown in the block diagram in FIG. 35. The status bit ReOV is set when the real part of the result of a complex division or multiplication overflows. When this bit is set, it is read by the MIPROC host computer which then considers the real part of the result to be infinite. Similarly, ImOV is set when the imaginary part of a complex division or multiplication overflows.

FIG. 36 illustrates the operation of the Internal Overflow Latch 332. The inputs to this circuitry include MCLK, the master system clock signal which advances the microcode on each positive-going transition; and CLKP, which is normally high and which goes low when a product is clocked into the TRW P output. The interal overflow status bit IntOVL is latched high if the TRW product output overflows the current DMPX scaling case after any internal calculation that generates a CLKP.

Figure 21:
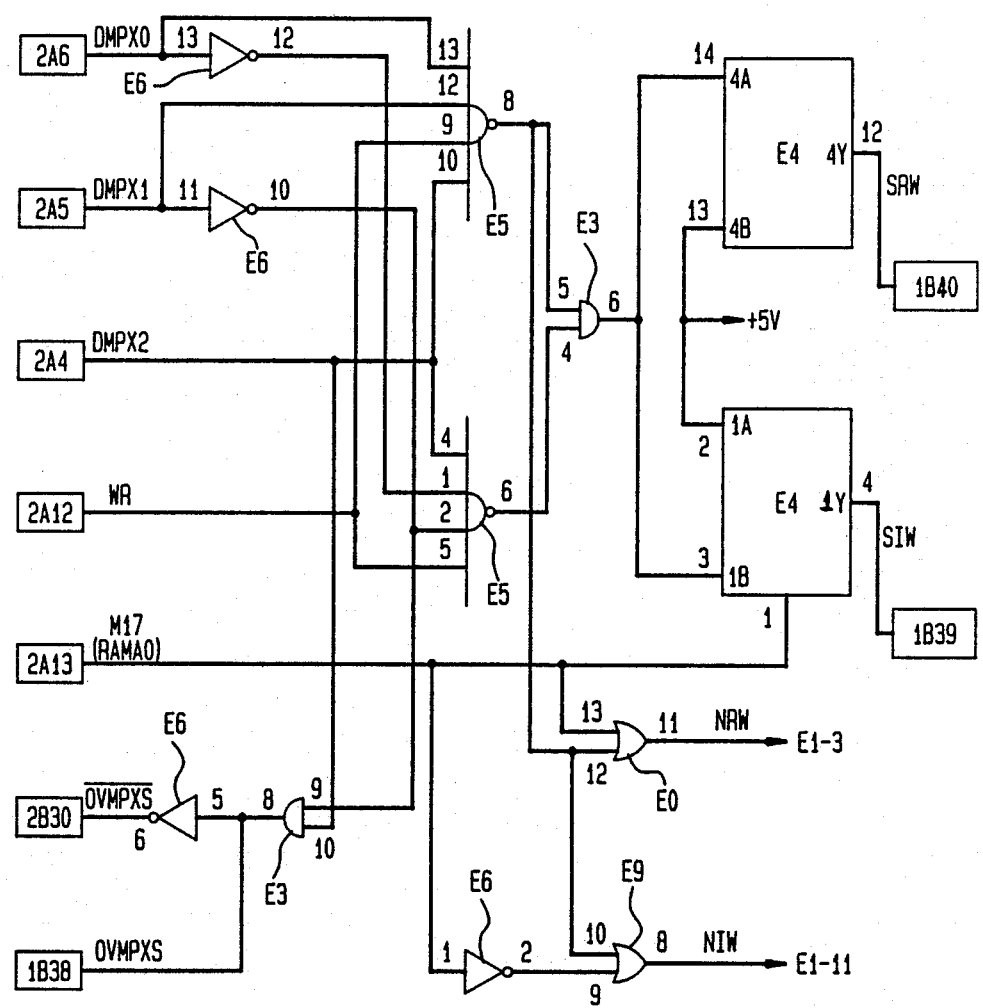
FIG. 21 is a schematic diagram of part of the numerator latch circuitry 335 and sign latch circuitry 340 of FIG. 28.
Figure 34:
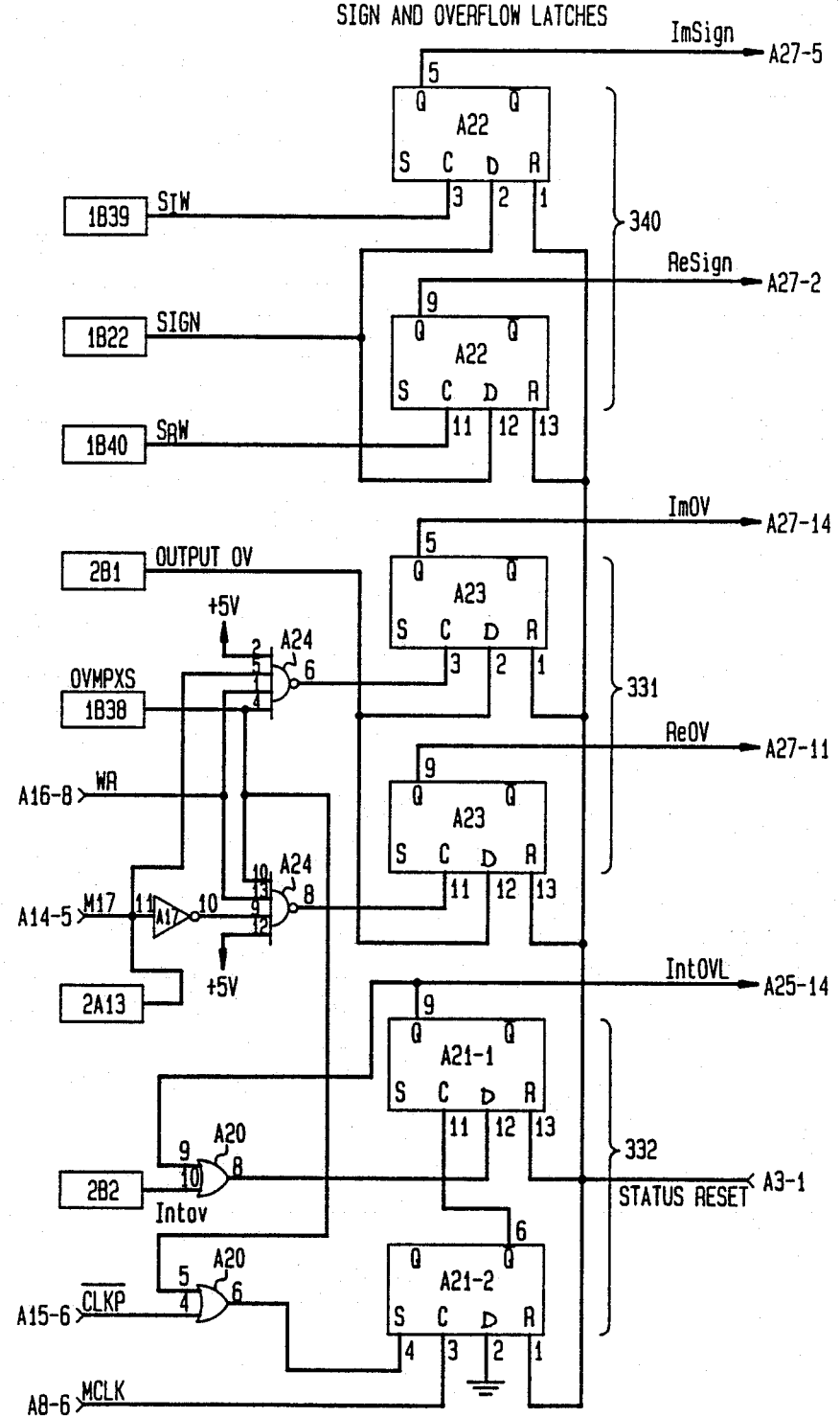
FIG. 34 is a schematic diagram of the status latches 325 of FIG. 1.
Figure 37:
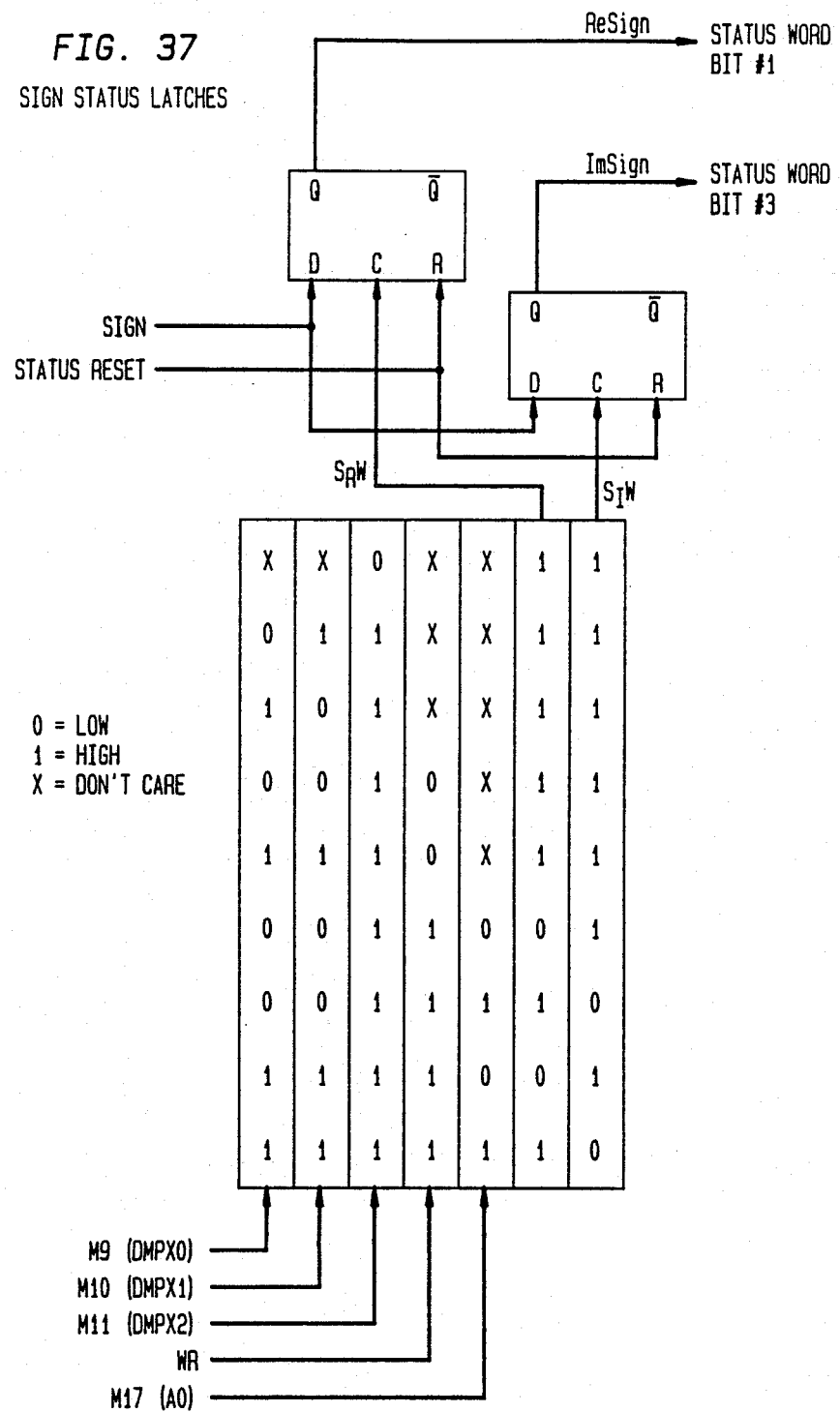
FIG. 37 is a block diagram of the sign status latches 340 of FIG. 28.

FIG. 37 is a block diagram showing the operation of the Sign Status Latches, including circuitry in FIGS. 21 and 34. The Sign Imaginary Write (SIW) and Sign Real Write (SRW) lines respectively latch the signs of the imaginary and real parts of the numerator in the output status word. The SIGN signal is the sign bit P34 of the TRW output. Thus the ReSign and ImSign signals represent the signs of the real and imaginary parts of the result of a complex division or multiplication. When these bits are set, the respective signs are negative.

Figure 38:
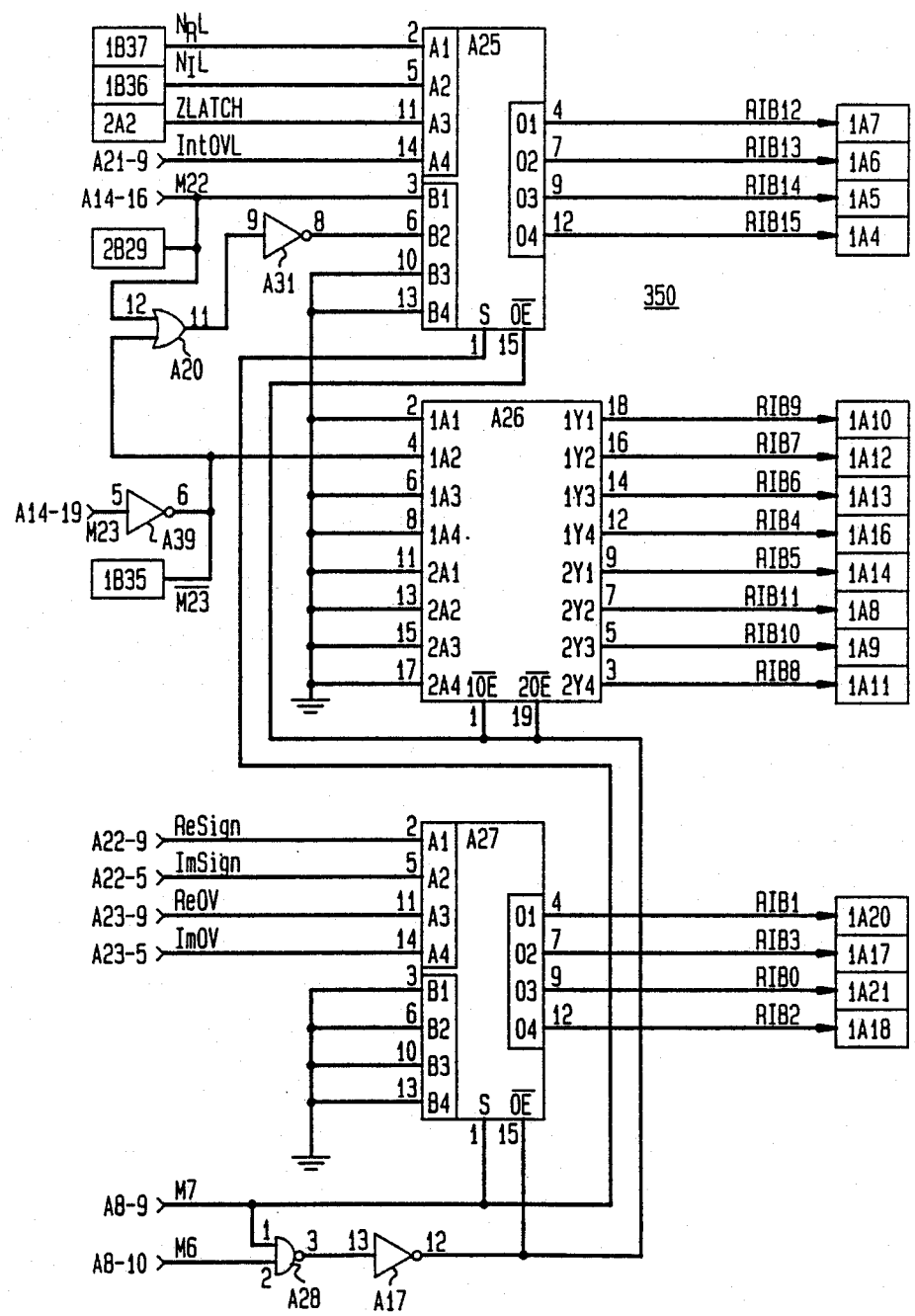
FIG. 38 is a schematic diagram of the status and constants register 350 of FIG. 1.

FIG. 38 is a schematic diagram of the status and constants register 350. It comprises two 74LS257 2-1 multiplexers A25 and A27; a 74LS244 octal buffer A26; 74S04 inverters A17, A31, and A39; a 74S32 2-input OR gate A20, and a 74S00 2-input NAND gate A28.

Clocking and selection of output data in the status and constants register 350 are controlled by microcode bits M6, M7, M22, and M23. M6 controls the gating of the constant required for calculation of the reciprocal of the denominator (or the gating of the status word as described below). This bit is normally 1, which disables the gating. When it is set to 0 the multiplexer A25 transfers the magnitude or divide constant onto bit RIB 13 or RIB 12, respectively, of the RAM Input Bus, and zeros onto the remaining bits, which allows this datum to be clocked into the TRW X input. When this bit is 0, the DMPX is forced off.

M7 controls the selection of the status word for gating onto the RIB. The Status Word consists of IntOV, ZLATCH, NIL, NRL, ImSign, ReSign, ImOV, and ReOV. M7 is normally 1, which disables the gating of the status word and enables gating of the constant. It is set to 0 toward the end of the microcode cycle when the status of the internal flags and overflow indicators is to be gated onto the RIB so that it can be written into RAM. When this bit is 0 the DMPX is forced off.

M22, as described above, is normally 1 and is set to zero during the portion of a magnitude calculation that requires the DIV constant to be 2000H and the lookup PROM address to be set to the magnitude data. When M22 is 1, RIB15–12 is 0001, i.e., 1H. When M22 is 0, RIB 15–12 is 0010, or 2H.

M23 is always 1 in the disclosed embodiment. It may be set to 0 if desired to provide for additional constants to correspond to more than the two operations herein (i.e., magnitude and division) in which such a constant is employed.

For convenience, detailed descriptions of the operation of the CAU in performing division, multiplication, and magnitude calculations under microcode control have been placed in Appendices B, C, and D, respectively, which are hereby expressly incorporated into the present patent specification.

Although an illustrative embodiment of the invention has been disclosed herein and shown in the acompanying drawings, it is to be understood that the invention is not limited to such embodiment, but rather that various variations and modifications thereof may be made by one skilled in the art within the spirit and scope of the invention, as defined in the following claims.

TABLE 1

DIVIDE MICROCODE

PART I

MICROCODE OFFSET IN PROM = 0080

| | | | | | Function | | | | | | |
|---|---|---|---|---|---|---|---|---|---|---|---|
| | Int/ | A | E | Look | G | | Div | | Re- | D-M-P-X | | |
| | Ext | Buf | Buf | Up | Buf | ZL | Cons | Stat | Set | 0 | 1 | 2 |
| Microcode # | M0 | M1 | M2 | M3 | M4 | M5 | M6 | M7 | M8 | M9 | M10 | M11 |
| Step # 0000 | 0 | 0 | 1 | 1 | 1 | 0 | 1 | 1 | 0 | 1 | 0 | 0 |
| 0001 | 0 | 0 | 1 | 1 | 1 | 0 | 1 | 1 | 0 | 1 | 0 | 0 |
| 0002 | 0 | 0 | 1 | 1 | 1 | 0 | 1 | 1 | 0 | 1 | 0 | 0 |
| 0003 | 0 | 0 | 1 | 1 | 1 | 0 | 1 | 1 | 0 | 1 | 0 | 0 |
| 0004 | 0 | 0 | 1 | 1 | 1 | 0 | 1 | 1 | 0 | 1 | 0 | 0 |
| 0005 | 0 | 0 | 1 | 1 | 0 | 0 | 1 | 1 | 0 | 1 | 0 | 0 |
| 0006 | 0 | 0 | 1 | 1 | 0 | 0 | 1 | 1 | 0 | 1 | 0 | 0 |
| 0007 | 1 | 0 | 1 | 1 | 0 | 0 | 1 | 1 | 0 | 1 | 0 | 0 |
| 0008 | 1 | 1 | 0 | 1 | 0 | 0 | 1 | 1 | 0 | 1 | 0 | 0 |
| 0009 | 1 | 1 | 1 | 1 | 0 | 0 | 1 | 1 | 0 | 1 | 1 | 1 |
| 000A | 1 | 1 | 1 | 1 | 1 | 0 | 1 | 1 | 0 | 1 | 1 | 1 |
| 000B | 1 | 1 | 1 | 1 | 1 | 0 | 1 | 1 | 0 | 1 | 1 | 1 |
| 000C | 1 | 1 | 1 | 1 | 1 | 0 | 1 | 1 | 0 | 1 | 1 | 1 |
| 000D | 1 | 1 | 1 | 1 | 0 | 0 | 1 | 1 | 0 | 1 | 1 | 1 |
| 000E | 1 | 1 | 1 | 1 | 0 | 0 | 1 | 1 | 0 | 0 | 1 | 1 |
| 000F | 1 | 1 | 0 | 1 | 0 | 0 | 1 | 1 | 0 | 0 | 1 | 1 |
| 0010 | 1 | 1 | 1 | 1 | 1 | 0 | 1 | 1 | 0 | 0 | 1 | 1 |
| 0011 | 1 | 1 | 1 | 0 | 1 | 1 | 1 | 1 | 0 | 0 | 1 | 1 |
| 0012 | 1 | 1 | 1 | 1 | 1 | 0 | 1 | 1 | 0 | 0 | 1 | 1 |
| 0013 | 1 | 1 | 1 | 1 | 1 | 0 | 1 | 1 | 0 | 0 | 0 | 0 |
| 0014 | 1 | 1 | 1 | 1 | 1 | 0 | 1 | 1 | 0 | 0 | 0 | 0 |
| 0015 | 1 | 1 | 1 | 1 | 1 | 0 | 0 | 1 | 0 | 0 | 0 | 0 |
| 0016 | 1 | 1 | 1 | 1 | 0 | 0 | 1 | 0 | 1 | 1 | 1 | 0 |
| 0017 | 1 | 1 | 1 | 1 | 0 | 0 | 1 | 0 | 1 | 1 | 1 | 0 |
| 0018 | 1 | 1 | 1 | 1 | 0 | 0 | 1 | 0 | 1 | 1 | 1 | 0 |
| 0019 | 1 | 1 | 1 | 1 | 0 | 0 | 1 | 0 | 0 | 0 | 0 | 0 |
| 001A | 1 | 1 | 0 | 1 | 0 | 0 | 1 | 0 | 0 | 0 | 0 | 0 |
| 001B | 1 | 1 | 1 | 1 | 1 | 0 | 1 | 0 | 0 | 0 | 0 | 0 |

TABLE 1-continued
DIVIDE MICROCODE

| | | | | | | | | | | | | |
|---|---|---|---|---|---|---|---|---|---|---|---|---|
| 001C | 1 | 1 | 1 | 1 | 1 | 0 | 1 | 1 | 0 | 0 | 0 | 0 |
| 001D | 1 | 1 | 1 | 1 | 1 | 0 | 0 | 1 | 0 | 0 | 0 | 0 |
| 001E | 1 | 1 | 1 | 1 | 1 | 0 | 0 | 1 | 0 | 1 | 1 | 0 |
| 001F | 1 | 1 | 1 | 1 | 1 | 0 | 1 | 1 | 0 | 1 | 1 | 0 |
| 0020 | 1 | 1 | 1 | 1 | 1 | 0 | 1 | 1 | 0 | 1 | 1 | 0 |
| 0021 | 1 | 1 | 1 | 1 | 0 | 0 | 1 | 1 | 0 | 1 | 0 | 1 |
| 0022 | 1 | 1 | 1 | 1 | 1 | 0 | 1 | 1 | 0 | 1 | 0 | 1 |
| 0023 | 1 | 1 | 1 | 1 | 1 | 0 | 1 | 1 | 0 | 1 | 0 | 1 |
| 0024 | 1 | 1 | 1 | 1 | 0 | 0 | 1 | 1 | 0 | 1 | 1 | 1 |
| 0025 | 1 | 1 | 0 | 1 | 0 | 0 | 1 | 1 | 0 | 1 | 1 | 1 |
| 0026 | 1 | 1 | 0 | 1 | 0 | 0 | 1 | 1 | 0 | 1 | 1 | 1 |
| 0027 | 1 | 1 | 0 | 1 | 0 | 0 | 1 | 1 | 0 | 1 | 1 | 1 |
| 0028 | 1 | 1 | 1 | 1 | 0 | 0 | 1 | 1 | 0 | 1 | 1 | 1 |
| 0029 | 1 | 1 | 1 | 1 | 1 | 0 | 1 | 1 | 0 | 1 | 1 | 1 |
| 002A | 1 | 1 | 1 | 1 | 1 | 0 | 1 | 1 | 0 | 1 | 1 | 1 |
| 002B | 1 | 1 | 1 | 1 | 1 | 0 | 1 | 1 | 0 | 1 | 1 | 1 |
| 002C | 1 | 1 | 1 | 1 | 1 | 0 | 1 | 1 | 0 | 1 | 1 | 1 |
| 002D | 1 | 1 | 1 | 1 | 0 | 0 | 1 | 1 | 0 | 1 | 0 | 1 |
| 002E | 1 | 1 | 1 | 1 | 1 | 0 | 1 | 1 | 0 | 1 | 0 | 1 |
| 002F | 1 | 1 | 1 | 1 | 1 | 0 | 1 | 1 | 0 | 1 | 0 | 1 |
| 0030 | 0 | 1 | 1 | 1 | 1 | 0 | 1 | 0 | 0 | 1 | 0 | 0 |
| 0031 | 0 | 1 | 1 | 1 | 1 | 0 | 1 | 1 | 0 | 1 | 0 | 0 |
| 0032 | 0 | 1 | 1 | 1 | 1 | 0 | 1 | 1 | 0 | 1 | 0 | 0 |
| 0033 | 0 | 1 | 1 | 1 | 1 | 0 | 1 | 1 | 0 | 1 | 0 | 0 |
| 0034 | 0 | 1 | 1 | 1 | 1 | 0 | 1 | 1 | 0 | 1 | 0 | 0 |
| 0035 | 0 | 1 | 1 | 1 | 1 | 0 | 1 | 1 | 0 | 1 | 0 | 0 |
| 0036 | 0 | 1 | 1 | 1 | 1 | 0 | 1 | 1 | 1 | 1 | 0 | 0 |
| 0037 | 1 | 1 | 1 | 1 | 1 | 1 | 1 | 1 | 1 | 1 | 1 | 1 |

PART II

MICROCODE OFFSET IN PROM = 0080

| | | Function | | | | | | | | | | |
|---|---|---|---|---|---|---|---|---|---|---|---|---|
| | | T-R-W | | | | | R-A-M | | | CAU | | |
| Microcode # | | CKX M12 | CKY M13 | CKP M14 | ACC M15 | SUB M16 | A0 M17 | A1 M18 | A2 M19 | WR M20 | RDY M21 | MAG M22 | M23 |
| Step # | 0000 | 0 | 0 | 0 | 0 | 0 | 0 | 0 | 0 | 0 | 0 | 1 | 1 |
| | 0001 | 1 | 0 | 0 | 0 | 0 | 0 | 0 | 0 | 1 | 0 | 1 | 1 |
| | 0002 | 0 | 0 | 0 | 0 | 0 | 1 | 0 | 0 | 0 | 0 | 1 | 1 |
| | 0003 | 0 | 0 | 0 | 0 | 0 | 1 | 0 | 0 | 1 | 0 | 1 | 1 |
| | 0004 | 0 | 0 | 0 | 0 | 0 | 0 | 1 | 0 | 0 | 0 | 1 | 1 |
| | 0005 | 0 | 0 | 0 | 0 | 0 | 0 | 1 | 0 | 1 | 0 | 1 | 1 |
| | 0006 | 0 | 1 | 0 | 0 | 0 | 0 | 1 | 0 | 0 | 0 | 1 | 1 |
| | 0007 | 0 | 0 | 1 | 0 | 0 | 1 | 1 | 0 | 1 | 0 | 1 | 1 |
| | 0008 | 1 | 0 | 0 | 0 | 0 | 1 | 1 | 0 | 0 | 0 | 1 | 1 |
| | 0009 | 0 | 1 | 0 | 1 | 0 | 1 | 0 | 0 | 0 | 0 | 1 | 1 |
| | 000A | 0 | 0 | 1 | 0 | 0 | 0 | 1 | 1 | 0 | 0 | 1 | 1 |
| | 000B | 0 | 0 | 0 | 0 | 0 | 0 | 1 | 1 | 0 | 0 | 1 | 1 |
| | 000C | 0 | 0 | 0 | 0 | 0 | 0 | 1 | 1 | 1 | 0 | 1 | 1 |
| | 000D | 0 | 1 | 0 | 0 | 0 | 1 | 1 | 0 | 0 | 0 | 1 | 1 |
| | 000E | 0 | 0 | 1 | 0 | 0 | 0 | 1 | 0 | 0 | 0 | 1 | 1 |
| | 000F | 1 | 1 | 0 | 1 | 0 | 0 | 1 | 0 | 0 | 0 | 1 | 1 |
| | 0010 | 0 | 0 | 1 | 0 | 0 | 0 | 0 | 1 | 0 | 0 | 1 | 1 |
| | 0011 | 0 | 1 | 0 | 0 | 0 | 0 | 0 | 1 | 0 | 0 | 1 | 1 |
| | 0012 | 1 | 0 | 0 | 0 | 0 | 0 | 0 | 1 | 1 | 0 | 1 | 1 |
| | 0013 | 0 | 0 | 1 | 0 | 0 | 1 | 0 | 1 | 0 | 0 | 1 | 1 |
| | 0014 | 1 | 0 | 0 | 0 | 0 | 1 | 0 | 1 | 0 | 0 | 1 | 1 |
| | 0015 | 0 | 0 | 1 | 0 | 0 | 1 | 1 | 1 | 0 | 0 | 1 | 1 |
| | 0016 | 1 | 0 | 0 | 1 | 1 | 1 | 0 | 1 | 0 | 0 | 1 | 1 |
| | 0017 | 0 | 0 | 1 | 0 | 0 | 1 | 0 | 1 | 0 | 0 | 1 | 1 |
| | 0018 | 0 | 0 | 0 | 0 | 0 | 1 | 0 | 1 | 1 | 0 | 1 | 1 |
| | 0019 | 0 | 1 | 0 | 0 | 0 | 1 | 0 | 1 | 0 | 0 | 1 | 1 |
| | 001A | 1 | 0 | 0 | 0 | 0 | 0 | 0 | 1 | 0 | 0 | 1 | 1 |
| | 001B | 0 | 0 | 1 | 0 | 0 | 1 | 0 | 1 | 0 | 0 | 1 | 1 |
| | 001C | 1 | 0 | 0 | 0 | 0 | 1 | 0 | 1 | 0 | 0 | 1 | 1 |
| | 001D | 0 | 0 | 1 | 0 | 0 | 1 | 0 | 1 | 0 | 0 | 1 | 1 |
| | 001E | 1 | 0 | 0 | 1 | 1 | 1 | 0 | 1 | 0 | 0 | 1 | 1 |
| | 001F | 0 | 0 | 1 | 0 | 0 | 1 | 0 | 1 | 0 | 0 | 1 | 1 |
| | 0020 | 1 | 0 | 0 | 0 | 0 | 1 | 0 | 1 | 1 | 0 | 1 | 1 |
| | 0021 | 0 | 1 | 0 | 0 | 0 | 0 | 1 | 1 | 0 | 0 | 1 | 1 |
| | 0022 | 0 | 0 | 1 | 0 | 0 | 0 | 0 | 1 | 0 | 0 | 1 | 1 |
| | 0023 | 0 | 0 | 0 | 0 | 0 | 0 | 0 | 1 | 1 | 0 | 1 | 1 |
| | 0024 | 0 | 1 | 0 | 0 | 0 | 1 | 1 | 0 | 0 | 0 | 1 | 1 |
| | 0025 | 1 | 0 | 0 | 0 | 0 | 0 | 0 | 0 | 0 | 0 | 1 | 1 |
| | 0026 | 0 | 0 | 1 | 0 | 1 | 1 | 0 | 0 | 0 | 0 | 1 | 1 |
| | 0027 | 1 | 0 | 0 | 0 | 1 | 1 | 0 | 0 | 0 | 0 | 1 | 1 |
| | 0028 | 0 | 1 | 0 | 1 | 1 | 0 | 1 | 0 | 0 | 0 | 1 | 1 |
| | 0029 | 0 | 0 | 1 | 0 | 0 | 1 | 1 | 1 | 0 | 0 | 1 | 1 |
| | 002A | 0 | 0 | 0 | 0 | 0 | 1 | 1 | 1 | 0 | 0 | 1 | 1 |
| | 002B | 0 | 0 | 0 | 0 | 0 | 1 | 1 | 1 | 1 | 0 | 1 | 1 |
| | 002C | 1 | 0 | 0 | 0 | 0 | 1 | 0 | 1 | 0 | 0 | 1 | 1 |

TABLE 1-continued
DIVIDE MICROCODE

| 002D | 0 | 1 | 0 | 0 | 0 | 1 | 0 | 1 | 0 | 0 | 1 | 1 |
|------|---|---|---|---|---|---|---|---|---|---|---|---|
| 002E | 0 | 0 | 1 | 0 | 0 | 1 | 0 | 1 | 0 | 0 | 1 | 1 |
| 002F | 0 | 0 | 0 | 0 | 0 | 1 | 0 | 1 | 1 | 0 | 1 | 1 |
| 0030 | 0 | 0 | 0 | 0 | 0 | 0 | 0 | 0 | 1 | 1 | 1 | 1 |
| 0031 | 0 | 0 | 0 | 0 | 0 | 0 | 0 | 0 | 0 | 0 | 1 | 1 |
| 0032 | 0 | 0 | 0 | 0 | 0 | 0 | 0 | 1 | 0 | 0 | 1 | 1 |
| 0033 | 0 | 0 | 0 | 0 | 0 | 0 | 0 | 1 | 0 | 0 | 1 | 1 |
| 0034 | 0 | 0 | 0 | 0 | 0 | 1 | 0 | 1 | 0 | 0 | 1 | 1 |
| 0035 | 0 | 0 | 0 | 0 | 0 | 1 | 0 | 1 | 0 | 0 | 1 | 1 |
| 0036 | 0 | 0 | 0 | 0 | 0 | 0 | 0 | 0 | 0 | 0 | 1 | 1 |
| 0037 | 1 | 1 | 1 | 1 | 1 | 1 | 1 | 1 | 1 | 1 | 1 | 1 |

TABLE 2
MULLTIPLY MICROCODE
PART I

MICROCODE OFFSET IN PROM = 00C0

| | | | | | | Function | | | | | |
|---|---|---|---|---|---|---|---|---|---|---|---|
| | Int/ | A | E | Look | G | | Div | Re- | D-M-P-X | | |
| | Ext | Buf | Buf | Up | Buf | ZL | Cons | Stat | Set | 0 | 1 | 2 |
| Microcode # | M0 | M1 | M2 | M3 | M4 | M5 | M6 | M7 | M8 | M9 | M10 | M11 |
| Step # 0000 - | 0 | 0 | 1 | 1 | 1 | 0 | 1 | 1 | 0 | 0 | 0 | 0 |
| 0001 - | 0 | 0 | 1 | 1 | 1 | 0 | 1 | 1 | 0 | 0 | 0 | 0 |
| 0002 - | 0 | 0 | 1 | 1 | 1 | 0 | 1 | 1 | 0 | 0 | 0 | 0 |
| 0003 - | 0 | 0 | 1 | 1 | 1 | 0 | 1 | 1 | 0 | 0 | 0 | 0 |
| 0004 - | 0 | 0 | 1 | 1 | 1 | 0 | 1 | 1 | 0 | 0 | 0 | 0 |
| 0005 - | 0 | 0 | 1 | 1 | 1 | 0 | 1 | 1 | 0 | 0 | 0 | 0 |
| 0006 - | 0 | 0 | 1 | 1 | 1 | 0 | 1 | 1 | 0 | 0 | 0 | 0 |
| 0007 - | 1 | 0 | 1 | 1 | 1 | 0 | 1 | 1 | 0 | 0 | 0 | 0 |
| 0008 - | 1 | 1 | 1 | 1 | 0 | 0 | 1 | 1 | 0 | 0 | 0 | 0 |
| 0009 - | 1 | 1 | 1 | 1 | 0 | 0 | 1 | 1 | 0 | 0 | 0 | 0 |
| 000A - | 1 | 1 | 1 | 1 | 0 | 0 | 1 | 1 | 0 | 0 | 0 | 0 |
| 000B - | 1 | 1 | 0 | 1 | 1 | 0 | 1 | 1 | 0 | 0 | 0 | 1 |
| 000C - | 1 | 1 | 1 | 1 | 1 | 0 | 1 | 1 | 0 | 0 | 0 | 1 |
| 000D - | 1 | 1 | 1 | 1 | 1 | 0 | 1 | 1 | 0 | 0 | 0 | 1 |
| 000E - | 1 | 1 | 0 | 1 | 1 | 0 | 1 | 1 | 0 | 0 | 0 | 1 |
| 000F - | 1 | 1 | 0 | 1 | 1 | 0 | 1 | 1 | 0 | 0 | 0 | 1 |
| 0010 - | 1 | 1 | 0 | 1 | 1 | 0 | 1 | 1 | 0 | 0 | 0 | 1 |
| 0011 - | 1 | 1 | 1 | 1 | 0 | 0 | 1 | 1 | 0 | 0 | 0 | 1 |
| 0012 - | 1 | 1 | 1 | 1 | 1 | 0 | 1 | 1 | 0 | 0 | 0 | 1 |
| 0013 - | 1 | 1 | 1 | 1 | 1 | 0 | 1 | 1 | 0 | 0 | 0 | 1 |
| 0014 - | 0 | 1 | 1 | 1 | 1 | 0 | 1 | 0 | 0 | 0 | 0 | 0 |
| 0015 - | 0 | 1 | 1 | 1 | 1 | 0 | 1 | 1 | 0 | 0 | 0 | 0 |
| 0016 - | 0 | 1 | 1 | 1 | 1 | 0 | 1 | 1 | 0 | 0 | 0 | 0 |
| 0017 - | 0 | 1 | 1 | 1 | 1 | 0 | 1 | 1 | 0 | 0 | 0 | 0 |
| 0018 - | 0 | 1 | 1 | 1 | 1 | 0 | 1 | 1 | 0 | 0 | 0 | 0 |
| 0019 - | 0 | 1 | 1 | 1 | 1 | 0 | 1 | 1 | 0 | 0 | 0 | 0 |
| 001A - | 0 | 1 | 1 | 1 | 1 | 0 | 1 | 1 | 1 | 0 | 0 | 0 |
| 001B - | 1 | 1 | 1 | 1 | 1 | 1 | 1 | 1 | 1 | 1 | 1 | 1 |

PART II

MICROCODE OFFSET IN PROM = 00C0

| | | | | | | Function | | | | | |
|---|---|---|---|---|---|---|---|---|---|---|---|
| | T-R-W | | | | | R-A-M | | | | CAU | | |
| | CKX | CKY | CKP | ACC | SUB | A0 | A1 | A2 | WR | RDY | MAG | |
| Microcode # | M12 | M13 | M14 | M15 | M16 | M17 | M18 | M19 | M20 | M21 | M22 | M23 |
| Step # 0000 - | 0 | 0 | 0 | 0 | 0 | 0 | 0 | 0 | 0 | 0 | 1 | 1 |
| 0001 - | 1 | 0 | 0 | 0 | 0 | 0 | 0 | 0 | 1 | 0 | 1 | 1 |
| 0002 - | 0 | 0 | 0 | 0 | 0 | 1 | 0 | 0 | 0 | 0 | 1 | 1 |
| 0003 - | 0 | 0 | 0 | 0 | 0 | 1 | 0 | 0 | 1 | 0 | 1 | 1 |
| 0004 - | 0 | 0 | 0 | 0 | 0 | 0 | 1 | 0 | 0 | 0 | 1 | 1 |
| 0005 - | 0 | 0 | 0 | 0 | 0 | 0 | 1 | 0 | 1 | 0 | 1 | 1 |
| 0006 - | 0 | 0 | 0 | 0 | 0 | 1 | 1 | 0 | 0 | 0 | 1 | 1 |
| 0007 - | 0 | 0 | 0 | 0 | 0 | 1 | 1 | 0 | 1 | 0 | 1 | 1 |
| 0008 - | 0 | 1 | 0 | 0 | 0 | 1 | 0 | 0 | 0 | 0 | 1 | 1 |
| 0009 - | 0 | 0 | 1 | 0 | 0 | 1 | 0 | 0 | 0 | 0 | 1 | 1 |
| 000A - | 0 | 1 | 0 | 1 | 0 | 1 | 0 | 0 | 0 | 0 | 1 | 1 |
| 000B - | 1 | 0 | 0 | 1 | 0 | 0 | 1 | 0 | 0 | 0 | 1 | 1 |
| 000C - | 0 | 0 | 1 | 0 | 0 | 1 | 0 | 1 | 0 | 0 | 1 | 1 |
| 000D - | 0 | 0 | 0 | 0 | 0 | 1 | 0 | 1 | 1 | 0 | 1 | 1 |
| 000E - | 1 | 0 | 0 | 0 | 0 | 1 | 1 | 0 | 0 | 0 | 1 | 1 |
| 000F - | 0 | 0 | 1 | 0 | 0 | 0 | 0 | 0 | 0 | 0 | 1 | 1 |
| 0010 - | 1 | 0 | 0 | 1 | 1 | 0 | 0 | 0 | 0 | 0 | 1 | 1 |
| 0011 - | 0 | 1 | 0 | 1 | 1 | 0 | 1 | 0 | 0 | 0 | 1 | 1 |
| 0012 - | 0 | 0 | 1 | 1 | 1 | 0 | 0 | 1 | 0 | 0 | 1 | 1 |
| 0013 - | 0 | 0 | 0 | 0 | 0 | 0 | 0 | 1 | 1 | 0 | 1 | 1 |
| 0014 - | 0 | 0 | 0 | 0 | 0 | 0 | 0 | 0 | 1 | 1 | 1 | 1 |

TABLE 2-continued
MULLTIPLY MICROCODE

| | | | | | | | | | | | | |
|---|---|---|---|---|---|---|---|---|---|---|---|---|
| 0015 - | 0 | 0 | 0 | 0 | 0 | 0 | 0 | 0 | 0 | 0 | 1 | 1 |
| 0016 - | 0 | 0 | 0 | 0 | 0 | 0 | 0 | 1 | 0 | 0 | 1 | 1 |
| 0017 - | 0 | 0 | 0 | 0 | 0 | 0 | 0 | 1 | 0 | 0 | 1 | 1 |
| 0018 - | 0 | 0 | 0 | 0 | 0 | 1 | 0 | 1 | 0 | 0 | 1 | 1 |
| 0019 - | 0 | 0 | 0 | 0 | 0 | 1 | 0 | 1 | 0 | 0 | 1 | 1 |
| 001A - | 0 | 0 | 0 | 0 | 0 | 0 | 0 | 0 | 0 | 0 | 1 | 1 |
| 001B - | 1 | 1 | 1 | 1 | 1 | 1 | 1 | 1 | 1 | 1 | 1 | 1 |

TABLE 3
MAGNITUDE MICROCODE
PART I
MICROCODE OFFSET IN PROM = 0100

| | Function - | | | | | | | | | | |
|---|---|---|---|---|---|---|---|---|---|---|---|
| | Int/ | A | E | Look | G | | Div | | Re- | D-M-P-X | | |
| | Ext | Buf | Buf | Up | Buf | ZL | Cons | Stat | Set | 0 | 1 | 2 |
| Microcode # | M0 | M1 | M2 | M3 | M4 | M5 | M6 | M7 | M8 | M9 | M10 | M11 |
| Step # 0000 - | 0 | 0 | 1 | 1 | 1 | 0 | 1 | 1 | 0 | 1 | 1 | 1 |
| 0001 - | 0 | 0 | 1 | 1 | 1 | 0 | 1 | 1 | 0 | 1 | 1 | 1 |
| 0002 - | 0 | 0 | 1 | 1 | 1 | 0 | 1 | 1 | 0 | 1 | 1 | 1 |
| 0003 - | 1 | 0 | 1 | 1 | 0 | 0 | 1 | 1 | 0 | 1 | 1 | 1 |
| 0004 - | 1 | 1 | 1 | 1 | 0 | 0 | 1 | 1 | 0 | 1 | 1 | 1 |
| 0005 - | 1 | 1 | 1 | 1 | 1 | 0 | 1 | 1 | 0 | 1 | 1 | 1 |
| 0006 - | 1 | 1 | 1 | 1 | 1 | 0 | 1 | 1 | 0 | 1 | 1 | 1 |
| 0007 - | 1 | 1 | 1 | 1 | 1 | 0 | 1 | 1 | 0 | 1 | 1 | 1 |
| 0008 - | 1 | 1 | 1 | 1 | 0 | 0 | 1 | 1 | 0 | 0 | 1 | 1 |
| 0009 - | 1 | 1 | 1 | 1 | 1 | 0 | 1 | 1 | 0 | 0 | 1 | 1 |
| 000A - | 1 | 1 | 1 | 0 | 1 | 1 | 1 | 1 | 0 | 0 | 1 | 1 |
| 000B - | 1 | 1 | 1 | 1 | 1 | 0 | 1 | 1 | 0 | 0 | 1 | 1 |
| 000C - | 1 | 1 | 1 | 1 | 1 | 0 | 1 | 1 | 0 | 0 | 0 | 0 |
| 000D - | 1 | 1 | 1 | 1 | 1 | 0 | 1 | 1 | 0 | 0 | 0 | 0 |
| 000E - | 1 | 1 | 1 | 1 | 0 | 0 | 0 | 1 | 0 | 0 | 0 | 0 |
| 000F - | 1 | 1 | 1 | 1 | 1 | 0 | 0 | 1 | 0 | 1 | 1 | 0 |
| 0010 - | 1 | 1 | 1 | 1 | 1 | 0 | 1 | 1 | 0 | 1 | 1 | 0 |
| 0011 - | 1 | 1 | 1 | 1 | 1 | 0 | 1 | 1 | 0 | 1 | 1 | 0 |
| 0012 - | 1 | 1 | 1 | 1 | 0 | 0 | 1 | 1 | 0 | 0 | 0 | 0 |
| 0013 - | 1 | 1 | 0 | 1 | 1 | 0 | 1 | 1 | 0 | 0 | 0 | 0 |
| 0014 - | 1 | 1 | 1 | 1 | 1 | 0 | 1 | 1 | 0 | 0 | 0 | 0 |
| 0015 - | 1 | 1 | 1 | 1 | 1 | 0 | 1 | 1 | 0 | 0 | 0 | 0 |
| 0016 - | 1 | 1 | 1 | 1 | 1 | 0 | 0 | 1 | 0 | 0 | 0 | 0 |
| 0017 - | 1 | 1 | 1 | 1 | 1 | 0 | 0 | 1 | 0 | 1 | 1 | 0 |
| 0018 - | 1 | 1 | 1 | 1 | 1 | 0 | 1 | 1 | 0 | 1 | 1 | 0 |
| 0019 - | 1 | 1 | 1 | 1 | 1 | 0 | 1 | 1 | 0 | 1 | 1 | 0 |
| 001A - | 1 | 1 | 1 | 1 | 0 | 0 | 1 | 1 | 0 | 1 | 0 | 1 |
| 001B - | 1 | 1 | 1 | 1 | 1 | 0 | 1 | 1 | 0 | 1 | 0 | 1 |
| 001C - | 1 | 1 | 1 | 1 | 1 | 0 | 1 | 1 | 0 | 1 | 0 | 1 |
| 001D - | 1 | 1 | 1 | 1 | 0 | 0 | 0 | 1 | 0 | 0 | 0 | 0 |
| 001E - | 1 | 1 | 1 | 0 | 1 | 0 | 1 | 1 | 0 | 1 | 0 | 0 |
| 001F - | 1 | 1 | 1 | 0 | 1 | 0 | 1 | 1 | 0 | 1 | 0 | 0 |
| 0020 - | 1 | 1 | 1 | 1 | 0 | 0 | 1 | 1 | 0 | 0 | 0 | 1 |
| 0021 - | 1 | 1 | 1 | 0 | 1 | 0 | 1 | 1 | 0 | 0 | 0 | 1 |
| 0022 - | 1 | 1 | 0 | 0 | 1 | 0 | 1 | 1 | 0 | 0 | 0 | 1 |
| 0023 - | 1 | 1 | 1 | 1 | 1 | 0 | 1 | 1 | 0 | 0 | 0 | 1 |
| 0024 - | 1 | 1 | 1 | 1 | 1 | 0 | 1 | 1 | 0 | 0 | 0 | 1 |
| 0025 - | 0 | 1 | 1 | 1 | 1 | 0 | 1 | 0 | 0 | 0 | 0 | 1 |
| 0026 - | 0 | 1 | 1 | 1 | 1 | 0 | 1 | 1 | 0 | 0 | 0 | 1 |
| 0027 - | 0 | 1 | 1 | 1 | 1 | 0 | 1 | 1 | 0 | 0 | 0 | 1 |
| 0028 - | 0 | 1 | 1 | 1 | 1 | 0 | 1 | 1 | 0 | 0 | 0 | 1 |
| 0029 - | 0 | 1 | 1 | 1 | 1 | 0 | 1 | 1 | 1 | 0 | 0 | 1 |
| 002A - | 1 | 1 | 1 | 1 | 1 | 1 | 1 | 1 | 1 | 1 | 1 | 1 |

PART II
MICROCODE OFFSET IN PROM = 0100

| | Function - | | | | | | | | | | | |
|---|---|---|---|---|---|---|---|---|---|---|---|---|
| | T-R-W | | | | | R-A-M | | | | CAU | | |
| | CKX | CKY | CKP | ACC | SUB | A0 | A1 | A2 | WR | RDY | MAG | |
| Microcode # | M12 | M13 | M14 | M15 | M16 | M17 | M18 | M19 | M20 | M21 | M22 | M23 |
| Step # 0000 - | 0 | 0 | 0 | 0 | 0 | 0 | 0 | 0 | 0 | 0 | 1 | 1 |
| 0001 - | 1 | 0 | 0 | 0 | 0 | 0 | 0 | 0 | 1 | 0 | 1 | 1 |
| 0002 - | 0 | 0 | 0 | 0 | 0 | 0 | 1 | 0 | 0 | 0 | 1 | 1 |
| 0003 - | 0 | 0 | 0 | 0 | 0 | 0 | 1 | 0 | 1 | 0 | 1 | 1 |
| 0004 - | 0 | 1 | 0 | 0 | 0 | 0 | 1 | 0 | 0 | 0 | 1 | 1 |
| 0005 - | 0 | 0 | 1 | 0 | 0 | 0 | 1 | 1 | 0 | 0 | 1 | 1 |
| 0006 - | 0 | 0 | 0 | 0 | 0 | 0 | 1 | 1 | 0 | 0 | 1 | 1 |
| 0007 - | 0 | 0 | 0 | 0 | 0 | 0 | 1 | 1 | 1 | 0 | 1 | 1 |
| 0008 - | 0 | 1 | 0 | 0 | 0 | 0 | 0 | 0 | 0 | 0 | 1 | 1 |
| 0009 - | 0 | 0 | 1 | 0 | 0 | 0 | 0 | 1 | 0 | 0 | 1 | 1 |

TABLE 3-continued
MAGNITUDE MICROCODE

| | | | | | | | | | | | | |
|---|---|---|---|---|---|---|---|---|---|---|---|---|
| 000A - | 0 | 1 | 0 | 0 | 0 | 0 | 0 | 1 | 0 | 0 | 1 | 1 |
| 000B - | 1 | 0 | 0 | 0 | 0 | 0 | 0 | 1 | 1 | 0 | 1 | 1 |
| 000C - | 0 | 0 | 1 | 0 | 0 | 1 | 0 | 1 | 0 | 0 | 1 | 1 |
| 000D - | 1 | 0 | 0 | 0 | 0 | 1 | 0 | 1 | 0 | 0 | 1 | 1 |
| 000E - | 0 | 0 | 1 | 0 | 0 | 1 | 0 | 1 | 0 | 0 | 1 | 1 |
| 000F - | 1 | 0 | 0 | 1 | 1 | 1 | 0 | 1 | 0 | 0 | 1 | 1 |
| 0010 - | 0 | 0 | 1 | 0 | 0 | 1 | 0 | 1 | 0 | 0 | 1 | 1 |
| 0011 - | 0 | 0 | 0 | 0 | 0 | 1 | 0 | 1 | 1 | 0 | 1 | 1 |
| 0012 - | 0 | 1 | 0 | 0 | 0 | 1 | 0 | 1 | 0 | 0 | 1 | 1 |
| 0013 - | 1 | 0 | 0 | 0 | 0 | 0 | 0 | 1 | 0 | 0 | 1 | 1 |
| 0014 - | 0 | 0 | 1 | 0 | 0 | 1 | 0 | 1 | 0 | 0 | 1 | 1 |
| 0015 - | 1 | 0 | 0 | 0 | 0 | 1 | 0 | 1 | 0 | 0 | 1 | 1 |
| 0016 - | 0 | 0 | 1 | 0 | 0 | 1 | 0 | 1 | 0 | 0 | 1 | 1 |
| 0017 - | 1 | 0 | 0 | 1 | 1 | 1 | 0 | 1 | 0 | 0 | 1 | 1 |
| 0018 - | 0 | 0 | 1 | 0 | 0 | 1 | 0 | 1 | 0 | 0 | 1 | 1 |
| 0019 - | 1 | 0 | 0 | 0 | 0 | 0 | 1 | 1 | 0 | 0 | 1 | 1 |
| 001A - | 0 | 1 | 0 | 0 | 0 | 0 | 1 | 1 | 0 | 0 | 1 | 1 |
| 001B - | 0 | 0 | 1 | 0 | 0 | 0 | 0 | 1 | 0 | 0 | 1 | 1 |
| 001C - | 0 | 0 | 0 | 0 | 0 | 0 | 0 | 1 | 1 | 0 | 0 | 1 |
| 001D - | 1 | 1 | 0 | 0 | 0 | 0 | 0 | 0 | 0 | 0 | 0 | 1 |
| 001E - | 0 | 0 | 1 | 0 | 0 | 0 | 0 | 0 | 0 | 0 | 0 | 1 |
| 001F - | 0 | 0 | 0 | 0 | 0 | 0 | 0 | 1 | 0 | 0 | 0 | 1 |
| 0020 - | 0 | 1 | 0 | 0 | 0 | 0 | 0 | 1 | 0 | 0 | 0 | 1 |
| 0021 - | 0 | 0 | 1 | 0 | 0 | 0 | 0 | 0 | 0 | 0 | 0 | 1 |
| 0022 - | 1 | 1 | 0 | 0 | 0 | 0 | 0 | 0 | 0 | 0 | 0 | 1 |
| 0023 - | 0 | 0 | 1 | 0 | 0 | 0 | 0 | 1 | 0 | 0 | 0 | 1 |
| 0024 - | 0 | 0 | 0 | 0 | 0 | 0 | 0 | 1 | 1 | 0 | 1 | 1 |
| 0025 - | 0 | 0 | 0 | 0 | 0 | 0 | 0 | 1 | 1 | 1 | 1 | 1 |
| 0026 - | 0 | 0 | 0 | 0 | 0 | 0 | 0 | 0 | 0 | 0 | 1 | 1 |
| 0027 - | 0 | 0 | 0 | 0 | 0 | 0 | 1 | 0 | 0 | 0 | 1 | 1 |
| 0028 - | 0 | 0 | 0 | 0 | 0 | 0 | 0 | 1 | 0 | 0 | 1 | 1 |
| 0029 - | 0 | 0 | 0 | 0 | 0 | 0 | 1 | 0 | 0 | 0 | 1 | 1 |
| 002A - | 1 | 1 | 1 | 1 | 1 | 1 | 1 | 1 | 1 | 1 | 1 | 1 |

TABLE R
DIVIDE LOOKUP
LOOKUP PROM OFFSET + 0000
THE LOOKUP PROM CONTENTS:
NORMAL DIVIDE LOOKUP

| | | | | | | | | |
|---|---|---|---|---|---|---|---|---|
| 0000 | /AAA0 | 5560 | 3340 | 2490 | 1C70 | 1750 | 13C0 | 1120 |
| 0008 | /0F10 | 0D70 | 0C40 | 0B30 | 0A40 | 0970 | 08D0 | 0840 |
| 0010 | /07C0 | 0750 | 06E0 | 0690 | 0630 | 05F0 | 05B0 | 0570 |
| 0018 | /0530 | 0500 | 04D0 | 04A0 | 0470 | 0450 | 0430 | 0410 |
| 0020 | /03F0 | 03D0 | 03B0 | 0390 | 0380 | 0360 | 0350 | 0330 |
| 0028 | /0320 | 0310 | 0300 | 02F0 | 02E0 | 02D0 | 02C0 | 02B0 |
| 0030 | /02A0 | 0290 | 0280 | 0270 | 0270 | 0260 | 0250 | 0240 |
| 0038 | /0240 | 0230 | 0230 | 0220 | 0210 | 0210 | 0200 | 0200 |
| 0040 | /01F0 | 01F0 | 01E0 | 01E0 | 01D0 | 01D0 | 01D0 | 01C0 |
| 0048 | /01C0 | 01B0 | 01B0 | 01B0 | 01A0 | 01A0 | 01A0 | 0190 |
| 0050 | /0190 | 0190 | 0180 | 0180 | 0180 | 0170 | 0170 | 0170 |
| 0058 | /0170 | 0160 | 0160 | 0160 | 0160 | 0150 | 0150 | 0150 |
| 0060 | /0150 | 0150 | 0140 | 0140 | 0140 | 0140 | 0130 | 0130 |
| 0068 | /0130 | 0130 | 0130 | 0130 | 0120 | 0120 | 0120 | 0120 |
| 0070 | /0120 | 0120 | 0110 | 0110 | 0110 | 0110 | 0110 | 0110 |
| 0078 | /0100 | 0100 | 0100 | 0100 | 0100 | 0100 | 0100 | 0100 |
| 0080 | /00F0 | 00F0 | 00F0 | 00F0 | 00F0 | 00F0 | 00F0 | 00F0 |
| 0088 | /00F0 | 00E0 | 00E0 | 00E0 | 00E0 | 00E0 | 00E0 | 00E0 |
| 0090 | /00E0 | 00E0 | 00D0 | 00D0 | 00D0 | 00D0 | 00D0 | 00D0 |
| 0098 | /00D0 | 00D0 | 00D0 | 00D0 | 00D0 | 00D0 | 00C0 | 00C0 |
| 00A0 | /00C0 | 00C0 | 00C0 | 00C0 | 00C0 | 00C0 | 00C0 | 00C0 |
| 00A8 | /00C0 | 00C0 | 00C0 | 00B0 | 00B0 | 00B0 | 00B0 | 00B0 |
| 00B0 | /00B0 | 00B0 | 00B0 | 00B0 | 00B0 | 00B0 | 00B0 | 00B0 |
| 00B8 | /00B0 | 00B0 | 00A0 | 00A0 | 00A0 | 00A0 | 00A0 | 00A0 |
| 00C0 | /00A0 | 00A0 | 00A0 | 00A0 | 00A0 | 00A0 | 00A0 | 00A0 |
| 00C8 | /00A0 | 00A0 | 00A0 | 00A0 | 00A0 | 0090 | 0090 | 0090 |
| 00D0 | /0090 | 0090 | 0090 | 0090 | 0090 | 0090 | 0090 | 0090 |
| 00D8 | /0090 | 0090 | 0090 | 0090 | 0090 | 0090 | 0090 | 0090 |
| 00E0 | /0090 | 0090 | 0090 | 0090 | 0090 | 0080 | 0080 | 0080 |
| 00E8 | /0080 | 0080 | 0080 | 0080 | 0080 | 0080 | 0080 | 0080 |
| 00F0 | /0080 | 0080 | 0080 | 0080 | 0080 | 0080 | 0080 | 0080 |
| 00F8 | /0080 | 0080 | 0080 | 0080 | 0080 | 0080 | 0080 | 0080 |

TABLE R-continued
DIVIDE LOOKUP
LOOKUP PROM OFFSET + 0000
THE LOOKUP PROM CONTENTS:
LATCHED/OPTIMIZED LOOKUP

| | | | | | | | | |
|---|---|---|---|---|---|---|---|---|
| 0100 | /FFF0 | AAA0 | 6660 | 4920 | 38E0 | 2E80 | 2760 | 2220 |
| 0108 | /1E10 | 1AF0 | 1860 | 1640 | 1470 | 12F0 | 11A0 | 1080 |
| 0110 | /0F80 | 0EA0 | 0DD0 | 0D20 | 0C70 | 0BE0 | 0B60 | 0AE0 |
| 0118 | /0A70 | 0A00 | 09A0 | 0940 | 08F0 | 08A0 | 0860 | 0820 |
| 0120 | /07E0 | 07A0 | 0760 | 0730 | 0700 | 06D0 | 06A0 | 0670 |
| 0128 | /0650 | 0620 | 0600 | 05E0 | 05C0 | 05A0 | 0580 | 0560 |
| 0130 | /0540 | 0520 | 0510 | 04F0 | 04E0 | 04C0 | 04B0 | 0490 |
| 0138 | /0480 | 0470 | 0460 | 0440 | 0430 | 0420 | 0410 | 0400 |
| 0140 | /03F0 | 03E0 | 03D0 | 03C0 | 03B0 | 03A0 | 03A0 | 0390 |
| 0148 | /0380 | 0370 | 0360 | 0360 | 0350 | 0340 | 0340 | 0330 |
| 0150 | /0320 | 0320 | 0310 | 0310 | 0300 | 02F0 | 02F0 | 02E0 |
| 0158 | /02E0 | 02D0 | 02D0 | 02C0 | 02C0 | 02B0 | 02B0 | 02A0 |
| 0160 | /02A0 | 02A0 | 0290 | 0290 | 0280 | 0280 | 0270 | 0270 |
| 0168 | /0270 | 0260 | 0260 | 0260 | 0250 | 0250 | 0250 | 0240 |
| 0170 | /0240 | 0240 | 0230 | 0230 | 0230 | 0220 | 0220 | 0220 |
| 0178 | /0210 | 0210 | 0210 | 0210 | 0200 | 0200 | 0200 | 0200 |
| 0180 | /01F0 | 01F0 | 01F0 | 01F0 | 01E0 | 01E0 | 01E0 | 01E0 |
| 0188 | /01E0 | 01D0 | 01D0 | 01D0 | 01D0 | 01C0 | 01C0 | 01C0 |
| 0190 | /01C0 | 01C0 | 01B0 | 01B0 | 01B0 | 01B0 | 01B0 | 01B0 |
| 0198 | /01A0 | 01A0 | 01A0 | 01A0 | 01A0 | 01A0 | 0190 | 0190 |
| 01A0 | /0190 | 0190 | 0190 | 0190 | 0180 | 0180 | 0180 | 0180 |
| 01A8 | /0180 | 0180 | 0180 | 0170 | 0170 | 0170 | 0170 | 0170 |
| 01B0 | /0170 | 0170 | 0160 | 0160 | 0160 | 0160 | 0160 | 0160 |
| 01B8 | /0160 | 0160 | 0150 | 0150 | 0150 | 0150 | 0150 | 0150 |
| 01C0 | /0150 | 0150 | 0140 | 0140 | 0140 | 0140 | 0140 | 0140 |
| 01C8 | /0140 | 0140 | 0140 | 0140 | 0140 | 0130 | 0130 | 0130 |
| 01D0 | /0130 | 0130 | 0130 | 0130 | 0130 | 0130 | 0130 | 0130 |
| 01D8 | /0120 | 0120 | 0120 | 0120 | 0120 | 0120 | 0120 | 0120 |
| 01E0 | /0120 | 0120 | 0120 | 0120 | 0110 | 0110 | 0110 | 0110 |
| 01E8 | /0110 | 0110 | 0110 | 0110 | 0110 | 0110 | 0110 | 0110 |
| 01F0 | /0110 | 0100 | 0100 | 0100 | 0100 | 0100 | 0100 | 0100 |
| 01F8 | /0100 | 0100 | 0100 | 0100 | 0100 | 0100 | 0100 | 0100 |

TABLE 5
MAGNITUDE LOOKUP
LOOKUP PROM OFFSET = 0200

TABLE 5-continued
MAGNITUDE LOOKUP

THE LOOKUP PROM CONTENTS:

| | | | | | | | | |
|---|---|---|---|---|---|---|---|---|
| 0000 | /4000 | 4000 | 4000 | 4000 | 4000 | 4000 | 4010 | 4010 |
| 0008 | /4010 | 4020 | 4030 | 4030 | 4040 | 4050 | 4060 | 4070 |
| 0010 | /4070 | 4080 | 40A0 | 40B0 | 40C0 | 40D0 | 40F0 | 4100 |
| 0018 | /4110 | 4130 | 4140 | 4160 | 4180 | 4190 | 41B0 | 41D0 |
| 0020 | /41F0 | 4210 | 4230 | 4250 | 4270 | 4290 | 42C0 | 42E0 |
| 0028 | /4300 | 4330 | 4350 | 4380 | 43A0 | 43D0 | 4400 | 4420 |
| 0030 | /4450 | 4480 | 44B0 | 44E0 | 4510 | 4540 | 4570 | 45A0 |
| 0038 | /45D0 | 4600 | 4640 | 4670 | 46A0 | 46E0 | 4710 | 4750 |
| 0040 | /4780 | 47C0 | 4800 | 4830 | 4870 | 48B0 | 48F0 | 4920 |
| 0048 | /4960 | 49A0 | 49E0 | 4A20 | 4A60 | 4AB0 | 4AF0 | 4B30 |
| 0050 | /4B70 | 4BB0 | 4C00 | 4C40 | 4C80 | 4CD0 | 4D10 | 4D60 |
| 0058 | /4DA0 | 4DF0 | 4E30 | 4E80 | 4ED0 | 4F10 | 4F60 | 4FB0 |
| 0060 | /5000 | 5040 | 5090 | 50E0 | 5130 | 5180 | 51D0 | 5220 |
| 0068 | /5270 | 52C0 | 5310 | 5360 | 53B0 | 5400 | 5460 | 54B0 |
| 0070 | /5500 | 5550 | 55B0 | 5600 | 5650 | 56B0 | 5700 | 5760 |
| 0078 | /57B0 | 5810 | 5860 | 58C0 | 5910 | 5970 | 59C0 | 5A20 |
| 0080 | /5A80 | FFF0 | FFF0 | FFF0 | FFF0 | FFF0 | FFF0 | FFF0 |
| 0088 | /FFF0 | FFF0 | FFF0 | FFF0 | FFF0 | FFF0 | FFF0 | FFF0 |
| 0090 | /FFF0 | FFF0 | FFF0 | FFF0 | FFF0 | FFF0 | FFF0 | FFF0 |
| 0098 | /FFF0 | FFF0 | FFF0 | FFF0 | FFF0 | FFF0 | FFF0 | FFF0 |
| 00A0 | /FFF0 | FFF0 | FFF0 | FFF0 | FFF0 | FFF0 | FFF0 | FFF0 |
| 00A8 | /FFF0 | FFF0 | FFF0 | FFF0 | FFF0 | FFF0 | FFF0 | FFF0 |
| 00B0 | /FFF0 | FFF0 | FFF0 | FFF0 | FFF0 | FFF0 | FFF0 | FFF0 |
| 00B8 | /FFF0 | FFF0 | FFF0 | FFF0 | FFF0 | FFF0 | FFF0 | FFF0 |
| 00C0 | /FFF0 | FFF0 | FFF0 | FFF0 | FFF0 | FFF0 | FFF0 | FFF0 |
| 00C8 | /FFF0 | FFF0 | FFF0 | FFF0 | FFF0 | FFF0 | FFF0 | FFF0 |
| 00D0 | /FFF0 | FFF0 | FFF0 | FFF0 | FFF0 | FFF0 | FFF0 | FFF0 |
| 00D8 | /FFF0 | FFF0 | FFF0 | FFF0 | FFF0 | FFF0 | FFF0 | FFF0 |
| 00E0 | /FFF0 | FFF0 | FFF0 | FFF0 | FFF0 | FFF0 | FFF0 | FFF0 |
| 00E8 | /FFF0 | FFF0 | FFF0 | FFF0 | FFF0 | FFF0 | FFF0 | FFF0 |
| 00F0 | /FFF0 | FFF0 | FFF0 | FFF0 | FFF0 | FFF0 | FFF0 | FFF0 |
| 00F8 | /FFF0 | FFF0 | FFF0 | FFF0 | FFF0 | FFF0 | FFF0 | FFF0 |
| 0100 | /FFF0 | FFF0 | FFF0 | FFF0 | FFF0 | FFF0 | FFF0 | FFF0 |
| 0108 | /FFF0 | FFF0 | FFF0 | FFF0 | FFF0 | FFF0 | FFF0 | FFF0 |
| 0110 | /FFF0 | FFF0 | FFF0 | FFF0 | FFF0 | FFF0 | FFF0 | FFF0 |
| 0118 | /FFF0 | FFF0 | FFF0 | FFF0 | FFF0 | FFF0 | FFF0 | FFF0 |
| 0120 | /FFF0 | FFF0 | FFF0 | FFF0 | FFF0 | FFF0 | FFF0 | FFF0 |
| 0128 | /FFF0 | FFF0 | FFF0 | FFF0 | FFF0 | FFF0 | FFF0 | FFF0 |
| 0130 | /FFF0 | FFF0 | FFF0 | FFF0 | FFF0 | FFF0 | FFF0 | FFF0 |
| 0138 | /FFF0 | FFF0 | FFF0 | FFF0 | FFF0 | FFF0 | FFF0 | FFF0 |
| 0140 | /FFF0 | FFF0 | FFF0 | FFF0 | FFF0 | FFF0 | FFF0 | FFF0 |
| 0148 | /FFF0 | FFF0 | FFF0 | FFF0 | FFF0 | FFF0 | FFF0 | FFF0 |
| 0150 | /FFF0 | FFF0 | FFF0 | FFF0 | FFF0 | FFF0 | FFF0 | FFF0 |
| 0158 | /FFF0 | FFF0 | FFF0 | FFF0 | FFF0 | FFF0 | FFF0 | FFF0 |
| 0160 | /FFF0 | FFF0 | FFF0 | FFF0 | FFF0 | FFF0 | FFF0 | FFF0 |
| 0168 | /FFF0 | FFF0 | FFF0 | FFF0 | FFF0 | FFF0 | FFF0 | FFF0 |
| 0170 | /FFF0 | FFF0 | FFF0 | FFF0 | FFF0 | FFF0 | FFF0 | FFF0 |
| 0178 | /FFF0 | FFF0 | FFF0 | FFF0 | FFF0 | FFF0 | FFF0 | FFF0 |
| 0180 | /FFF0 | FFF0 | FFF0 | FFF0 | FFF0 | FFF0 | FFF0 | FFF0 |
| 0188 | /FFF0 | FFF0 | FFF0 | FFF0 | FFF0 | FFF0 | FFF0 | FFF0 |
| 0190 | /FFF0 | FFF0 | FFF0 | FFF0 | FFF0 | FFF0 | FFF0 | FFF0 |
| 0198 | /FFF0 | FFF0 | FFF0 | FFF0 | FFF0 | FFF0 | FFF0 | FFF0 |
| 01A0 | /FFF0 | FFF0 | FFF0 | FFF0 | FFF0 | FFF0 | FFF0 | FFF0 |
| 01A8 | /FFF0 | FFF0 | FFF0 | FFF0 | FFF0 | FFF0 | FFF0 | FFF0 |
| 01B0 | /FFF0 | FFF0 | FFF0 | FFF0 | FFF0 | FFF0 | FFF0 | FFF0 |
| 01B8 | /FFF0 | FFF0 | FFF0 | FFF0 | FFF0 | FFF0 | FFF0 | FFF0 |
| 01C0 | /FFF0 | FFF0 | FFF0 | FFF0 | FFF0 | FFF0 | FFF0 | FFF0 |
| 01C8 | /FFF0 | FFF0 | FFF0 | FFF0 | FFF0 | FFF0 | FFF0 | FFF0 |
| 01D0 | /FFF0 | FFF0 | FFF0 | FFF0 | FFF0 | FFF0 | FFF0 | FFF0 |
| 01D8 | /FFF0 | FFF0 | FFF0 | FFF0 | FFF0 | FFF0 | FFF0 | FFF0 |
| 01E0 | /FFF0 | FFF0 | FFF0 | FFF0 | FFF0 | FFF0 | FFF0 | FFF0 |
| 01E8 | /FFF0 | FFF0 | FFF0 | FFF0 | FFF0 | FFF0 | FFF0 | FFF0 |
| 01F0 | /FFF0 | FFF0 | FFF0 | FFF0 | FFF0 | FFF0 | FFF0 | FFF0 |
| 01F8 | /FFF0 | FFF0 | FFF0 | FFF0 | FFF0 | FFF0 | FFF0 | FFF0 |

TABLE 6
CAU EDGE CONNECTOR/BACKPLANE ASSIGNMENTS (PART 1)

| | | | |
|---|---|---|---|
| 1A4 - | RIB 15 | 1B4 - | |
| 1A5 - | RIB 14 | 1B5 - | |
| 1A6 - | RIB 13 | 1B6 - | |
| 1A7 - | RIB 12 | 1B7 - | |
| 1A8 - | RIB 11 | 1B8 - | |
| 1A9 - | RIB 10 | 1B9 - | |
| 1A10 - | RIB 9 | 1B10 - | |
| 1A11 - | RIB 8 | 1B11 - | |
| 1A12 - | RIB 7 | 1B12 - | |
| 1A13 - | RIB 6 | 1B13 - | |
| 1A14 - | RIB 5 | 1B14 - | |
| 1A15 - | +5 volts | 1B15 - | +5 volts |
| 1A16 - | RIB 4 | 1B16 - | |
| 1A17 - | RIB 3 | 1B17 - | |
| 1A18 - | RIB 2 | 1B18 - | |
| 1A19 | | 1B19 - | |
| 1A20 - | RIB 1 | 1B20 - | |
| 1A21 - | RIB 0 | 1B21 - | |
| 1A22 - | SIGN | 1B22 - | |

TABLE 6-continued
CAU EDGE CONNECTOR/BACKPLANE ASSIGNMENTS

| | | | |
|---|---|---|---|
| 1A23 - | | 1B23 - | |
| 1A24 - | ROB 15 | 1B24 - | |
| 1A25 - | ROB 14 | 1B25 - | |
| 1A26 - | ROB 13 | 1B26 - | |
| 1A27 - | ROB 12 | 1B27 - | |
| 1A28 - | ROB 11 | 1B28 - | |
| 1A29 - | ROB 10 | 1B29 - | |
| 1A30 - | ROB 9 | IB30 - | |
| 1A31 - | GROUND | 1B31 - | GROUND |
| 1A32 - | ROB 8 | 1B32 | |
| 1A33 - | ROB 7 | 1B33 | |
| 1A34 - | ROB 6 | 1B34 | |
| 1A35 - | ROB 5 | 1B35 - | M23 |
| 1A36 - | ROB 4 | 1B36 - | NiL |
| 1A37 - | ROB 3 | 1B37 - | NrL |
| 1A38 - | ROB 2 | 1B38 - | OVMPXS |
| 1A39 - | ROB 1 | 1B39 - | SiW |
| 1A40 - | ROB 0 | 1B40 - | SrW |

(PART 2)

| | | | |
|---|---|---|---|
| 2A1 - | Zero | 2B1 - | OUT OV |
| 2A2 - | ZLATCH | 2B2 - | INT OV |
| 2A3 - | DMPXOE | 2B3 - | CLK Y |
| 2A4 - | DMPX2 (M11) | 2B4 - | CLK X |
| 2A5 - | DMPX1 (M10) | 2B5 - | CLK P |
| 2A6 - | DMPX0 (M9) | 2B6 - | |
| 2A7 - | M4 | 2B7 - | |
| 2A8 - | M3 | 2B8 - | −5 VOLTS (Test) |
| 2A9 - | M15 | 2B9 - | |
| 2A10 - | MCLK-TEST | 2B10 - | +12 VOLTS (Test) |
| 2A11 - | M21 | 2B11 - | MSB (Test) |
| 2A12 - | WR | 2B12 - | |
| 2A13 - | RAMA0 (M17) | 2B13 - | |
| 2A14 - | GROUND | 2B14 - | GROUND |
| 2A15 - | | 2B15 - | |
| 2A16 - | M16 | 2B16 - | |
| 2A17 - | | 2B17 - | |
| 2A18 - | Key | 2B18 - | Key |
| 2A19 - | | 2B19 - | |
| 2A20 - | TSL | 2B20 - | |
| 2A21 - | D STRB OUT A | 2B21 - | |
| 2A22 - | D STRB OUT B | 2B22 - | |
| 2A23 - | | 2B23 - | |
| 2A24 - | | 2B24 - | |
| 2A25 - | +5 VOLTS | 2B25 - | +5 VOLTS |
| 2A26 - | REQ I/P OUT A | 2B26 - | |
| 2A27 - | REQ I/P OUT B | 2B27 - | |
| 2A28 - | RESET OUT A | 2B28 - | |
| 2A29 - | M1 | 2B29 - | M22 |
| 2A30 - | REQ O/P OUT A | 2B30 - | OVMPXS |
| 2A31 - | REQ I/P OUT A | 2B31 - | DMPX B |
| 2A32 - | A0 | 2B32 - | DMPX A |
| 2A33 - | A1 Microcode | 2B33 - | NOV |
| 2A34 - | A2 count for | 2B34 - | Status Reset |
| 2A35 - | A3 | 2B35 - | |
| 2A36 - | A4 test | 2B36 - | |
| 2A37 - | A5 | 2B37 - | |

TABLE 7
TRW OUTPUT CONNECTIONS

| | | |
|---|---|---|
| TRW 43 | to | B8-12 |
| TRW 42 | to | B8-13 |
| TRW 41 | to | B8-2 |
| TRW 40 | to | B8-5,C8-13,D10-3 |
| TRW 39 | to | B6-10,C6-2,C8-12,D10-6 |
| TRW 38 | to | B6-13,C6-14,C8-11,D9-3,D10-10 |
| TRW 37 | to | B6-2,C6-11,C8-10,D9-6,D10-13 |
| TRW 36 | to | B6-5,C7-5,C8-9,D7-3,D9-10 |
| TRW 35 | to | B4-10,C7-2,C8-8,D7-6,D9-13,D10-2 |
| TRW 34 | to | B4-13,C7-11,C8-2,D6-3,D7-10,D9-2,D10-5 |
| TRW 33 | to | B4-2,C7-14,C8-1,D6-6,D7-13,D9-5,D10-11 |
| TRW 32 | to | B4-5,C6-5,D4-3,D6-10,D9-11,D10-14 |
| TRW 31 | to | B3-4,C6-13,D4-6,D6-13,D7-2,D9-14 |
| TRW 30 | to | B3-1,C6-10,D3-3,D4-10,D6-2,D7-5,D11-3 |
| TRW 29 | to | B3-10,C7-6,D3-6,D4-13,D6-5,D7-11,D11-2,D11-6 |
| TRW 28 | to | C7-3,D1-3,D3-10,D6-11,D7-14,D11-5,D11-10 |
| TRW 27 | to | C7-10,D1-6,D3-13,D4-2,D6-14,D11-11,D11-13 |
| TRW 26 | to | C7-17,D0-3,D1-10,D3-2,D4-5,D8-3,D11-14 |
| TRW 25 | to | C6-6,D0-6,D1-13,D3-5,D4-11,D8-2,D8-6 |
| TRW 24 | to | C5-9,C9-10,D0-10,D3-11,D4-14,D8-5,D8-10 |
| TRW 23 | to | C3-11,C5-7,D0-13,1-2,D3-14,D8-11,D8-13 |
| TRW 22 | to | C3-12,C5-5,D0-2,D1-5,D5-3,D8-14 |
| TRW 21 | to | C3-13,C5-12,D0-5,D1-11,D5-2,D5-6 |
| TRW 20 | to | C3-14,C5-14,D0-11,D1-14,D5-5,D5-10 |
| TRW 19 | to | C4-11,C5-16,D0-14,D5-11,D5-13 |
| TRW 18 | to | C4-12,C5-3,D2-3,D5-14 |
| TRW 17 | to | C4-13,C5-18,D2-2,D2-6 |
| TRW 15 | to | C2-9,C4-14,D2-5,D2-10 |
| TRW 14 | to | C0-11,C2-12,D2-11,D2-13 |
| TRW 13 | to | C0-12,C1-9,D2-14 |
| TRW 12 | to | C0-13,C1-12 |
| TRW 11 | to | C0-14,C1-4 |
| TRW 10 | to | C1-7 |
| TRW 9 | to | C2-4 |
| TRW 8 | to | C2-7 |

TABLE 8
LOOKUP PROM ADDRESS SIGNALS

| | Divide | | Magnitude | |
|---|---|---|---|---|
| Zero | 0 | 1 | 0 | 1 |
| M22 | 1 | 1 | 0 | 0 |
| M23 | 0 | 0 | 0 | 0 |
| S | 0 | 1 | 1 | 1 |
| A8 | 0 | 1 | 0 | 0 |
| A9 | 0 | 0 | 1 | 1 |
| MSP Source Byte | U | L | L | L |
| PROM Address Block | 0 | 1 | 2 | 2 |

TABLE 9
DMPX SELECT LOGIC

| M9 (DMPX0) | 1 | 0 | 1 | 1 | 0 | X |
|---|---|---|---|---|---|---|
| M10 (DMPX1) | 1 | 1 | 0 | 0 | 0 | X |
| M11 (DMPX2) | 1 | 1 | 1 | 1 | 1 | 0 |
| M17 (A0) | X | X | 1 | 0 | X | X |
| DMPX A | 1 | ZLATCH | ZLATCH | ZLATCH | 0 | X |
| DMPX B | NOV | 0 | NIL | NRL | 0 | DMPX0 |

0 = LOW
1 = HIGH
X = IRRELEVANT

APPENDIX A

CAU Microcode Description

GENERAL NOTE: The Microcode is stored in PROM and is transferred to latching buffers during execution. Because of this the PROM address is always one count ahead of the microcode being executed.

Bit No.      Function (0) Controls the source of the CAU clock. If it equals 1, the internal 5 MHz clock controls the sequencing. If it equals 0, the MIPROC DATA STROBE OUT A and DATA STOBE OUT B pulses are used for sequencing, with a CAU cycle generated for both the positive-going and negative-going edges of the DATA STROBE pulse.

(1) Controls the gating of the input port buffer 100, also referred to as the "A" buffer, which transfers MIPROC data from the MIPROC parallel port A onto the RAM input bus 130. If it equals 1, the gating is off. If it equals 0, the RAM input bus is the true state of the MIPROC data on port A, and the DMPX 250 is forced off. (See FIG. 8.)

(2) Controls the gating of the RIB/ROB buffer 150, also referred to as the "E" buffer, which transfers data stored in the RAM from the RAM output bus 140 to the RAM input bus 130 to be clocked into the TRW X input. If it equals 1, the gate is off. If it equals 0, the gating is on and the DMPX is forced off. (See FIG. 8.)

(3) Controls the gating of the lookup PROM 220 and the Y-input buffer 180, to transfer data from the lookup PROM 220 into the Y input 164 of the TRW 160. If M3 equals 1, the gating is off. If M3 equals 0, the TRW least significant product (LSP) is gated off by setting the TSL control high (i.e., the TRW P15-0 bits are disconnected from the Y input lines to allow external input to Y) and the lookup data can be clocked into the TRW Y input.

(4) Controls the gating of the Y-input buffer 180, also referred to as the "G" buffer, which transfers data in the RAM into the TRW Y input 164. If M4 equals 1, the gating is off and the TRW least significant product will appear at the Y input, if the lookup table gating by signal M3 is also off. If M4 equals 0, the TRW Y input is connected to the RAM output.

(5) Controls the Zero latch 201 (FIG. 15), which determines whether the normal or optimized denominator data scaling and lookup table addresses are to be used in the division algorithm. This bit is normally 0. It is set to 1 for one microcode cycle to clock the state of the TRW output into the latch. When the denominator is on the TRW output, the latch is set to 1 if the upper byte of the Most Significant Product 166 is zero, and is set to 0 otherwise.

(6) Controls the gating of the status word or of the division constant used in calculation of the reciprocal of the denominator. This bit is normally 1 which turns the gating off. If it is set to 0, the status and constants register 350, also referred to as the "F" buffer, gates the constant or stuatus word onto the RAM input bus 130 which allows the constant or status word to be clocked into the TRW X input 162 or the RAM 120. The DMPX is forced off when this bit is 0. (See FIG. 8.)

(7) Selects between the status word and the divide constant for gating onto the RAM input bus 130. This bit is normally 1 which turns the status gating off and enables gating of the constant. It is set to 0 toward the end of the cycle when the status of the internal flags and the overflow indicators are to be gated onto the RAM input bus so that it can be written into the RAM. The DMPX is forced off when this bit is 0. (See FIG. 8.)

(8) Resets the system when it equals 1, which is the last step in each microcode routine.

(9, 10, 11) Respectively the same as DMPX0, DMPX1, and DMPX2, which control the operation of the DMPX to select the section of the TRW output that is gated to the RAM input bus 130, thus providing scaling functions for one microcode cycle. The amount of shift is either fixed or a function of current or previous data depending on the state of the control bits and various latched flags. The following modes are available:

| 11 | 10 | 9 | Function |
|---|---|---|---|
| 0 | 0 | 0 | Case A - 10 bits right shift = .004H ×TRW output |
| 0 | 0 | 1 | Case E - 16 bits right shift = .0001H ×TRW output |
| 0 | 1 | 0 | Case C - 5 bits right shift = .08H ×TRW output |
| 0 | 1 | 1 | Case F - 11 bits right shift = .002H ×TRW output |
| 1 | 0 | 0* | Multiply output - Case A of DMPX is used and the status bit for output is set if overflow occurred. This bit is set when the datum is written into the RAM. |
| 1 | 0 | 1* | Divide output - The Re Ov or In Ov status bit for the output is set if overflow occurred. This bit is set when the datum is written into the RAM. The DMPX case is a function of the setting of the numerator latch NrL or NiL and the ZLATCH as follows: |

| NL | ZL | DMPX Shift |
|---|---|---|
| 1 | 1 | Case A |
| 1 | 0 | Case E |
| 0 | 1 | Case C |
| 0 | 0 | Case F |

| | | | |
|---|---|---|---|
| 1 | 1 | 0 | Denominator calculation - This calculation is dependent on the state of the ZLATCH. If the ZLATCH is low then Case E is used; otherwise Case A is used. |
| 1 | 1 | 1* | Numerator calculation and output - Case F is normally used and NL is set high. If an overflow for Case F occurs, then NOV is 1 which clears NL and changes the DMPX to Case E. |

*These cases are affected by the RAM address. If RAM address is even the results are considered real, and if RAM address is odd the results are considered imaginary. The status bits for overflow and the numerator scaling use this to differentiate real and imaginary calculations; therefore, the RAM address is set prior to or at the same step as a CLKP to insure that the correct scaling and status are set.

(12) Controls the clocking of data from the RAM input bus 130 into the TRW X input 162. This bit is normally zero. It is set to 1 for one microcode cycle to clock a new datum into the X input. This causes the TRW to initiate a multiplication cycle with such datum and with the current datum in the TRW Y input register 163. (See FIGS. 7–8.)

NOTE: The actual clocking occurs halfway through the microcode cycle to allow enabling the required input data register in the same cycle.

(13) Controls the clocking of data into the TRW Y input register 163. This bit is normally zero. It is set to 1 for one microcode cycle to clock a new datum into the Y input register 163. This causes the TRW to initiate a multiplication cycle with such datum and the current datum in the TRW X input register 162.

NOTE: The actual clocking occurs halfway through the microcode cycle to allow enabling the required input data register in the same cycle. The TRW output for the Least Significant Product shares the Y port. Normally enabling any of the data buffers that transfer data to the Y port forces the TRW to the Y input mode. Thus, any attempt to input data to the DMPX at this time will give errors, except for Case E which does not use the LSP. If data from the full TRW output must be clocked into the Y input, it is temporarily stored in the RAM first. However, if required, it is possible to clock the LSP into the Y input directly.

(14) Controls the CLKP function of the TRW. This bit is normally zero. It is set to 1 for one microcode cycle to clock new data into the TRW output registers 165, 167, 179. The data clocked to these registers is the result of the multiplication performed the last time the X and/or Y inputs were clocked.

NOTE: The actual clocking occurs halfway through the microcode cycle to allow enough time for the TRW to finish calculating when a CLK X or Y occurs in the previous cycle.

(15) Controls the accumulate mode of the TRW output registers 165, 167, 169. Must be set to a 1 during a clock X and/or clock Y to cause accumulation the next time the product is clocked into the output registers. If it is not set, the output after the next CLKP is only the result of the last multiplication.

(16) Controls the subtraction function of the accumulate mode of the TRW output. Both the Accumulate bit (M15) and the subtraction bit must be high during the previous CLKX or CLKY if the previous contents of the TRW output registers 165, 167, 169 are to be subtracted from the multiplication result.

(17, 18, 19) Control the RAM address. The following are the assignments of the RAM locations:

| 19 | 18 | 17 | Datum |
|---|---|---|---|
| 0 | 0 | 0 | Input - Numerator Real, Status |
| 0 | 0 | 1 | Input - Numerator Imaginary |
| 0 | 1 | 0 | Input - Denominator Real |
| 0 | 1 | 1 | Input - Denominator Imaginary |
| 1 | 0 | 0 | Output - Quotient Real, Denom, P Real |
| 1 | 0 | 1 | Output - Quotient Imag, Reciprocal, P Imag |
| 1 | 1 | 0 | Numerator Real* |
| 1 | 1 | 1 | Numerator Imaginary* |

*These addresses are specifically reserved since writing to them sets the polarity bits in the output status word.
NOTE: Because certain calculations are monitored for overflow and other criteria, the rule is observed that even addresses are for real quantities and odd addresses are for imaginary quantities.

(20) Controls the signal WR for writing data into the RAM. This bit is normally 1. It is set to 0 for one microcode cycle to write a new datum into the RAM. Actual writing occurs during the first half of a microcode cycle. The output of the RAM is all 1's as long as the write mode is engaged.

(21) Controls the REQ I/P IN bit to the output port buffer 110 to signify to the MIPROC parallel port B that the CAU data are ready. This bit is normally 0. It is set to 1 at least one microcode cycle immediately prior to returning control of the clock to the MIPROC by setting bit M0 to 0.

NOTE: Additional calculations can be done during MIPROC data transfer so long as calculations are complete when actual transfer begins for such data.

(22) Controls the magnitude mode. This bit is normally 1. It is set to 0 during the portion of the magnitude calculation that requires the DIV constant to be 2000H and the lookup PROM address to be changed to the magnitude data. It is set to 1 again as soon as these changes are no longer needed. When M22 is 0 the PROM address select is forced to us the lower byte of the TRW P most significant output as the lookup address.

(23) In this embodiment M23 is always 1. It may be set to 0 to provide for constants to be used in additional arithmetic operations.

APPENDIX B

CAU Divide Microcode Description and Simulation

Following is a description of the steps in CAU division process. Also shown is a simulation of an actual division operation, namely $$\frac{(0800H) + j(0400H)}{(0600H) + j(0200H)}$$

The simulation includes the states of various ports, buses, and memory locations after each step.

The CAU Program Counter is controlled by either an internal 200 nsec time base or external DATA STROBE OUT A or DATA STROBE OUT B control signals from the MIPROC parallel output ports which the system uses for data input and output. These signals are normally high. They go low for about one instruction cycle of the MIPROC (approx. 250 nsec) when data are written to or read from the port. Initially the CAU Program Counter is in the reset state, either from a MIPROC power-up reset, a MIPROC software reset, or a reset generated internally at the end of the previous CAU cycle. The Microcode buffers are in a random state from power-up or the last step of the previous CAU cycle. To start a CAU Divide cycle, the MIPROC software sets the appropriate control lines of its parallel port A to set the upper three bits (MPC8-6) of the Microcode PROM to the address of the Divide firmware. The MIPROC software then sends the first datum, Numerator Real=0800H, to the MIPROC parallel port A. The DATA STROBE OUT A control line goes low. This causes Microcode step 00 to be clocked into the Microcode buffers and the Program Counter to be advanced to step 01.

STEP 00—The Input buffer 100 is enabled to gate the input datum on MIPROC port A into the RAM Input Bus and the RAM address is set to 0.

| RIB = 0800H | ROB = ????H | RAM0 = ????H |
|---|---|---|
| TRWX = ????H | | TRWY = ????H |
| TRWMSP = ????H | | TRWLSP = ????H |

The DATA STROBE OUT A control line goes high. This causes Microcode step 01 to be clocked into the Microcode buffers and the Program Counter to be advanced to step 02.

STEP 01—The Numerator Real is written into the RAM at address 0 and clocked into the TRW X input.

| RIB = 0800H | ROB = FFFF/0800H | RAM0 = ????/0800H |
|---|---|---|
| TRWX = ????H/0800H | | TRWY = ????H |
| TRWMSP = ????H | | TRWLSP = ????H |

NOTE: The slash (/) is used to indicate that the data value change occurs at approximately the midpoint of the Microcode step.

The MIPROC software sends the second datum, Numerator Imaginary=0400H, to port A. The DATA STROBE OUT A control line goes low. This causes Microcode step 02 to be clocked into the Microcode buffers and the Program Counter to be advanced to step 03.

STEP 02—The RAM address is set to 1.

| RIB = 0400H | ROB = ????H | RAM1 = ????H |
|---|---|---|
| TRWX = 0800H | | TRWY = ????H |
| TRWMSP = ????H | | TRWLSP = ????H |

The DATA STROBE OUT A control line goes high. This causes Microcode step 03 to be clocked into the Microcode buffers and the Program Counter to be advanced to step 04.

STEP 03—The Numerator Imaginary is written into the RAM at address 1.

| RIB = 0400H | ROB = | RAM1 = ????/0400H |

-continued

| | |
|---|---|
| FFFF/000H | |
| TRWX = 0800H | TRWY = ????H |
| TRWMSP = ????H | TRWLSP = ????H |

The MIPROC software sends the third datum, Denominator Real=0600H, to port A. The DATA STROBE OUT A control line goes low. This causes Microcode step 04 to be clocked into the Microcode buffers and the Program Counter to be advanced to step 05.

STEP 04—The RAM address is set to 2.

| | | |
|---|---|---|
| RIB = 0600H | ROB = ????H | RAM2 = ????H |
| TRWX = 0800H | | TRWY = ????H |
| TRWMSP = ????H | | TRWLSP = ????H |

The DATA STROBE OUT A control line goes high. This causes Microcode step 05 to be clocked into the Microcode buffers and the Program Counter to be advanced to step 06.

STEP 05—The Denominator Real is written into RAM at address 2. The Y-input buffer 180 is enabled to gate the RAM Output Bus into the TRW Y input.

| | | |
|---|---|---|
| RIB = 0600H | ROB = FFFF/0600H | RAM2 = ????H/0600H |
| TRWX = 0800H | | TRWY = ????H |
| TRWMSP = ????H | | TRWLSP = ROB |

The MIPROC software sends the fourth datum, Denominator Imaginary=0200H, to port A. The DATA STROBE OUT A control line goes low. This causes Microcode step 06 to be clocked into the Microcode buffers and the Program Counter to be advanced to step 07.

STEP 06—The Denominator Real is clocked into the TRW Y input.

| | | |
|---|---|---|
| RIB = 0200H | ROB = 0600H | RAM2 = 0600H |
| TRWX = 0800H | | TRWY = ????/0600H |
| TRWMSP = ????H | | TRWLSP = ROB |

The DATA STROBE OUT A control line goes high. This causes Microcode step 07 to be clocked into the Microcode buffers and the Program Counter to be advanced to step 08.

STEP 07—M0 is set high to transfer control of the Program Counter to the internal 200 nsec clock. The RAM address is set to 3 and the Denominator Imaginary is written to RAM.
The product of Numerator Real and Denominator Real is clocked into the TRW P output.

| | | |
|---|---|---|
| RIB = 0200H | ROB = FFFF/0200H | RAM3 = ????H/0200H |
| TRWX = 0800H | | TRWY = 0600H |
| TRWMSP = ????/0030H | | TRWLSP = ROB |

STEP 08—The input Buffer 100 is turned off. The RIB/ROB buffer 150 is enabled to gate data from the RAM Output Bus into the TRW X input. The RAM address is still set to 3 which puts the Denominator Imaginary on the RAM Output Bus. The Denominator Imaginary is clocked into the TRW X input.

| | | |
|---|---|---|
| RIB = ROB | ROB = 0200H | RAM3 = 0200H |
| TRWX = 0800/0200H | | TRWY = 0600H |
| TRWMSP = 0030H | | TRWLSP = ROB |

STEP 09—The buffer 150 is turned off. The DMPX is set to state 111, for numerator calculation and output. The RAM address is set to 1, putting Numerator Imaginary on the RAM Output Bus. M15 is set which sets the TRW Accumulate mode. The TRW Y input is clocked.

| | | |
|---|---|---|
| RIB = 0600H | ROB = 0400H | RAM1 = 0400H |
| TRWX = 0200H | | TRWY = 0600/0400H |
| TRWMSP = 0030H | | TRWLSP = ROB |

STEP 0A—Buffer 180 is turned off. The product Numerator Imaginary times Denominator Imaginary is clocked into and accumulated with the current contents of the TRW P output, yielding:

Nr * Dr+Ni * Di.

The RAM address is set to 6, in order to save the sign in the output status.

| | | |
|---|---|---|
| RIB = 0600H/0700H | ROB = ????H | RAM6 = ????H |
| TRWX = 0200H | | TRWY = 0400H |
| TRWMSP = 0030/0038H | | TRWLSP = 0000/0000H |

STEP 0B—Dummy step to allow hardware time for numerator overflow to be detected and the range of DMPX to be changed if required.

| | | |
|---|---|---|
| RIB = 0700H | ROB = ????H | RAM6 = ????H |
| TRWX = 0200H | | TRWY = 0400H |
| TRWMSP = 0038H | | TRWLSP = 0000H |

STEP 0C—The calculated Numerator Real NR is written to RAM address 6, setting the NrL latch if DMPX case F did not overflow and setting the Re Sign bit in the Output Status Word if the result is negative. NOTE: The calculated Numerator Real now has a scale factor of 0.002H if NR * 20H does not exceed + or −7FFFH or 0.0001H if the result does exceed + or −7FFFH.

| | | |
|---|---|---|
| RIB = 0700H | ROB = FFFF/0700H | RAM6 = ????H/0700H |
| TRWX = 0200H | | TRWY = 0400H |
| TRWMSP = 0038H | | TRWLSP = 0000H |
| Re Sign = 0 | | NrL = 1 |

NOTE: The result NR * 20 = 0700H does not exceed 7FFFH so NrL is set and the scale factor is .002H.

STEP 0D—The RAM address is set to 3, putting the Denominator Imaginary on the RAM Output Bus. The Y—input buffer 180 is enabled to gate the RAM Output Bus into the TRW Y input. The TRW Y input is clocked. Since the TRW X input already contains the Denominator Imaginary, Di * Di is calculated.

| | | |
|---|---|---|
| RIB = 0700H | ROB = 0200H | RAM3 = 0200H |

| | |
|---|---|
| TRWX = 0200H | TRWY = 0400H/0200H |
| TRWMSP = 0038H | TRWLSP = ROB |
| Re Sign = 0 | NrL = 1 |

STEP 0E—The DMPX is set to state 110 for the Denominator calculation. The TRW P output is clocked, causing the product Di * Di to replace the contents of the TRW P output buffer. The RAM address is set to 2, putting the Denominator Real on the RAM Output Bus.

| | | |
|---|---|---|
| RIB = 0038/0004H | ROB = 0600H | RAM2 = 0600H |
| TRWX = 0200H | | TRWY = 0200H |
| TRWMSP = 0038/0004H | | TRWLSP = ROB |
| Re Sign = 0 | | NrL = 1 |

STEP 0F—The RIB/ROB buffer 150 is enabled to gate the RAM Output Bus to the TRW X input. M15 is set, which sets the TRW Accumulate mode. The TRW X and Y inputs are clocked, calculating Dr * Dr.

| | | |
|---|---|---|
| RIB = ROB | ROB = 0600H | RAM2 = 0600H |
| TRWX = 0200/0600H | | TRWY = 0200H/0600H |
| TRWMSP = 0004H | | TRWLSP = ROB |
| Re Sign = 0 | | NrL = 1 |

STEP 10—The 150 and 180 buffers are turned off. The RAM address is set to 4. The TRW P output is clocked causing the last calculation to be added to the contents of the P output buffer, yielding the calculated Denominator:

$$D = Dr * Dr + Di * Di$$

| | | |
|---|---|---|
| RIB = 0004/0028H | ROB = ????H | RAM4 = ????H |
| TRWX = 0600H | | TRWY = 0600H |
| TRWMSP = 0004/0028H | | TRWLSP = 0000/0000H |
| Re Sign = 0 | | NrL = 1 |

STEP 11—The ZLATCH is set to 1 if the upper byte of the Denominator is zero and cleared if it is not zero. The LOOKUP PROM is gated to the TRW Y input and the TRW Y input is clocked.

| | | |
|---|---|---|
| RIB = 0A00H | ROB = ????H | RAM4 = ????H |
| TRWX = 0600H | TRWY = 0600H/0328H | |
| TRWMSP = 0028H | TRWLSP = (LOOKUP at 128 = 0328) | |
| ZL = 1, | Re Sign = 0, | NrL = 1 |

STEP 12—The LOOKUP PROM is disconnected from the TRW Y input. The calculated Denominator, D, scaled by case E (0.0001H) if ZLATCH=0 or by case A (0.004H) if ZLATCH=1, is clocked into the TRW X input and written into RAM at address 4.

| | | |
|---|---|---|
| RIB = 0A00H | ROB = FFFF/0A00H | RAM4 = ????H/0A00H |
| TRWX = 0600H/0A00H | | TRWY = 0328H |
| TRWMSP = 0028H | | TRWLSP = 0000H |
| ZL = 1, | Re Sign = 0, | NrL = 1 |

STEP 13—The DMPX is set to case A. The product of the LOOKUP and the scaled Denominator is clocked into the TRW P output. The RAM address is set to 5.

| | | |
|---|---|---|
| RIB = 0A00H/07E4H | ROB = ????H | RAM5 = ????H |
| TRWX = 0A00H | | TRWY = 0328H |
| TRWMSP = 0028H/001FH | | TRWLSP = 0000/9000H |
| ZL = 1, | Re Sign = 0, | NrL = 1 |

STEP 14—The TRW P output, LU * (D * Scale), is clocked into the TRW X input scaled by case A (*0.004H).

| | | |
|---|---|---|
| RIB = 07E4H | ROB = ????H | RAM5 = ????H |
| TRWX = 0A00H/07E4H | | TRWY = 0328H |
| TRWMSP = 001FH | | TRWLSP = 9000H |
| ZL = 1, | Re Sign = 0, | NrL = 1 |

STEP 15—The Divide Constant, 1000H, is gated to the RAM Input Bus. The calculation:

$$LU * LU * (D * Scale) * 0.004H$$

is clocked into the TRW P output.

| | | |
|---|---|---|
| RIB = 1000H | ROB = ????H | RAM5 = ????H |
| TRWX = 07E4H | | TRWY = 0328H |
| TRWMSP = 001F/0018H | | TRWLSP = 9000/E7A0H |
| ZL = 1, | Re Sign = 0, | NrL = 1 |

STEP 16—The DMPX is set to case F. The M15 and M16 bits are set to enable the TRW subtract accumulate mode. The Divide Constant is clocked into the TRW X input.

| | | |
|---|---|---|
| RIB = 1000H | ROB = ????H | RAM5 = ????H |
| TRWX = 07E4/1000H | | TRWY = 0328H |
| TRWMSP = 0018H | | TRWLSP = E7A0H |
| ZL = 1, | Re Sign = 0, | NrL = 1 |

STEP 17—The Divide Constant is turned off. The TRW P output is clocked. Because the TRW subtract accumulate mode subtracts the current datum in the P output from the new datum being clocked in, after scaling by DMPX case F (X.002H) the result is:

$$1/D_2 = (LU * 1000H - LU^2 * (D * Scale * 0.004H * 0.002H).$$

This is the first approximation of the reciprocal of the Denominator as it appears on the RAM Input Bus.

| | | |
|---|---|---|
| RIB = 031C/0333H | ROB = ????H | RAM5 = ????H |
| TRWX = 1000H | | TRWY = 0328H |
| TRWMSP = 0018/0019H | | TRWLSP = E7A0/9860H |
| ZL = 1, | Re Sign = 0, | NrL = 1 |

STEP 18—The value of the first approximation of the reciprocal (1/D$_2$) is written into the RAM at address 5.

| | | |
|---|---|---|
| RIB = 0333H | ROB = FFFF/0333H | RAM5 = ????H/0333H |
| TRWX = 1000H | | TRWY = 0328H |
| TRWMSP = 0019H | | TRWLSP = 9860H |

| | | |
|---|---|---|
| ZL = 1, | Re Sign = 0, | NrL = 1 |

STEP 19—The Y—input buffer 180 enabled to gate the RAM Output Bus into the TRW Y input. The DMPX is set to case A. The first approximation of the reciprocal is clocked into the TRW Y input to be used as the LOOKUP value for the second iteration of the algorithm.

| | | |
|---|---|---|
| RIB = 0640H | ROB = 0333H | RAM5 = 0333H |
| TRWX = 1000H | | TRWY = 0328H/0333H |
| TRWMSP = 0019H | | TRWLSP = ROB |
| ZL = 1, | Re Sign = 0, | NrL = 1 |

STEP 1A—The buffer 180 is turned off. The RIB/ROB buffer 150 is enabled to gate the RAM Output Bus into the TRW X input. The RAM address is set to 4. The denominator D is clocked into the TRW X input.

| | | |
|---|---|---|
| RIB = ROB | ROB = 0A00H | RAM4 = 0A00H |
| TRWX = 1000H/0A00H | | TRWY = 0333H |
| TRWMSP = 0019H | | TRWLSP = 9860H |
| ZL = 1, | Re Sign = 0 | NrL = 1 |

STEP 1B—The buffer 150 is turned off. The product of the LOOKUP and the scaled Denominator is clocked into the TRW P output. The RAM address is set to 5.

| | | |
|---|---|---|
| RIB = 0640/07FFH | ROB = 0333H | RAM5 = 0333H |
| TRWX = 0A00H | | TRWY = 0333H |
| TRWMSP = 0019/001FH | | TRWLSP = 9860H/FE00H |
| ZL = 1, | Re Sign = 0, | NrL = 1 |

STEP 1C—The TRW P output, LU * (D * Scale), is clocked into the TRW X input scaled by case A, * 0.004H.

| | | |
|---|---|---|
| RIB = 07FFH | ROB = 0333H | RAM5 = 0333H |
| TRWX = 0A00/07FFH | | TRWY = 0333H |
| TRWMSP = 001FH | | TRWLSP = FE00H |
| ZL = 1, | Re Sign = 0, | NrL = 1 |

STEP 1D—The Divide Constant, 1000H, is gated to the RAM Input Bus. The calculation:

LU * LU * (D * Scale) * 0.004H is clocked into the TRW P output.

| | | |
|---|---|---|
| RIB = 1000H | ROB = 0333H | RAM5 = 0333H |
| TRWX = 07FFH | | TRWY = 0333H |
| TRWMSP = 001F/0019H | | TRWLSP = FE00H/94CDH |
| ZL = 1, | Re Sign = 0, | NrL = 1 |

STEP 1E—The DMPX is set to case F. The M15 and M16 bits are set to enable the TRW subtract accumulate mode. The Divide Constant is clocked into the TRW X input.

| | | |
|---|---|---|
| RIB = 1000H | ROB = 0333H | RAM5 = 0333H |
| TRWX = 07FF/1000H | | TRWY = 0333H |
| TRWMSP = 0019H | | TRWLSP = 94CDH |
| ZL = 1, | Re Sign = 0 | NrL = 1 |

STEP 1F—The Divide Constant is turned off. The TRW P output is clocked. Because the TRW subtract accumulate mode subtracts the current datum in the P output from the new datum being clocked in, after scaling by DMPX case F (X0.002H) the result is:

$$1/D_3 = LU^2 * 1000H - LU^2 * (D * Scale) * 0.004H) * 0.002H.$$

This is the final approximation to the reciprocal of the denominator as it appears on the RAM Input Bus.

| | | |
|---|---|---|
| RIB = 0332/0333H | ROB = 0333H | RAM5 = 0333H |
| TRWX = 1000H | | TRWY = 0333H |
| TRWMSP = 0019/0019H | | TRWLSP = 94CD/9B33H |
| ZL = 1, | Re Sign = 0, | NrL = 1 |

STEP 20—The value of the final approximation of the reciprocal ($1/D_3$) is clocked into the TRW X input and written into the RAM at address 5.

| | | |
|---|---|---|
| RIB = 0333H | ROB = FFFF/0333H | RAM5 = 0333/0333H |
| TRWX = 1000/0333H | | TRWY = 0333H |
| TRWMSP = 0019H | | TRWLSP = 9B33H |
| ZL = 1, | Re Sign = 0, | NrL = 1 |

STEP 21—The Y—input buffer 180 is enabled to gate the RAM Output Bus into the TRW Y input. The DMPX is set to state 101. The RAM address is set to 6. The calculated Numerator Real is clocked into the TRW Y input.

| | | |
|---|---|---|
| RIB = 0666H | ROB = 0700H | RAM6 = 0700H |
| TRWX = 0333H | | TRWY = 0333/0700H |
| TRWMSP = 0019H | | TRWLSP = ROB |
| ZL = 1, | Re Sign = 0, | NrL = 1 |

STEP 22—The buffer 180 is turned off. The RAM address is set to 4. The Quotient Real is clocked into the TRW P output.

| | | |
|---|---|---|
| RIB = 0666/0599H | ROB = 0A00H | RAM4 = 0A00H |
| TRWX = 0333H | | TRWY = 0700H |
| TRWMSP = 0019/0016H | | TRWLSP = 9B33/6500H |
| ZL = 1, | Re Sign = 0, | NrL = 1 |

STEP 23—The Quotient Real is written to the RAM at address 4.

| | | |
|---|---|---|
| RIB = 0599H | ROB = FFFF/0599H | RAM4 = 0A00/0599H |
| TRWX = 0333H | | TRWY = 0700H |
| TRWMSP = 0016H | | TRWLSP = 6500H |
| ZL = 1, | Re Sign = 0, | NrL = 1 |

STEP 24—The buffer 180 is enabled to gate the RAM Output Bus into the TRW Y input. The DMPX is set to state 111. The RAM address is set to 3. The Denominator Imaginary is clocked into the TRW Y input.

| RIB = 02C0H | ROB = 0200H | RAM3 = 0200H |
|---|---|---|
| TRWX = 0333H | | TRWY = 0700/0200H |
| TRWMSP = 0016H | | TRWLSP = ROB |
| ZL = 1, | Re Sign = 0, | NrL = 1 |

STEP 25—The RIB/ROB buffer 150 is enabled to gate the RAM Output Bus into the TRW X input. The RAM address is set to 0. The Numerator Real is clocked into the TRW X input.

| RIB = ROB | ROB = 0800H | RAM0 = 0800H |
|---|---|---|
| TRWX = 0333/0800H | | TRWY = 0200H |
| TRWMSP = 0016H | | TRWLSP = ROB |
| ZL = 1, | Re Sign = 0, | NrL = 1 |

STEP 26—The RAM address is set to 1. The product of the Numerator Real and the Denominator Imaginary is clocked into the TRW P output.

| RIB = ROB | ROB = 0400H | RAM1 = 0400H |
|---|---|---|
| TRWX = 0800H | | TRWY = 0200H |
| TRWMSP = 0016/0010H | | TRWLSP = ROB |
| ZL = 1, | Re Sign = 0, | NrL = 1 |

STEP 27—The Numerator Imaginary is clocked into the TRW X input.

| RIB = ROB | ROB = 0400H | RAM1 = 0400H |
|---|---|---|
| TRWX = 0800/0400H | | TRWY = 0200H |
| TRWMSP = 0010H | | TRWLSP = ROB |
| ZL = 1, | Re Sign = 0, | NrL = 1 |

STEP 28—The buffer 150 is turned off. The RAM address is set to 2. The M15 and M16 bits are set to enable the TRW subtract accumulate mode. The Denominator Real is clocked into the TRW Y input.

| RIB = 0200H | ROB = 0600H | RAM2 = 0600H |
|---|---|---|
| TRWX = 0400H | | TRWY = 0200/0600H |
| TRWMSP = 0010H | | TRWLSP = ROB |
| ZL = 1, | Re Sign = 0, | NrL = 1 |

STEP 29—The buffer 180 is turned off. The RAM address is set to 7. The TRW P output is clocked. Because the TRW subtract accumulate mode subtracts the current datum in the P output from the new datum being clocked in, the result is:

Ni * Dr−Nr * Di.

The RAM address is set at 7 and the associated sign in the output status word is set.

| RIB=0200/0100H | ROB=????H | RAM7=????H |
|---|---|---|
| TRWX=0400H | | TRWY=0600H |
| TRWMSP=0010/0008H | | TRWLSP=0000/0000H |
| ZL=1, | Re Sign=0, | NrL=1 |

STEP 2A—Dummy step to allow the hardware time for numerator overflow to be detected and the range of the DMPX to be changed if required.

| RIB = 0100H | ROB = ????H | RAM7 = ????H |
|---|---|---|
| TRWX = 0400H | | TRWY = 0600H |
| TRWMSP = 0008H | | TRWLSP = 0000H |
| ZL = 1, | Re Sign = 0, | NrL = 1 |

STEP 2B—The calculated Numerator Imaginary is written to RAM address 7, setting the NiL latch if DMPX case F did not overflow and setting the Im Sign bit in the Output Status Word if the result is negative. NOTE: The calculated Numerator Imaginary now has a scale factor of 0.002H if NI * 20 does not exceed +or −7FFFH or 0.0001H if the result does exceed +or −7FFFH.

| RIB=0100H | ROB=FFFF/0100H | RAM7=????/0100H |
|---|---|---|
| TRWX=0400H | | TRWY=0600H |
| TRWMSP=0008H | | TRWLSP=0000H |
| ZL=1, Re Sign=0, NrL=1, Im Sign=0, NiL=1 | | |

STEP 2C—The Numerator Imaginary is clocked into the TRW X input. The RAM address is set to 5.

| RIB = 0100H | ROB = 0333H | RAM5 = 0333H |
|---|---|---|
| TRWX = 0400/0100H | | TRWY = 0600H |
| TRWMSP = 0008H | | TRWLSP = 0000H |
| ZL = 1, Re Sign = 0, NrL = 1, Im Sign = 0, NiL = 1 | | |

STEP 2D—The buffer 180 is enabled to gate the RAM Output Bus into the TRW Y input. The reciprocal of the Denominator (1/D$_3$) is clocked into the TRW Y input. The DMPX is set to state 101.

| RIB = 0200H | ROB = 0333H | RAM5 = 0333H |
|---|---|---|
| TRWX = 0100H | | TRWY = 0600/0333H |
| TRWMSP = 0008H | | TRWLSP = ROB |
| ZL = 1, Re Sign = 0, NrL = 1, Im Sign = 0, NiL = 1 | | |

STEP 2E—The buffer 180 is turned off. The Quotient Imaginary is clocked into the TRW P output.

| RIB=0200/00CCH | ROB=0333H | RAM5=0333H |
|---|---|---|
| TRWX=0100H | | TRWY=0333H |
| TRWMSP=0008/0003H | | TRWLSP=0000/3300H |
| ZL=1, Re Sign=0, NrL=1, Im Sign=0, NiL=1 | | |

STEP 2F—The Quotient Imaginary is written to the RAM at address 5.

| RIB=00CCH | ROB=FFFF/00CCH | RAM5=0333/00CCH |
|---|---|---|
| TRWX=0100H | | TRWY=0333H |
| TRWMSP=0003H | | TRWLSP=3300H |
| ZL=1, Re Sign=0, NrL=1, Im Sign=0, NiL=1 | | |

STEP 30—M0 is set low to transfer control of the Program Counter to the MIPROC—controlled 250 nsec clock. M21 is set high to signal the MIPROC that the data are ready. The status word is gated to the RAM Input Bus. The RAM address is set to 0. The status word is written to the RAM.

| RIB=7000H | ROB=FFFF/7000H | RAM0=0800/7000H |
|---|---|---|
| TRWX=0100H | | TRWY=0333H |
| TRWMSP=0003H | | TRWLSP=3300H |

-continued

ZL=1, Re Sign=0, NrL=1, Im Sign=0, NiL=1

The CAU waits for the MIPROC to respond to the DATA READY signal. When the MIPROC reads the Status Word from the CAU output port, the DATA STROBE OUT B control line goes low causing Microcode step 31 to be clocked into the Microcode buffers and the Program Counter to be advanced to step 32.

STEP 31—The status word is disconnected from the RAM Input Bus.

| RIB = 0003H | ROB = 7000H | RAM0 = 7000H |
|---|---|---|
| TRWX = 0100H | | TRWY = 0333H |
| TRWMSP = 0003H | | TRWLSP = 3300H |
| ZL = 1, Re Sign = 0, NrL = 1, Im Sign = 0, NiL = 1 | | |

The DATA STROBE OUT B control line goes high. This causes Microcode step 32 to be clocked into the Microcode buffers and the Program Counter to be advanced to step 33.

STEP 32—The RAM address is set to 4, putting the Quotient Real on the RAM Output Bus.

| RIB = 0003H | ROB = 0599H | RAM4 = 0599H |
|---|---|---|
| TRWX = 0100H | | TRWY = 0333H |
| TRWMSP = 0003H | | TRWLSP = 3300H |
| ZL = 1, Re Sign = 0, NrL = 1, Im Sign = 0, NiL = 1 | | |

The DATA STROBE OUT B control line goes low as the MIPROC reads the Quotient Real from the CAU output port. This causes Microcode step 33 to be clocked into the Microcode buffers and the Program Counter to be advanced to step 34.

STEP 33—Dummy step.

| RIB = 0003H | ROB = 0599H | RAM4 = 0599H |
|---|---|---|
| TRWX = 0100H | | TRWY = 0333H |
| TRWMSP = 0003H | | TRWLSP = 3300H |
| ZL = 1, Re Sign = 0, NrL = 1, Im Sign = 0, NiL = 1 | | |

The DATA STROBE OUT B control line goes high. This causes Microcode step 34 to be clocked into the Microcode buffers and the Program Counter to be advanced to step 35.

STEP 34—The RAM address is set to 5, putting the Quotient Imaginary on the RAM Output Bus.

| RIB = 0003H | ROB = 0599H | RAM5 = 00CCH |
|---|---|---|
| TRWX = 0100H | | TRWY = 0333H |
| TRWMSP = 0003H | | TRWLSP = 3300H |
| ZL = 1, Re Sign = 0, NrL = 1, Im Sign = 0, NiL = 1 | | |

The DATA STROBE OUT B control line goes low as the MIPROC reads the Quotient Imaginary from the CAU output port. This causes Microcode step 35 to be clocked into the Microcode buffers and the Program Counter to be advanced to step 36.

STEP 35—Dummy step.

The DATA STROBE OUT B control line goes high. This causes Microcode step 36 to be clocked into the Microcode buffers and the Program Counter to be advanced to step 37.

STEP 36—M8 is set high and it resets the Program Counter. All the Microcode remain in this state until the next cycle is initiated by a MIPROC DATA STROBE OUT A pulse.

APPENDIX C

CAU Multiply Microcode Description

The CAU Program Counter is controlled by either an internal 200 nsec time base or external DATA STROBE OUT A or DATA STROBE OUT B control signals from the MIPROC parallel output ports which the system uses for data input and output. These signals are normally high. They go low for about one instruction cycle of the MIPROC (approx. 250 nsec) when data are written to or read from the port. Initially the CAU Program Counter is in the reset state, either from a MIPROC power—up reset, a MIPROC software reset, or a reset generated at the end of the previous CAU cycle. The microcode buffers (A7,12,14) are in a random state from power-up or the last step of the previous CAU cycle. To start a CAU Multiply cycle, the MIPROC software sets the appropriate control lines of its parallel port A to set the upper three bits (MPC8-6) of the Microcode PROM to the address of the Multiply firmware. The MIPROC software then sends the first datum, the Number A Real, to port A. The DATA STROBE OUT A control line goes low. This causes Microcode step 00 to be clocked into the Microcode buffers and the Program Counter to be advanced to step 01.

STEP 00—The Input buffer 100 is enabled to gate the input datum on port A into the RAM Input Bus and the RAM address is set to 0.

The DATA STROBE OUT A control line goes high. This causes Microcode step 01 to be clocked into the Microcode buffers and the Program Counter to be advanced to step 02.

STEP 01—The Number A Real is written into the RAM at address 0 and clocked into the TRW X input. The MIPROC software sends the second datum, Number A Imaginary, to port A. The DATA STROBE OUT A control line goes low. This causes Microcode step 02 to be clocked into the Microcode buffers and the Program Counter to be advanced to step 03.

STEP 02—The RAM address is set to 1. The DATA STROBE OUT A control line goes high. This causes Microcode step 03 to be clocked into the Microcode buffers and the Program Counter to be advanced to step 04.

STEP 03—The Number A Imaginary is written into the RAM at address 1. The MIPROC software sends the third datum, Number B Real, to port A. The DATA STROBE OUT A control line goes low. This causes Microcode step 04 to be clocked into the Microcode buffers and the Program Counter to be advanced to step 05.

STEP 04—The RAM address is set to 2. The DATA STROBE OUT A control line goes high. This causes Microcode step 05 to be clocked into the Microcode buffers and the Program Counter to be advanced to step 06.

STEP 05—The Number B Real is written into RAM. The MIPROC software sends the fourth datum, the Number B Imaginary, to port A. The DATA STROBE OUT A control line goes low. This causes Microcode step 06 to be clocked into the Microcode buffers and the Program Counter to be advanced to step 07.

STEP 06—The RAM address is set to 3.

The DATA STROBE OUT A control line goes high. This causes Microcode step 07 to be clocked into the Microcode buffers and the Program Counter to be advanced to step 08.

STEP 07—M0 is set high to transfer control of the Program Counter to the internal 200 nsec clock. The Number B Imaginary is written to RAM.

STEP 08—The Input Buffer 100 is turned off. The Y-input buffer 180 is enabled to gate data from the RAM Output Bus into the TRW Y input. The RAM address is still set to 3 which puts the Number B Imaginary on the RAM Output Bus. The Number B Imaginary is clocked into the TRW Y input.

STEP 09—The DMPX is set to case E, 16 bits shift. The RAM address is set to 1, putting the Number A Imaginary on the RAM Output Bus. The TRW P output is clocked, putting the product Number A Real times Number B Imaginary into the output buffer. The RAM address is set to 1, putting the Number A Imaginary on the RAM Output Bus.

STEP 0A—M15 is set high to set the TRW accumulate mode. The Number A Imaginary is clocked into the TRW Y input.

STEP 0B—The RIB/ROB buffer 150 is enabled to gate data from the RAM Output Bus into the TRW X input. The DMPX is set to state 100. The RAM address is set to 2, putting the Number B Real on the RAM Output Bus. The TRW X input is clocked with the M15 accumulate bit still high.

STEP 0C—The buffer 150 is turned off. The M15 accumulate bit is set low. The RAM address is set to 5. The product Number A Imaginary times Number B Real is clocked with accumulation enabled into the TRW P output yielding:

$Pi = Ar^* Bi + Ai^* Br.$

STEP 0D—The calculated Product Imaginary is written to RAM address 5, scaled by 0.004H. The Im Sign and the Im Ov bits in the Output Status Word are set appropriately.

STEP 0E—The RAM address is set to 3, putting the Number B Imaginary on the RAM Output Bus. The buffer 150 is enabled to gate the RAM Output Bus into the TRW X input. The TRW Y input is clocked. Since the TRW Y input already contains the Number A Imaginary, Ai * Bi is calculated.

STEP 0F—The TRW P output is clocked, causing the product Ai * Bi to replace the contents of the TRW P output buffer. The RAM address is set to 0, putting the Number A Real on the RAM Output Bus.

STEP 10—The M15 and M16 bits are set to enable the TRW subtract accumulate mode. The Number A Real is clocked into the TRW X input.

STEP 11—The buffer 150 is turned off. The RAM address is set to 2, putting the Number B Real on the RAM Output Bus. The M15 and M16 bits are still set to enable the TRW subtract accumulate mode. The buffer 180 is enabled to gate the RAM Output Bus into the TRW Y input. The TRW Y input is clocked.

STEP 12—The buffer 180 is turned off. The RAM address is set to 4. The TRW P output is clocked. Because the TRW subtract accumulate mode subtracts the current datum in the P output from the new datum being clocked in, the result is:

$Pr = Ar^* Br - Ai^* Bi$

STEP 13—The Product Real is written to the RAM at address 4, scaled by 0.004H. The Re Sign and the Re Ov bits in the Output Status Word are set appropriately.

STEP 14—M0 is set low to transfer control of the Program Counter to the MIPROC—controlled 250 nsec clock. M21 is set high to signal the MIPROC that the data are ready. The status word is gated to the RAM Input Bus. The RAM address is set to 0. The status word is written to the RAM. The CAU waits for the MIPROC to respond to the DATA READY signal. When the MIPROC reads the Status Word from the CAU output port, the DATA STROBE OUT B control line goes low causing Microcode step 15 to be clocked into the Microcode buffers and the Program Counter to be advanced to step 16.

STEP 15—The status word is disconnected from the RAM Input Bus. The DATA STROBE OUT B control line goes high. This causes Microcode step 16 to be clocked into the Microcode buffers and the Program Counter to be advanced to step 17.

STEP 16—The RAM address is set to 4, putting the Product Real on the RAM Output Bus. The DATA STROBE OUT B control line goes low as the MIPROC reads the Product Real from the CAU output port. This causes Microcode step 17 to be clocked into the Microcode buffers and the Program Counter to be advanced to step 18.

STEP 17—Dummy step.

The DATA STROBE OUT B control line goes high. This causes Microcode step 18 to be clocked into the Microcode buffers and the Program Counter to be advanced to step 19.

STEP 18—The RAM address is set to 5, putting the Product Imaginary on the RAM Output Bus.

The DATA STROBE OUT B control line goes low as the MIPROC reads the Product Imaginary from the CAU output port. This causes Microcode step 19 to be clocked into the Microcode buffers and the Program Counter to be advanced to step 1A.

STEP 19—Dummy step.

The DATA STROBE OUT B control line goes high. This causes Microcode step 1A to be clocked into the Microcode buffers and the Program Counter to be advanced to step 1B.

STEP 1A—M8 is set high and it resets the Program Counter. All the Microcode signals remain in this state until the next cycle is initiated by a MIPROC DATA STROBE OUT A pulse.

APPENDIX D

CAU MAGNITUDE MICROCODE DESCRIPTION

The CAU Program Counter is controlled by either an internal 200 nsec time base or external DATA STROBE OUT A or DATA STROBE OUT B control signals from the MIPROC parallel output ports which the system uses for data input and output. These signals are normally high. They go low for about one instruction cycle of the MIPROC (approx. 250 nsec) when data are written to or read from the port. Initially the CAU Program Counter is in the reset state, either from a MIPROC power-up reset, a MIPROC software reset, or a reset generated at the end of the previous CAU cycle. The Microcode buffers (A7,12,14) are in a random state from power-up or the last step of the previous CAU cycle. To start a CAU Magnitude cycle, the MIPROC software sets the appropriate control lines on the parallel output port A to set the upper three bits (MPC8-6) of the Microcode PROM to the address of the Magnitude firmware. The MIPROC software then sends the first datum, the larger, to port A. The DATA STROBE OUT A control line goes low. This causes Microcode step 00 to be clocked into the Microcode buffers and the Program counter to be advanced to step 01.

STEP 00—The Input buffer 100 is enabled to gate the input datum on port A onto the RAM Input Bus and the RAM address is set to 0. The DMPX is set to state 111.

The DATA STROBE OUT A control line goes high. This causes Microcode step 01 to be clocked into the Microcode buffers and the Program Counter to be advanced to step 02.

STEP 01—The larger datum is written into the RAM at address 0 and clocked into the TRW X input.

The MIPROC software sends the second datum, the smaller, to port A. The DATA STROBEOUT A control line goes low. This causes Microcode step 02 to be clocked into the Microcode buffers and the Program Counter to be advanced to step 03.

STEP 02—The RAM address is set to 2.

The DATA STROBE OUT A control line goes high. This causes Microcode step 03 to be clocked into the Microcode buffers and the Program Counter to be advanced to step 04.

3 STEP 03—The Y-input buffer 180 is enabled to gate the RAM Output Bus into the TRW Y input. The smaller datum is written into the RAM at address 2. M0 is set high to return control of the Program Counter to the internal 200 nsec clock.

STEP 04—The Input Buffer 100 is turned off. The smaller datum is clocked into the TRW Y input.

STEP 05—Buffer 180 is turned off. The product of the larger datum times the smaller datum is clocked into the TRW P output. The RAM address is set to 6, in order to save the sign in the output status.

STEP 06—Dummy step to allow hardware time for overflow to be detected and the range of DMPX scaling to be changed if required.

STEP 07—The Numerator, which is the product Large * Small, is written to RAM address 6, setting the NrL latch if DMPX case F did not overflow and setting the Re Sign bit in the Output Status Word if the result is negative.

STEP 08—The buffer 180 is enabled to gate the RAM Output Bus into the TRW Y input. The RAM address is set to 0, putting the Large datum on the RAM Output Bus. The DMPX is set to state 110 for the Denominator calculation. The TRW Y input is clocked. Since the TRW X input already contains the Large datum, Large * Large is calculated.

STEP 09—The buffer 180 is turned off. TRW P output is clocked, causing the product, D=Large * Large, to replace the contents of the TRW P output buffer. The RAM address is set to 4.

STEP 0A—The ZLATCH is set to 1 if the upper byte of the Denominator is zero and cleared if it is not zero. The LOOKUP PROM is gated to the TRW Y input and the TRW Y input is clocked.

STEP 0B—The LOOKUP PROM is disconnected from the TRW Y input. The calculated Denominator D, scaled by case E (s.f.=0.0001) if ZLATCH=0 or by case A (s.f.=0.004) if ZLATCH=1, is clocked into the TRW X input and written into RAM at address 4.

STEP 0C—The DMPX is set to case A. The product of the LOOKUP and the scaled Denominator is clocked into the TRW P output. The RAM address is set to 5.

STEP 0D - The TRW P output, LU * (D * Scale), is clocked into the TRW X input scaled by case A (s.f.=0.004 H).

STEP 0E—The Y-input buffer 180 is enabled to gate the RAM Output Bus into the TRW Y input. The Divide Constant, 1000 H, is gated to the RAM Input Bus. The calculation:

$$LU * LU * (D * Scale) * 0.004 H$$

is clocked into the TRW P output.

STEP 0F—The DMPX is set to case F. The M15 and M16 bits are set to enable the TRW subtract accumulate mode. The Divide Constant is clocked into the TRW X input.

STEP 10—The Divide Constant is turned off. The TRW P output is clocked. Because the TRW subtract accumulate mode subtracts the current datum in the P output from the new datum being clocked in, the result after scaling by DMPX case F (*0.002 H) is:

$$1/D_2 = (LU * 1000 H - LU^{2} * (D * Scale) * 0.004 H) * 0.002 H.$$

This is the first approximation of the reciprocal of the denominator as it appears on the RAM Input Bus.

STEP 11—The value of the first approximation of the reciprocal ($1/D_2$) is written into the RAM at address 5.

STEP 12—The buffer 180 is enabled to gate the RAM Output Bus into the TRW Y input. The DMPX is set to case A. The first approximation of the reciprocal is clocked into the TRW Y input to be used as the LOOKUP value for the second iteration of the algorithm.

STEP 13—The buffer 180 is turned off. The buffer 150 is enabled to gate the RAM Output Bus into the TRW X input. The RAM address is set to 4. The denominator D is clocked into the TRW X input.

STEP 14—The buffer 150 is turned off. The product of the LOOKUP and the scaled Denominator is clocked into the TRW P output. The RAM address is set to 5.

STEP 15—The TRW P output, LU * (D * Scale), is clocked into the TRW X input scaled by case A (s.f.=0.004 H).

STEP 16—The Divide Constant, 1000 H, is gated to the RAM Input Bus. The calculation:

$$LU * LU * (D * Scale) * 0.004 H$$

is clocked into the TRW P output.

STEP 17—The DMPX is set to case F. The M15 and M16 bits are set to enable the TRW subtract accumulate mode. The Divide Constant is clocked into the TRW X input.

STEP 18—The Divide Constant is turned off. The TRW P output is clocked. Because the TRW subtract accumulate mode subtracts the current datum in the P output from the new datum being clocked in, the result after scaling by DMPX case F is:

$$1/D_3 = (LU * 1000 H - LU^{2} * (D * Scale\ 0.004 H) * 0.002 H.$$

This is the final approximation of the reciprocal of the denominator as it appears on the RAM Input Bus.

STEP 19—The value of the final approximation of the reciprocal is clocked into the TRW X input. The RAM address is set to 6.

STEP 1A—The buffer 180 is enabled to gate the RAM Output Bus into the TRW Y input. The DNPX is set to state 101. The calculated Numerator is clocked into the TRW Y input.

STEP 1B—The buffer 180 is turned off. The RAM address is set to 4. The Quotient is clocked into the TRW P output.

STEP 1C—The Quotient is written to the RAM at address 4. M22 is set to enter the Magnitude mode.

STEP 1D—The buffer 180 is enabled to gate the RAM Output Bus into the TRW Y input. The DMPX is set for case A. The RAM address is set to 0. The Divide Constant change is enabled, gating the value 2000 H onto the RAM Input Bus (the value is changed from the normal 1000 H by the M22 bit being low). The Constant is clocked into the TRW X input. The Large datum from the RAM is clocked into the TRW Y input.

STEP 1E—The buffer 180 is turned off. The output of the LOOKUP PROM is gated to the TRW Y input and the address of the PROM is set to the magnitude LOOKUP section. The TRW P output is clocked, putting Large * 2000 H into the output buffer. The DMPX is set to case E.

STEP 1F—Large * 2000 H is written into the RAM at address 0.

STEP 20—The LOOKUP PROM is turned off. The buffer 180 is enabled to gate the RAM Output Bus into the TRW Y input. The RAM address is set to 4. The quotient is clocked into the TRW Y input. The DMPX is set to state 100.

STEP 21—The buffer 180 is turned off. The output of the LOOKUP PROM is gated to the TRW Y input and the address of the PROM is set to the magnitude LOOKUP section. The TRW P output is clocked, putting Quotient * 2000 H into the TRW output buffer. The RAM address is set to 0.

STEP 22—The buffer 150 is enabled to gate the RAM Output Bus into the TRW X input. The value Large * 2000 H is clocked into the TRW X input, and the LOOKUP value for magnitude is clocked into the TRW Y input.

STEP 23—The buffer 150 and the LOOKUP PROM are turned off. The product, LOOKUP * Large * 2000 H is clocked into the TRW output. This is the magnitude result.

STEP 24—M22 is set high to turn off the magnitude mode. The TRW P output scaled by 0.004 H is written into the RAM at address 4. The status word bit for overflow is set if overflow occurred.

STEP 25—M0 is set low to transfer control of the Program Counter to the MIPROC-controlled 250 nsec clock. M21 is set high to signal the MIPROC that the data are ready. The status word is gated to the RAM Input Bus. The RAM address is set to 0. The status word is written to the RAM.

The CAU waits for the MIPROC to respond to the DATA READY signal. When the MIPROC reads the Status Word from the CAU output port, the DATA STROBE OUT B control line goes low causing Microcode step 26 to be clocked into the Microcode buffers and the Program Counter to be advanced to step 27.

STEP 26—The status word is disconnected from the RAM Input Bus.

The DATA STROBE OUT B control line goes high. This causes Microcode step 27 to be clocked into the Microcode buffers and the Program Counter to be advanced to step 28.

STEP 27—The RAM address is set to 4, putting the Magnitude result on the RAM Output Bus.

The DATA STROBE OUT B control line goes low as the MIPROC reads the Magnitude result from the CAU output port. This causes Microcode step 28 to be clocked into the Microcode buffers and the Program Counter to be advanced to step 29.

STEP 28—Dummy step.

The DATA STROBE OUT B control line goes high. This causes Microcode step 29 to be clocked into the Microcode buffers and the Program Counter to be advanced to step 2A.

STEP 29—M8 is set high and it resets the Program Counter. All the Microcode signals remain in this state until the next cycle is initiated by a MIPROC DATA STROBE OUT A pulse.

What is claimed is:

1. A digital device for performing at least one type of mathematical operation on complex numbers by digitally manipulating digital input data which represent such numbers, comprising:
    (a) data input means for receiving digital input data representative of complex numbers for digital manipulation and for transmitting said data over an input bus;
    (b) data output means for transmitting digital output data, which represent the results of said mathematical operations, from an output bus to a destination device, said output data resulting from said digital manipulation of said input data;
    (c) first data storage means for storing said input data, said output data, and intermediate digital data resulting from said digital manipulation, said first storage means being connected to said inut bus and to said output bus;
    (d) data buffer means connected to said output bus for transferring digital data from said output bus to a multiplier I/O bus;
    (e) arithmetic means for performing multiplication, addition of products, and subtraction of products, on digital data, having a first input means for receiving digital data from said input bus and a second input means for receiving digital data from said buffer means, and having output means for transferring digital output data resulting from said multiplication, addition, and subtraction;
    (f) address multiplexer means connected to said output means of said arithmetic means for extracting a first portion of said output data of said arithmetic means;
    (g) data scaling multiplexer means connected to said output means of said arithmetic means and to said input bus for extracting a second portion of said output data of said arithmetic means and transferring said second portion to said input bus, said second portion constituting output data or intermediate digital data;
    (h) second data storage means addressable with the first portion of output data extracted by said address multiplexer means for storing digital data which represent approximate results of mathematical operations and for transferring said stored data that is addressed to said data buffer means; and
    (i) control means responsive to said output data of said arithmetic means extracted by said data scaling multiplexer means and said address multiplexer means, for generating digital control signals to control said data input means, said first data storage means, said data buffer means, said arithmetic means, said data scaling multiplexer means, said address multiplexer means, and said second data storage means to perform said mathematical operations.

2. A device as in claim 1, wherein said output data transferred from said arithmetic means has a 16-bit least significant output portion, and a 16-bit most significant output portion.

3. A device as in claim 2, wherein said address multiplexer means includes:
 (a) a zero detector for detecting and indicating by means of a zero signal whether the upper byte of the data from said most significant output is zero, and
 (b) a lookup address multiplexer which receives said zero signal and in response thereto selects between a selected upper portion of a selected lower portion the most significant output as lookup address data for addressing said second data storage means 4. A device as in claim 3, wherein said zero signal is used by said address multiplexer means to select the most significant non-zero byte for use as address data to said second data storage means.

5. A device as in claim 2, wherein said data scaling multiplexer means includes a parallel data scaling register for receiving said arithmetic means output data, scaling same by a selected scale factor by extracting in parallel a selected subset of contiguous data bits therefrom, and transferring said selected data bits to said input bus.

6. A device as in claim 5, wherein said scale factor is selected in response to the digital value of the arithmetic means output data and the type of mathematical operation being performed.

7. A device as in claim 6, wherein said scale factor is selected in response to whether the upper byte of said arithmetic means output data is zero.

8. A device as in claim 6, further comprising latch means that record the value of the selected scale factor.

9. A device as in claim 1, wherein said control means includes third data storage means for storing, control data related to the type of mathematical operation being performed, and control logic means responsive to said stored control data for generating additional such digital control signals.

10. A device as in claim 9, wherein additional such digital control signals including external timing signals are received by at least one of said data input means and said data output means from an external source.

11. A device as in claim 10, further comprising internal clock means for generating internal timing signals, wherein said control means generate such above-mentioned digital control signals in response to such internal timing signals, at times other than while digital input data are being received by said data input means, and
 wherein said control means are timed, while digital input data are being received by said data input means, by such external timing signals.

12. A device as in claim 12, wherein such timing of said control means by such internal timing signals has a greater rate than the rate of such timing by such external timing signals.

13. A device as in claim 12, wherein such external timing signals are received by said internal clock means and include rising and falling edges,
 each of such edges of such external timing signals causes said internal clock means to generate at least one internal timing signal having both a rising edge and a falling edge,
 whereby timing by such internal timing signals has at least double the frequency of timing by such external timing signals.

14. A device as in claim 12, wherein
 mathematical operations are performed by said above-mentioned components controlled by said control means while said control means are being timed by such external timing signals, and while digital input data are being received by said data input means.

15. The device of claim 1 further comprising a second data buffer means connected to said output bus for transferring digital data from said output bus to said input bus.

16. A digital device for performing at least one type of mathematical operaton on complex numbers by digitally manipulating digital input data which represent such numbers comprising:
 (a) first data storage means for storing said digital input data, output data which represents the results of said mathematical operations, and intermediate data resulting from said digital manipulation,
 (b) data input means connected to said first data storage means for transferring said input data from a source device to said first data storage means,
 (c) data output means connected to said first data storage means for transferring said output data from said digital device to a destination device,
 (d) an arithmetic unit comprising:
  input means for receiving digital data for manipulation,
  mutiplier means for performing multiplication on digital data received by said input means,
  subtraction means for performing subtraction of products output by said multiplier means,
  addition means for performing addition of products output by said multiplier means, and
  output means for transferring digital output data resulting from said multiplication, subtraction, and addition,
 (e) an address multiplexer means connected to said output means of said arithmetic means for extracting a first portion of said arithmetic unit output data,
 (f) data scaling means connected to said output means and said input means of said arithmetic unit and to said first data storage means for extracting a second portion of said output data of said arithmetic unit and for transferring said second portion to said arithmetic unit input means and to said first data storage means, said second portion constituting said output data and said intermediate data,
 (g) a second data storage means addressable with the first portion of output data extracted by to said address multiplexer means, for storing digital data which represent approximate results of mathematical operations and for transferring said stored data that is addressed to said arithmetic unit input means, and
 (h) control means responsive to said arithmetic unit output data for generating digital control signals to control said data nput means, said first data storage means, said arithmetic unit, said data scaling multiplexer means, said address multiplexer means, and said second data storage means to perform said mathematical operations.

17. In a device comprising an arithmetic means, a read/write memory for storing input data and intermediate calculations, a scaling means and a second memory for storing data, a method of performing complex division in which a numerator $Nr+jNi$ is provided by a denominator $Dr+jDi$ to produce a quotient $Qr+jQi$ comprising the steps of:

providing in said second memory a lookup table that provides starting approximations LU of the reciprocal of a denominator D, providing to said arithmetic means the values Nr, Ni, Dr, Di, calculating in said arithmetic means a value $NrQ=Nr*Dr+Ni*Di$, scaling the value NrQ in said scaling means by an amount that varies with the magnitude of NrQ and storing the scaled value in said read/write memory, calculating in said arithmetic means a denominator $D=Dr*Dr+Di*Di$, and scaling the value D by an amount which varies with the magnitude of D, using the scaled value of D to obtain from said lookup table a starting approximation LU of the reciprocal of the denominator D, calculating a value $1/D_2=(LU*K1-LU^2*D*K2)$ where K1 and K2 are scaling factors, calculating a value $1/D_3=1/D_2*K1-(1/D_2)^2*DK2)$ and storing the value $1/D_3$ in said read/write memory, multiplying in said arithmetic means the scaled value of NrQ and $1/D_3$ and scaling the value to produce Qr, calculating in said arithmetic means $NiQ=Ni*Dr-Nr*Qi$ and scaling the value NiQ by an amount that varies with the magnitude of NiQ, and multiplying the scaled value of NiQ and $1/D_3$ and scaling the value to produce Qi.

18. In a device comprising an arithmetic means, a read/write memory for storing input data and intermediate calculations, and a second memory for storing data, a method of calculating the magnitude of a complex quantity $L+jS$ or $S+jL$ where L is the larger value and S the smaller value comprising the steps of providing in said second memory a lookup table that provides estimates of the quantity $M/L=(1+S^2/L^2)^{\frac{1}{2}}$ for discrete values of S/L where $0 \leq S/L \leq 1$, storing in said read/write memory at least the value L, providing to said arithmetic means the values L and S of the complex quantity whose magnitude is to be determined, calculating in said arithmetic means the value of the ratio S/L, using the value of S/L to obtain from said lookup table a value of the expression $M/L=(1+S^2/L^2)^{\frac{1}{2}}$, and multiplying L and the value M/L to produce the value $M=(L^2+S^2)^{\frac{1}{2}}$.

19. In a device comprising an arithmetic means, a read/write memory for storing input data and intermediate calculations, and a second memory for storing data, a method of pe5rforming complex division in which a numerator $Nr+jNi$ is divided by a denominator $Dr+jDi$ to produce a quotient $Qr+jQi$ comprising the steps of:

providing in said second memory a lookup table that provides starting approximations LU of the reciprocal of a denominator D, providing to said arithmetic means the values Nr, Ni, Dr, Di, calculating in said arithmetic means a value $NrQ=Nr*Dr+Ni*Di$, and storing the value in said read/write memory, calculating in said arithmetic means a denominator $D=Dr*Dr+Di*Di$, using the value of D to obtain from said lookup table a starting approximation LU of trhe reciprocal of the denominator D, calculating a value $1/D_2=(LU*K1-LU^2*DK2)$ where K1 and K2 are scaling factors, calculating a value $1/D_3=1/D_2*K1-(1/D_2)^2*D*K2)$ and storing the value $1/D_3$ in said read/write memory, multiplying in said arithmetic means the value of NrQ and $1/D_3$ to produce Qr, calculting in said arithmetic means $NiQ=Ni*Dr-Nr*Qi$, and multiplying the value of NiQ and $1/D_3$ to produce Qi.

* * * * *